US011964509B2

(12) United States Patent
Fukumoto

(10) Patent No.: US 11,964,509 B2
(45) Date of Patent: Apr. 23, 2024

(54) WRITING TOOL

(71) Applicant: MITSUBISHI PENCIL COMPANY, LIMITED, Shinagawa-ku (JP)

(72) Inventor: Takeo Fukumoto, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 332 days.

(21) Appl. No.: 17/427,797

(22) PCT Filed: Mar. 12, 2020

(86) PCT No.: PCT/JP2020/010799

§ 371 (c)(1),
(2) Date: Aug. 2, 2021

(87) PCT Pub. No.: WO2020/195891

PCT Pub. Date: Oct. 1, 2020

(65) Prior Publication Data

US 2022/0126623 A1 Apr. 28, 2022

(30) Foreign Application Priority Data

Mar. 27, 2019 (JP) ................................ 2019-059786
Aug. 29, 2019 (JP) ................................ 2019-156350

(51) Int. Cl.
*B43K 25/02* (2006.01)
*B43K 7/00* (2006.01)
*B43K 24/08* (2006.01)

(52) U.S. Cl.
CPC .............. *B43K 25/02* (2013.01); *B43K 7/005* (2013.01); *B43K 24/08* (2013.01)

(58) Field of Classification Search
CPC ........ B43K 25/02; B43K 7/005; B43K 24/08; B43K 25/024
See application file for complete search history.

(56) References Cited

U.S. PATENT DOCUMENTS 1,507,485 A * 9/1924 Jenkins ................ B43K 25/022
24/11 F

FOREIGN PATENT DOCUMENTS

JP 2007-290266 A 11/2007
JP 2009-39940 A 2/2009

OTHER PUBLICATIONS

International Search Report issued on Jun. 9, 2020 in PCT/JP2020/010799 filed on Mar. 12, 2020, citing document AP therein, 3 pages.

* cited by examiner

*Primary Examiner* — David M Upchurch

(74) *Attorney, Agent, or Firm* — Oblon, McClelland, Maier & Neustadt, L.L.P.

(57) ABSTRACT

Provided is a writing tool comprising a clip composed of a wire rod, wherein the writing tool is capable of allowing a user to raise the clip without manipulation with both hands. The writing tool 1 comprises a tool body 7 extending in a longitudinal direction, and a clip member 8 composed of a wire rod and held by a lateral portion of the tool body 7, wherein a longitudinal intermediate portion 8B of the clip member 8 is held by the lateral portion of the tool body 7, and the clip member 8 is biased toward the tool body 7 so as to cause a longitudinal fore-end portion 8A of the clip member 8 to come into contact with the tool body 7, and wherein the writing tool is configured such that, when a back-end portion 8C of the clip member 8 is pushed toward the tool body 7, the fore-end portion 8A of the clip member 8 is swung to be spaced apart from the tool body 7.

4 Claims, 57 Drawing Sheets

WRITING TOOL

TECHNICAL FIELD

The present invention relates to a writing tool, and more particularly to a writing tool comprising a tool body and a clip whose intermediate section is swingably supported by a lateral portion of the toll body.

BACKGROUND ART

Heretofore, in the field of writing tools such as a ballpoint pen and a mechanical pencil, there has been known a writing tool having a clip on a back-end of a tool body thereof. As this type of writing tool having a clip, a writing tool in which the clip is composed of a single piece of metal elastic wire rod is disclosed in, e.g., the below-mentioned Patent Document 1. In this writing tool, a single piece of metal elastic wire rod is subjected to bending, such that right and left wire rod portions extend from a bottom base portion to form a U shape, and then opposite ends thereof are attached, respectively, to a pair of mounting holes formed in a lateral portion of a tool body of the writing tool.

CITATION LIST

Patent Document

Patent Document 1: JP2009-039940A

SUMMARY OF INVENTION

Technical Problem

However, in the invention described in the Patent Document 1, when opening the clip from the tool body, a user has to move a writing tip-side section of the clip such that it is spaced apart from the tool body, while holding the tool body. Thus, the operation for opening the clip requires holding the tool body with one hand, and raise the writing tip-side section of the clip with the other hand, i.e., needs to manipulate the writing tool with both hands, which is very burdensome.

The present invention has been made in view of the above problem, and an object thereof is to provide a writing tool comprising a clip composed of a wire rod, wherein the writing tool is capable of allowing a user to open the clip without manipulation with both hands.

Solution to Technical Problem

The present invention provides a writing tool comprising a tool body extending in a longitudinal direction, and a clip member composed of a wire rod and held by a lateral portion of the tool body, wherein a longitudinal intermediate section of the clip member is held by the lateral portion of the tool body, and the clip member is biased toward the tool body so as to cause a writing tip-side section of the clip member to come into contact with the tool body, and wherein the writing tool is configured such that, when a back-end section of the clip member is pushed toward the tool body, a longitudinal writing tip-side section of the clip member is swung to be spaced apart from the tool body.

In the writing tool of the present invention having the above feature, the back-end section of the clip member can be pushed down in a state in which the tool body is gripped by the index finger, middle finger, ring finger, little finger of one hand, so as to cause a fore-end section of the clip member to be spaced apart from the tool body, and thus, the clip member can be opened with respect to the tool body by one-handed manipulation.

Preferably, in the writing tool of the present invention, the clip member is formed by bending the wire rod, wherein opposite ends of the wire rod are attached, respectively, to a pair of mounting parts formed in the lateral portion of the tool body, and the clip member is bent into a shape allowing the longitudinal writing tip-side section of the clip member to be biased toward the tool body by elasticity of the wire rod composing the clip member.

According to this feature, the writing tip-side section of the clip member is biased toward the tool body by elasticity of the wire rod composing the clip member, so that the clip member can be composed by a simple configuration, without using any biasing member such as a spring.

More preferably, in the above writing tool, each of the pair of mounting parts is formed of a hole extending in a transverse direction, or a cutout, wherein at least one of the ends of the wire rod is formed with a bent part, and the mounting part corresponding to the at least one end has a relief part expanded as compared with a base end part thereof, wherein the bent part is located in the relief part.

According to this feature, at least one of the ends of the wire rod is formed with a bent part, wherein the bent part is located in the relief part, so that it is possible to prevent the at least one end of the wire rod from dropping off from the mounting part.

Preferably, in the writing tool of the present invention, the wire rod is bent such that the clip member is at least partly formed to define a certain figure.

According to this feature, an aesthetic property can be given to the clip member.

More preferably, in the above writing tool, the tool body comprises a hollow cylindrical-shaped shaft tube and an inner tube disposed inside the shaft tube, and one of the pair of mounting holes is composed of a through-hole, wherein one of the ends of the clip member is disposed inside and held by the through-hole, wherein the through-hole is formed in a boundary surface between the shaft tube and the inner tube.

According to this feature, the clip member is held by the through-hole, so that it is possible to prevent easy drop-out of the clip member, and the through-hole is disposed in the boundary surface between the shaft tube and the inner tube, so that the clip member can be easily disposed in the through-hole.

Effect of Invention

The present invention makes it possible to provide a writing tool comprising a clip member composed of a wire rod, wherein the writing tool is capable of allowing a user to raise the clip without manipulation with both hands.

DESCRIPTION OF EMBODIMENTS

First Embodiment

With reference to the drawings, a writing tool according to a first embodiment of the present invention will now be described in detail. It should be noted that, in the after-mentioned various embodiments, one side on which a writing tip of a refill is selectively extended and retracted will be referred to as "writing tip-side", "fore-end side" or "forward side", and the other side on which a knock member of a knock mechanism extends will be referred to as "back end-side" or "backward side". Further, an axial direction of a writing tool will be referred to as "longitudinal direction" or "axial direction".

Figure 1:
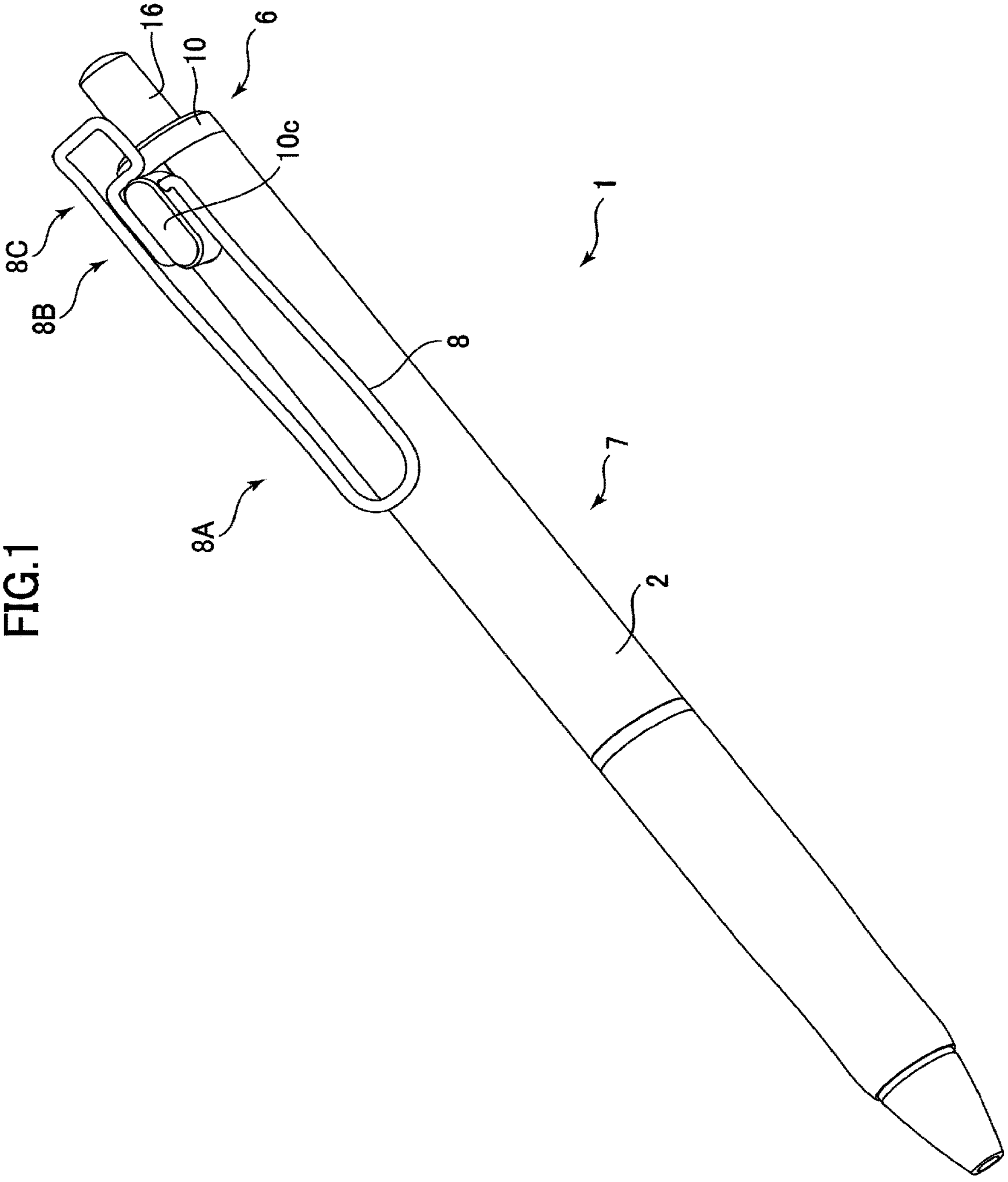
FIG. 1 is a perspective view showing a writing tool according to a first embodiment of the present invention.
Figure 2:
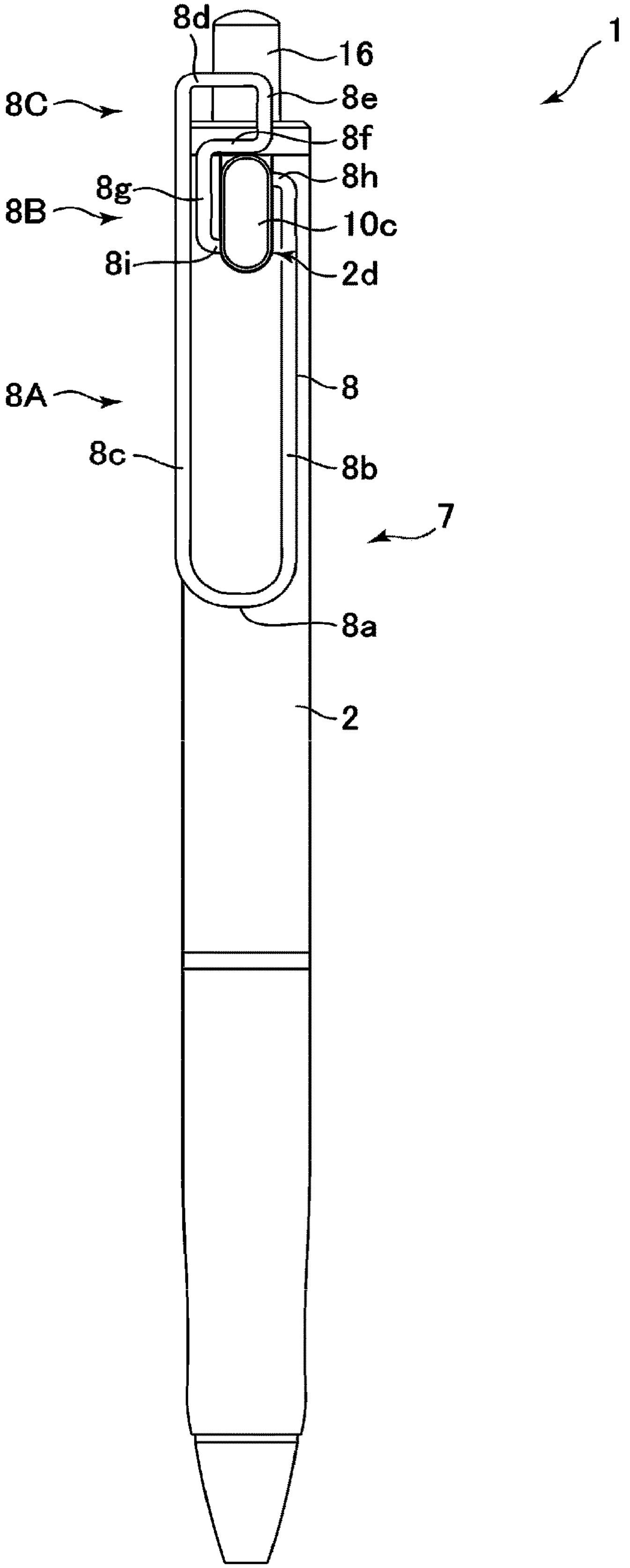
FIG. 2 is a front view showing the writing tool according to the first embodiment.
Figure 3:
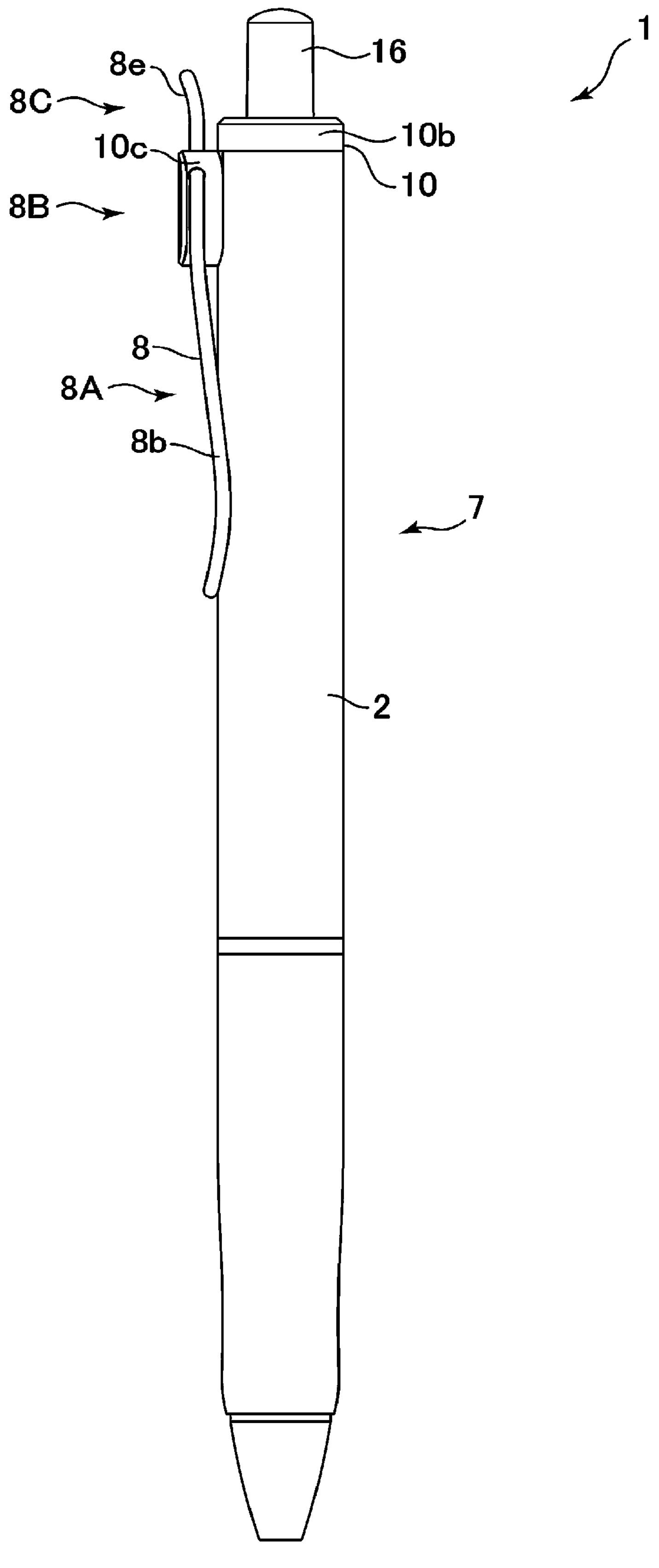
FIG. 3 is a side view showing the writing tool according to the first embodiment.
Figure 4:
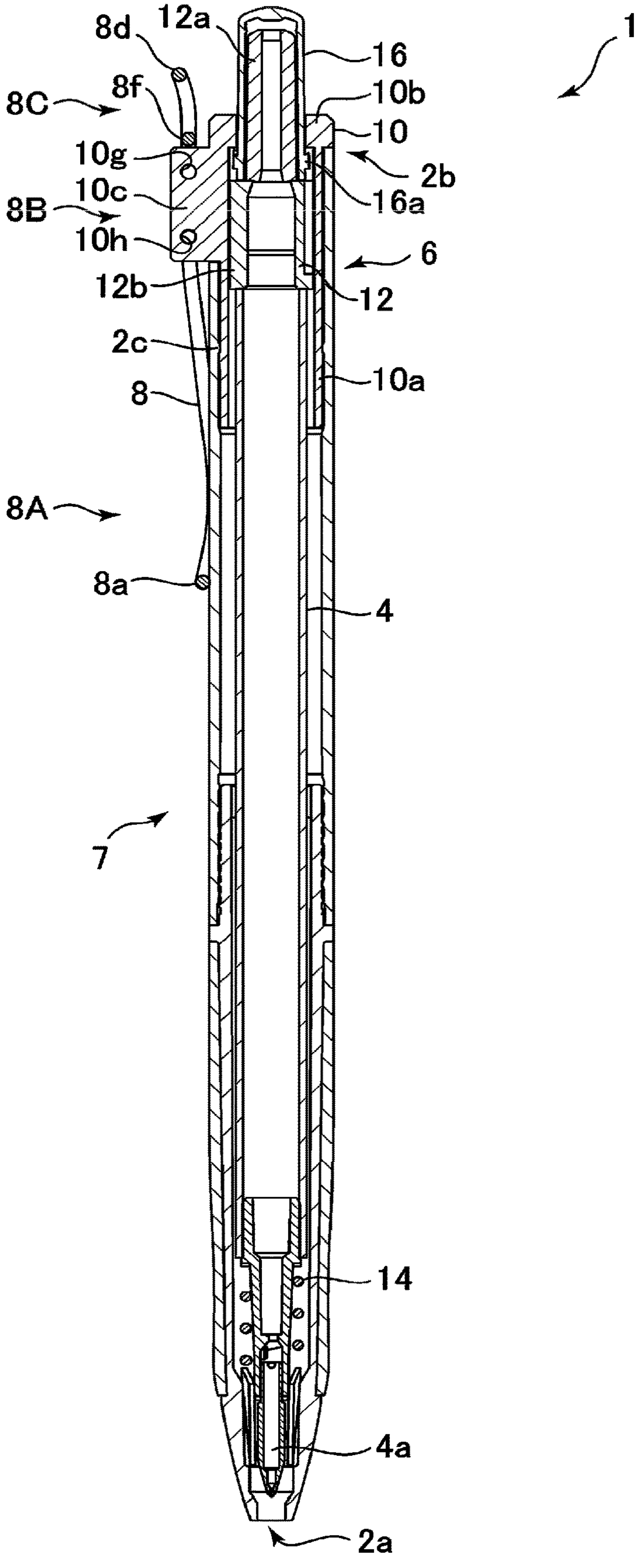
FIG. 4 is a sectional view showing a shaft tube of the writing tool illustrated in FIG. 1, taken along an axial direction.

FIGS. 1 to 3 illustrate the writing tool according to the first embodiment, wherein FIG. 1, FIG. 2 and FIG. 3 are, respectively, a perspective view, a front view and a side view. Further, FIG. 4 is a sectional view showing a shaft tube of the writing tool illustrated in FIG. 1, taken along the axial direction. The writing tool 1 according to the first embodiment is a so-called "knock-type ballpoint pen", and configured to be switchable between a state in which a writing tip portion 4*a* of a refill element 4 protrudes from a fore-end of a shaft tube 2, and a state in which the writing tip portion 4*a* of the refill element 4 is housed in the shaft tube 2, through an operation of pushing down a knock member 16 at a back-end of the writing tool, as mentioned later.

As shown in FIGS. 1 to 4, the writing tool 1 according to the first embodiment comprises a tool body 7, and a clip member 8 held by a lateral portion of the tool body 7. The tool body 7 comprises a hollow cylindrical-shaped long shaft tube 2, a refill element 4 housed in the shaft tube 2, and a knock mechanism 6 provided in a back-end of the shaft tube 2. The knock mechanism 6 comprises an inner tube 10, a rotor 12, a spring member 14, and a knock member 16.

The shaft tube 2 is formed in a hollow cylindrical shape whose fore-end is tapered. The shaft tube 2 has a fore-end opening 2*a* and a back-end opening 2*b* formed in the fore-end and the back-end thereof, respectively. The shaft tube 2 also has an annular-shaped convex part 2*c* formed on an inner peripheral surface of the back-end thereof to protrude radially inwardly and extend over the entire inner circumference thereof. Further, the shaft tube 2 has a cutout 2*d* formed in a back-end edge thereof to have a shape equivalent to that of the after-mentioned clip mounting portion 10*c* of the inner tube 10.

Figure 5A:
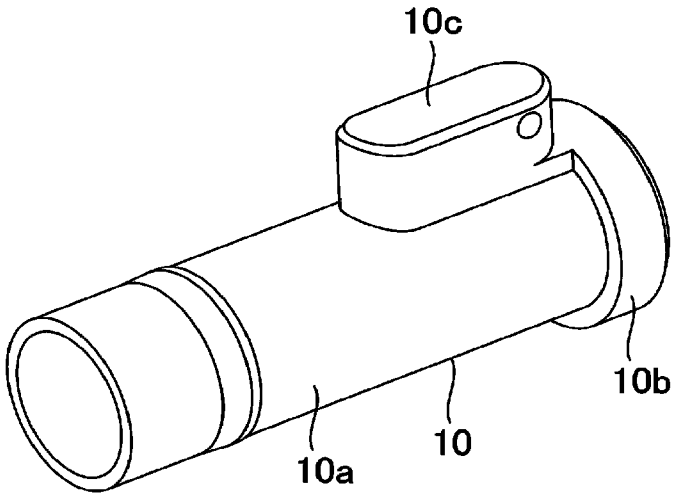
FIG. 5A is a perspective view showing an inner tube of the writing tool illustrated in FIG. 1.
Figure 5B:
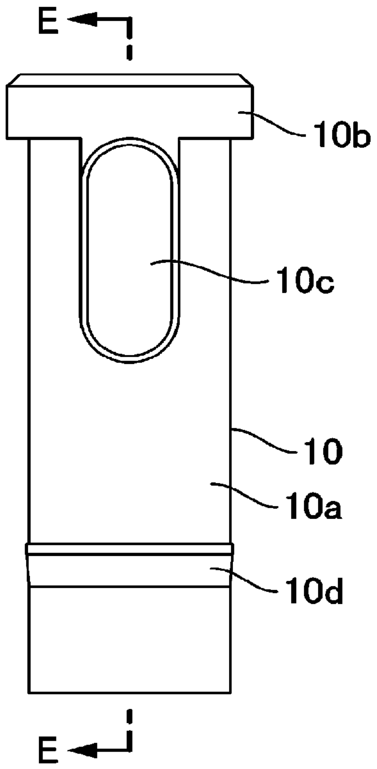
FIG. 5B is a front view showing the inner tube of the writing tool illustrated in FIG. 1.
Figure 5C:
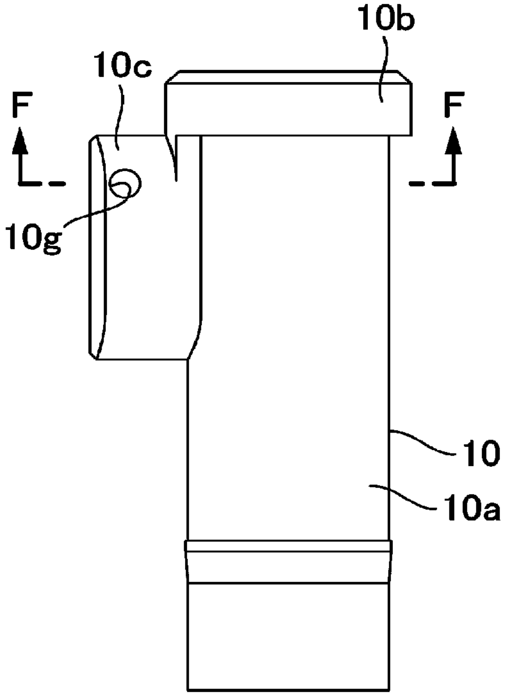
FIG. 5C is a right side view showing the inner tube of the writing tool illustrated in FIG. 1.
Figure 5D:
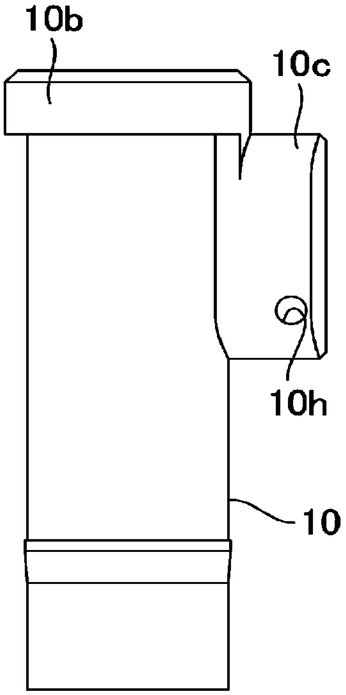
FIG. 5D is a left side view showing the inner tube of the writing tool illustrated in FIG. 1.
Figure 5E:
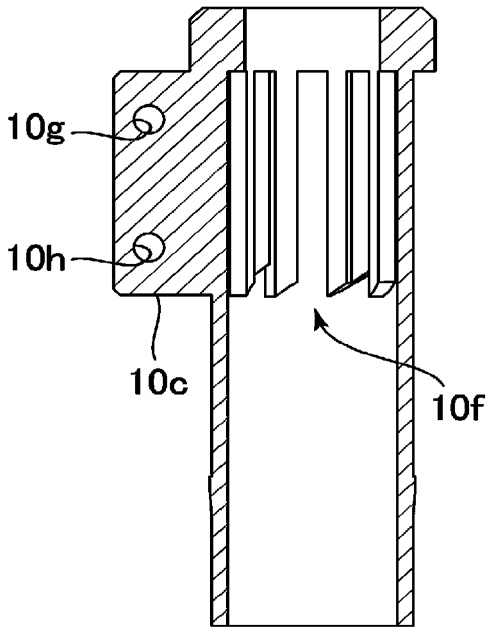
FIG. 5E is a sectional view taken along the line E-E of FIG. 5B.
Figure 5F:
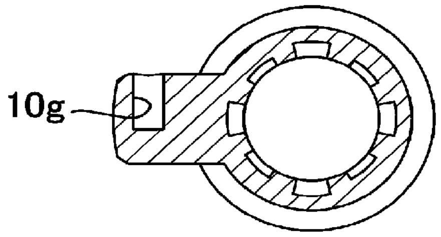
FIG. 5F is a sectional view taken along the line F-F of FIG. 5C.

FIGS. 5A to 5E illustrate the inner tube of the writing tool illustrated in FIG. 1, wherein FIG. 5A, FIG. 5B, FIG. 5C and FIG. 5D are, respectively, a perspective view, a front view, a right side view and a left side view, and FIG. 5E and FIG. 5F are, respectively, a sectional view taken along the line E-E of FIG. 5B and a sectional view taken along the line F-F of FIG. 5C. As shown in FIGS. 5A to 5F, the inner tube 10 comprises a hollow cylindrical-shaped tube body 10*a*, a back-end portion 10*b* connected to a back-end of the tube body 10*a*, and a clip mounting portion 10*c* connected to the back-end side of the tube body 10*a*. The tube body 10*a*, the back-end portion 10*b* and the clip mounting portion 10*c* are integrally formed.

The tube body 10*a* has an approximately hollow cylindrical shape, wherein the outer diameter of the tube body 10*a* is slightly less than the inner diameter of the shaft tube 2. The tube body 10*a* has a protrusion 10*d* formed on an outer peripheral surface of a lower portion thereof to protrude radially outwardly and extend over the entire outer circumference thereof. The tube body 10*a* also has a cam portion 10*f* formed on an inner peripheral surface of the back-end thereof. The cam portion 10*f* is configured to, when the knock member 16 is manually knocked, rotate the rotor 12 in cooperation with the after-mentioned cam portion 12*b* of the rotor 12 so as to switch between a state in which the writing tip portion 4*a* of the refill element 4 protrudes from the fore-end opening 2*a* of the shaft tube 2, and a state in which the writing tip portion 4*a* of the refill element 4 is housed in the shaft tube 2. As a configuration of the cam portion 10*f* of the inner tube 10 and the cam portion 12*b* of the rotor 12, any of well-known configurations may be employed. In the first embodiment, the cam portion 10*f* of the inner tube 10 has a plurality of convex parts extending forwardly and a plurality of concave parts formed between adjacent ones of the convex parts to extend backwardly.

The back-end portion 10*b* is formed in a hollow cylindrical shape, wherein the outer diameter thereof is approximately equal to the outer diameter of the shaft tube 2. The back-end portion 10*b* has a circular through-hole formed to penetrate therethrough in a forward-backward direction.

The clip mounting portion 10*c* is provided with a given distance from the back-end of the tube body 10*a*, and formed in a columnar shape extending laterally outwardly. The clip mounting portion 10*c* is formed such that side surfaces thereof opposed in a transverse direction (rightward-leftward direction in FIG. 5B) are parallel to each other.

As shown in FIGS. 5C, 5E and 5F, the clip mounting portion 10*c* has a first mounting hole 10*g* formed to extend in the transverse direction and opened in a back-end region of the right side surface thereof. The first mounting hole 10*g* is terminated in a transverse intermediate region of the clip mounting portion 10*c*, i.e., does not penetrate therethrough to reach the left side surface.

As shown in FIGS. 5D and 5E, the clip mounting portion 10*c* also has a second mounting hole 10*h* formed to extend in the transverse direction and opened in a fore-end region of the left side surface thereof. The second mounting hole 10*h* is terminated in the transverse intermediate region of the clip mounting portion 10*c*, i.e., does not penetrate therethrough to reach the right side surface. The first mounting hole 10*g* and the second mounting hole 10*h* are aligned in the longitudinal direction (i.e., they are located at an equal distance from a central axis of the inner tube 10), wherein the first mounting hole 10*g* is formed backward of the second mounting hole 10*h*.

The rotor 12 comprises a backward-side base end portion 12*a*, and a forward-side cam portion 12*b*. The base end portion 12*a* is formed in a hollow cylindrical shape, wherein the outer diameter thereof is less than the outer diameter of the knock member 16. The cam portion 12*b* is formed in a hollow cylindrical shape, wherein the outer diameter thereof is slightly less than the inner diameter of the tube body 10*a* of the inner tube 10. The cam portion 12*b* has a plurality of convex parts formed on an outer surface thereof to extend backwardly and a plurality of concave parts formed between adjacent ones of the convex parts to extend forwardly.

The knock member 16 is formed in a hollow cylindrical shape which is closed on the upper side and opened on the lower side. The outer diameter of the knock member 16 is approximately equal to the inner diameter of the through-hole of the back-end portion 10*b* of the inner tube 10. The knock member 16 has a protrusion 16*a* formed on a lower end region of an outer peripheral surface thereof to protrude radially outwardly over the entire outer circumference thereof.

The spring member 14 is installed such that a back-end thereof is in contact with a fore-end of the refill element 4, and a fore-end thereof is in contact with the fore-end of the shaft tube 2. Thus, the spring member 14 operates to bias the refill element 4 backwardly.

In an assembled state, the inner tube 10 is disposed such that the tube body 10*a* is inserted from the back-end opening 2*b* of the shaft tube 2 and located inside the shaft tube 2, and the back-end portion 10*b* is in contact with a back-end edge of the shaft tube 2. Further, the protrusion 10*d* of the inner tube 10 is located on the fore-end side with respect to the convex part 2*c* of the shaft tube 2, and thereby the inner tube 10 is fixed to the shaft tube 2. The knock member 16 is inserted through the through-hole of the back-end portion 10*b* of the inner tube 10 from the forward side, and the protrusion 16*a* of the knock member 16 is located inside the tube body 10*a* of the inner tube 10. The base end portion 12*a* of the rotor 12 is inserted inside the knock member 16 from the forward side, and a fore-end edge of the knock member 16 is in contact with a back-end surface of the cam portion 12*b* of the rotor 12. Further, a fore-end surface of the cam portion 12*b* of the rotor 12 is in contact with the refill element 4. Thus, the rotor 12 and the knock member 16 are biased backwardly through the refill element 4.

When the knock member 16 is pushed down in the above state, the rotor 12 is rotated to switch between a state in which the convex parts of the cam portion 12*b* of the rotor 12 are meshed with the concave parts of the cam portion 10*f* of the inner tube 10, and a state in which tops of the convex parts of the cam portion 10*f* of the inner tube 10 are in contact with respective tops of the convex parts of the cam portion 12*b* of the rotor 12, and thereby switch between a state in which the writing tip portion 4*a* of the refill element 4 is housed in the shaft tube 2, and a state in which the writing tip portion 4*a* of the refill element 4 protrudes from the fore-end of the shaft tube 2.

Figure 6A:
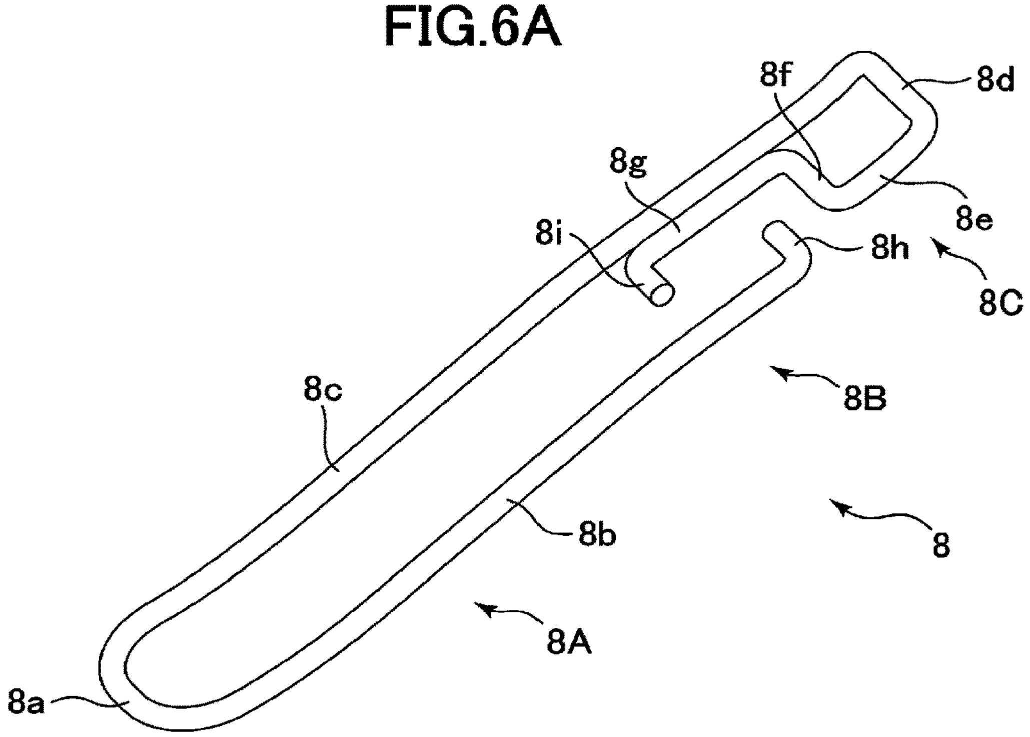
FIG. 6A is a perspective view showing a clip member of the writing tool illustrated in FIG. 1.
Figure 6B:
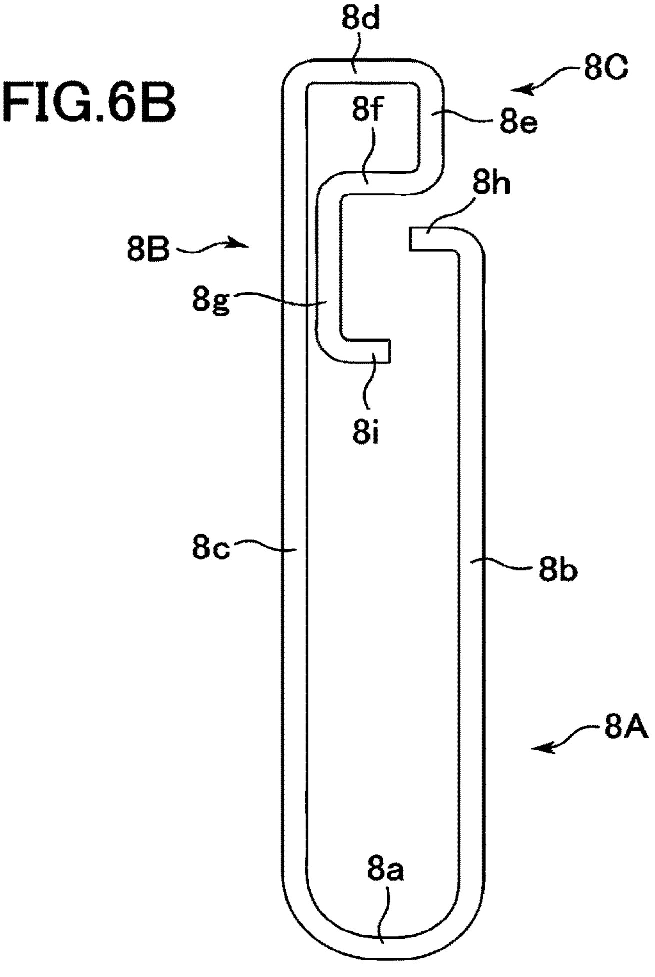
FIG. 6B is a front view showing the clip member of the writing tool illustrated in FIG. 1.
Figure 6C:
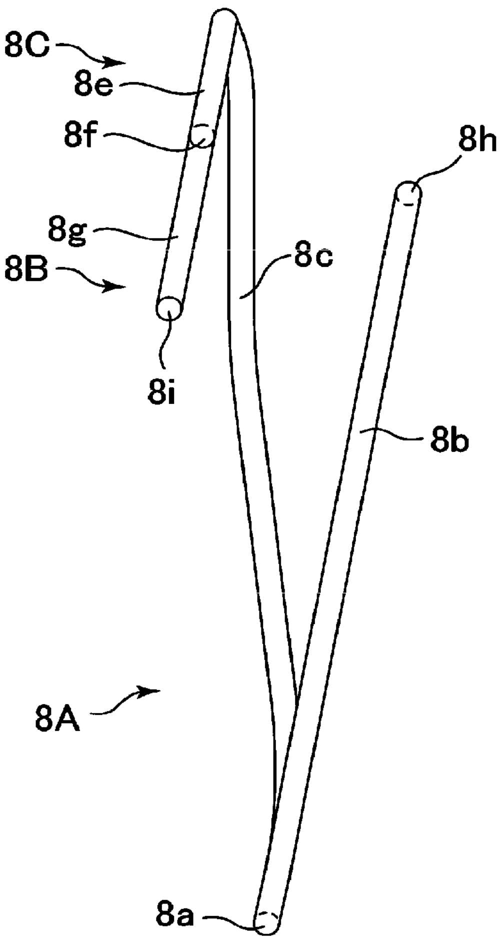
FIG. 6C is a side view showing the clip member of the writing tool illustrated in FIG. 1.

FIGS. 6A to 6C illustrate the clip member of the writing tool illustrated in FIG. 1, wherein FIG. 6A, FIG. 6B and FIG. 6C are, respectively, a perspective view, a front view and a side view. It should be noted here that FIG. 6C shows the clip member in a state in which it is detached from the inner tube. As shown in FIGS. 6A to 6C, the clip member 8 is formed by subjecting a single piece of metal wire rod made of stainless steel or the like to bending. The clip member 8 has: a fore-end section 8A formed in a U shape; a back-end section 8C formed in an approximately rectangular shape; and an intermediate section 8B between the fore-end section 8A and the back-end section 8C.

The fore-end section 8A is composed of a forward part of a first longitudinal portion 8*b*, a forward part of a second longitudinal portion 8*c*, and an arc-shaped portion 8*a* connecting a fore-end of the first longitudinal portion 8*b* and a fore-end of the second longitudinal portion 8*c*. The first longitudinal portion 8*b* extends backwardly from a right (right side in FIG. 6B) end of the arc-shaped portion 8*a*. The second longitudinal portion 8*c* extends backwardly from a left (left side in FIG. 6B) end of the arc-shaped portion 8*a*. The first longitudinal portion 8*b* extends to a position backward of the after-mentioned second end 8*i* of the intermediate section 8B. The second longitudinal portion 8*c* extends to the back-end section 8C beyond the intermediate section 8B.

The back-end section 8C is composed of: a back-end of the second longitudinal portion 8*c*; a first transverse portion 8*d* extending rightwardly (in a rightward direction in FIG. 6B) from the back-end of the second longitudinal portion 8*c*; a third longitudinal portion 8*e* extending forwardly from a right (right side in FIG. 6B) end of the first transverse portion 8*d*; and a second transverse portion 8*f* extending leftwardly (in a leftward direction in FIG. 6B) from the fore-end of the third longitudinal portion 8*e*. The second transverse portion 8*f* is located backward of the after-mentioned first end 8*h*. Further, a fourth longitudinal portion 8*g* extends forwardly from a left (left in FIG. 6B) end of the second transverse portion 8*f*.

The intermediate section 8B has a first end 8*h* extending leftwardly (in the leftward direction in FIG. 6B) from a back-end of the first transverse portion 8*d*, and a second end 8*i* extending rightwardly (in the rightward direction in FIG. 6B) from a fore-end of the fourth longitudinal portion 8*g*. The first end 8*h* is located backward of the second end 8*i*.

In a state in which the clip member 8 is detached from the inner tube 10, the first longitudinal portion 8*b* is tilted such that it extends obliquely backwardly toward a radially central side (in a rightward direction in FIG. 6C), with respect to a direction along which the second longitudinal portion 8*c* extends. Further, the third longitudinal portion 8*e* and the fourth longitudinal portion 8*g* are tilted such that they extend obliquely backwardly toward a radially outward side (in a leftward direction in FIG. 6C), with respect to the direction along which the second longitudinal portion 8*c* extends. Thus, the first end 8*h* is located closer to the tool body than the second end 8*i*. It should be noted here that a biasing force of the clip member 8 can be obtained as long as at least the first longitudinal portion 8*b* is tilted.

In the assembled state, the first mounting hole 10*g* and the second mounting hole 10*h* of the clip mounting portion 10*c* of the inner tube 10 are arranged such that they are aligned in the longitudinal direction with a given distance from an outer peripheral surface of the shaft tube 2. The first end 8*h* and the second end 8*i* are inserted, respectively, into the first mounting hole 10*g* and the second mounting hole 10*h* in the clip mounting portion 10*c* of the inner tube 10, so as to fix the clip member 8. That is, the clip member 8 is attached in a state in which it is deformed such that the first longitudinal portion 8*b*, the third longitudinal portion 8*e* and the fourth longitudinal portion 8*g* become approximately parallel to the second longitudinal portion 8*c*.

Based on the above configuration, the intermediate section 8B of the clip member 8 is held by the clip mounting portion 10*c*. Further, since the clip member 8 is attached in the deformed state as mentioned above, the fore-end section 8A is biased toward the tool body 7 by an elastic force of the metal wire rod composing the clip member 8. Therefore, in a state in which the clip member 8 is attached to the inner tube 10, the fore-end section 8A of the clip member 8 is in contact with the outer peripheral surface of the shaft tube 2 of the tool body 7, as shown in FIG. 3.

Figure 7:
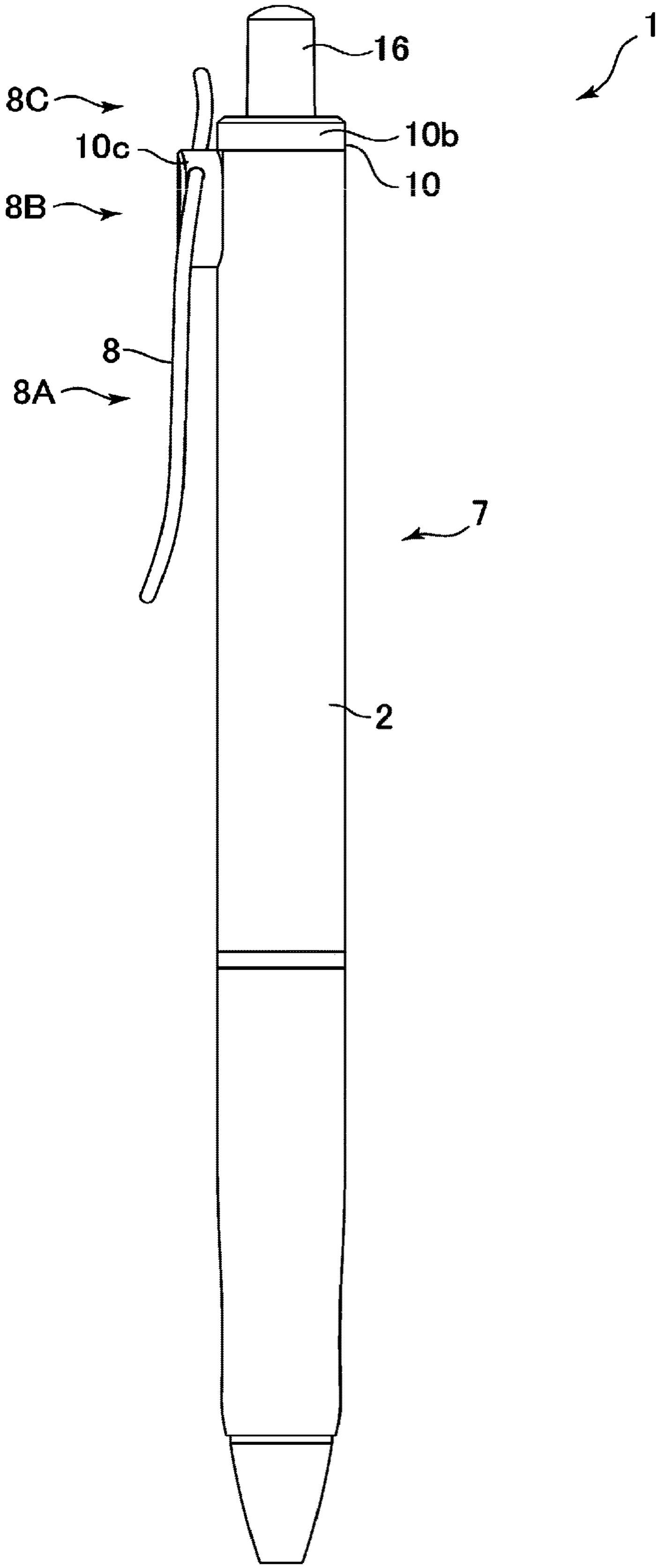
FIG. 7 is a side view showing a state in which the clip of the writing tool according to the first embodiment is opened.

FIG. 7 is a side view showing a state in which the clip of the writing tool according to the first embodiment is opened. When the back-end section 8C of the clip member 8 is pushed radially inwardly toward the tool body 7, the fore-end section 8A of the clip member 8 is swung about a fulcrum consisting of the intermediate section 8B held by the clip mounting portion 10*c*, i.e., moved radially outwardly to be spaced apart from the tool body 7, as shown in FIG. 7. Therefore, a user of the writing tool 1 according to the first embodiment can push down the back-end section 8C of the clip member 8 in a state in which he/she grips the shaft tube 2 of the tool body 7 by the index finger, middle finger, ring finger, little finger of one hand, thereby causing the fore-end section 8A of the clip member 8 to be spaced apart from the tool body 7 to open the clip member 8 with respect to the tool body 7.

In the present invention, the expression "swinging the clip with respect to the tool body" includes not only swinging the clip strictly about a single pivot, but also, through an operation of manually pushing the back-end section of the clip member radially inwardly in the state in which the intermediate section of the clip member is supported, moving the fore-end section of the clip member radially outwardly, as in the first embodiment.

The first embodiment can bring out the following advantageous effects.

In the first embodiment, the intermediate section 8B of the clip member 8 is held by the lateral portion of the tool body 7, and, when the back-end section 8C of the clip member 8 is pushed toward the tool body 7, the fore-end section 8A of the clip member 8 is swung to be spaced apart from the tool body 7. Thus, the back-end section 8C of the clip member 8 can be pushed down in a state in which the shaft tube 2 of the tool body 7 is gripped by the index finger, middle finger, ring finger, little finger of one hand, thereby opening the clip member 8 by one-handed manipulation.

In the first embodiment, the fore-end section 8A is biased toward the tool body 7 by elasticity of the wire rod composing the clip member 8, so that the clip member 8 can be composed by a simple configuration, without using any biasing member such as a spring.

Here, in the first embodiment, the clip mounting portion 10*c* is provided in the inner tube 10, and the clip member 8 is attached to the clip mounting portion 10*c*. Alternatively, such a clip mounting portion may be provided on a lateral surface of the shaft tube 2, and the clip member 8 may be attached thereto.

Further, in the first embodiment, the first mounting hole 10*g* and the second mounting hole 10*h* are aligned in the longitudinal direction, and, in the state in which the clip member 8 is detached from the inner tube 10, the first end 8*h* is located closer to the tool body than the second end 8*i*. However, the present invention is not limited thereto. For example, even in a case where the clip member 8 is formed in a flat shape, the writing tip-side second mounting hole 10*h* may be formed closer to the tool body 7 than the first mounting hole 10*g*. In this case, the fore-end section of the clip member 8 can also be biased toward the tool body 7.

Further, in the first embodiment, the first mounting hole 10*g* and the second mounting hole 10*h* are provided to fix the first end 8*h* and the second end 8*i* of the clip member 8 thereto. Alternatively, a cutout may be formed.

Further, although the first embodiment has been described based on an example where the present invention is applied to a knock-type ballpoint pen, a writing tool to which the present invention is applicable is not limited thereto. For example, the present invention is also applicable to a knock-type mechanical pencil, and a writing tool equipped with no knock mechanism. Further, the present invention may be applied in a case where a cap is attached to a cap of a cap-type writing tool.

Second Embodiment

Next, with reference to the drawings, a writing tool according to a second embodiment of the present invention will be described in detail. In the following description, a similar element or component to that in the first embodiment will be assigned with the same reference sign, and detailed description thereof will be omitted.

Figure 8:
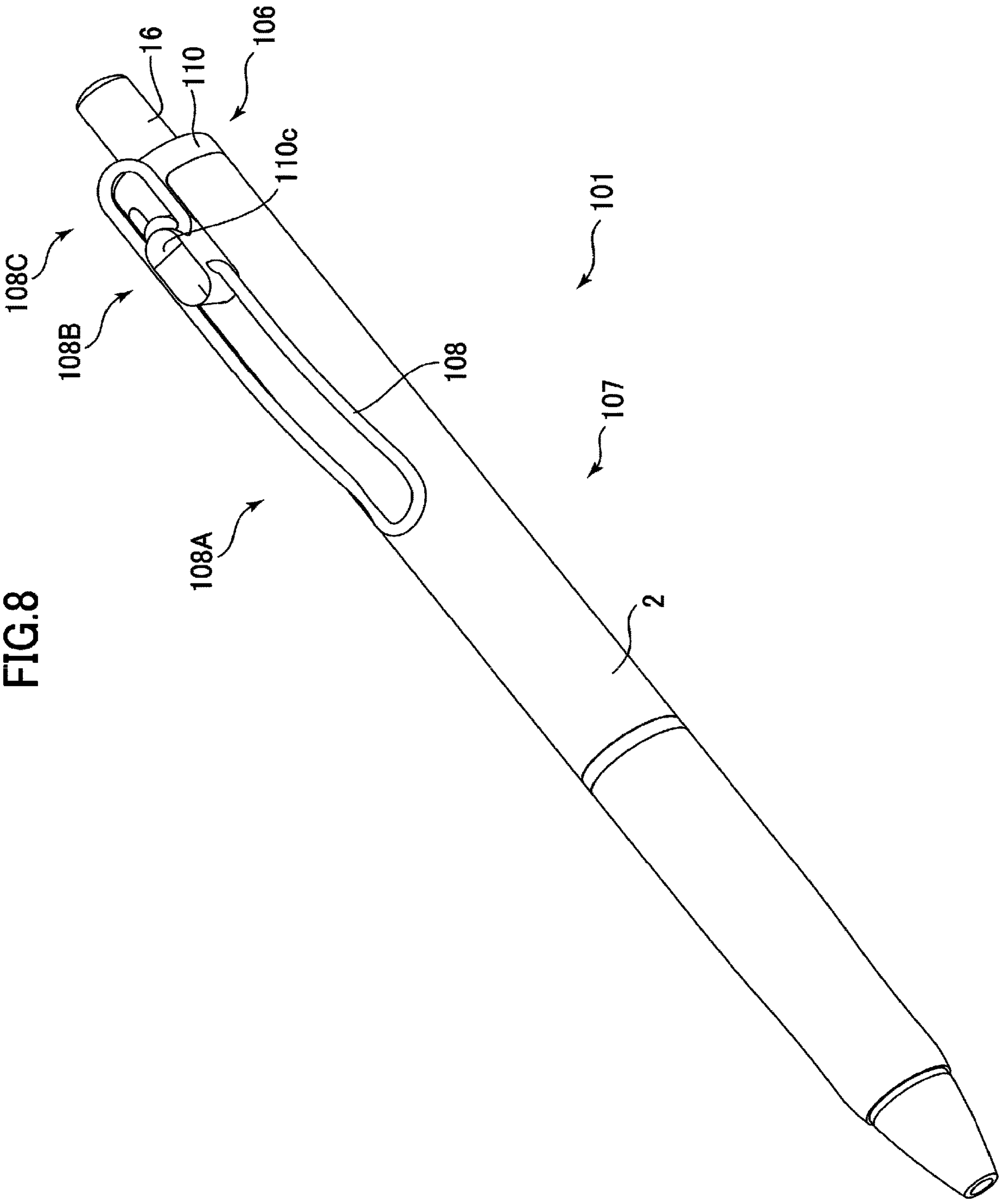
FIG. 8 is a perspective view showing a writing tool according to a second embodiment of the present invention.
Figure 9:
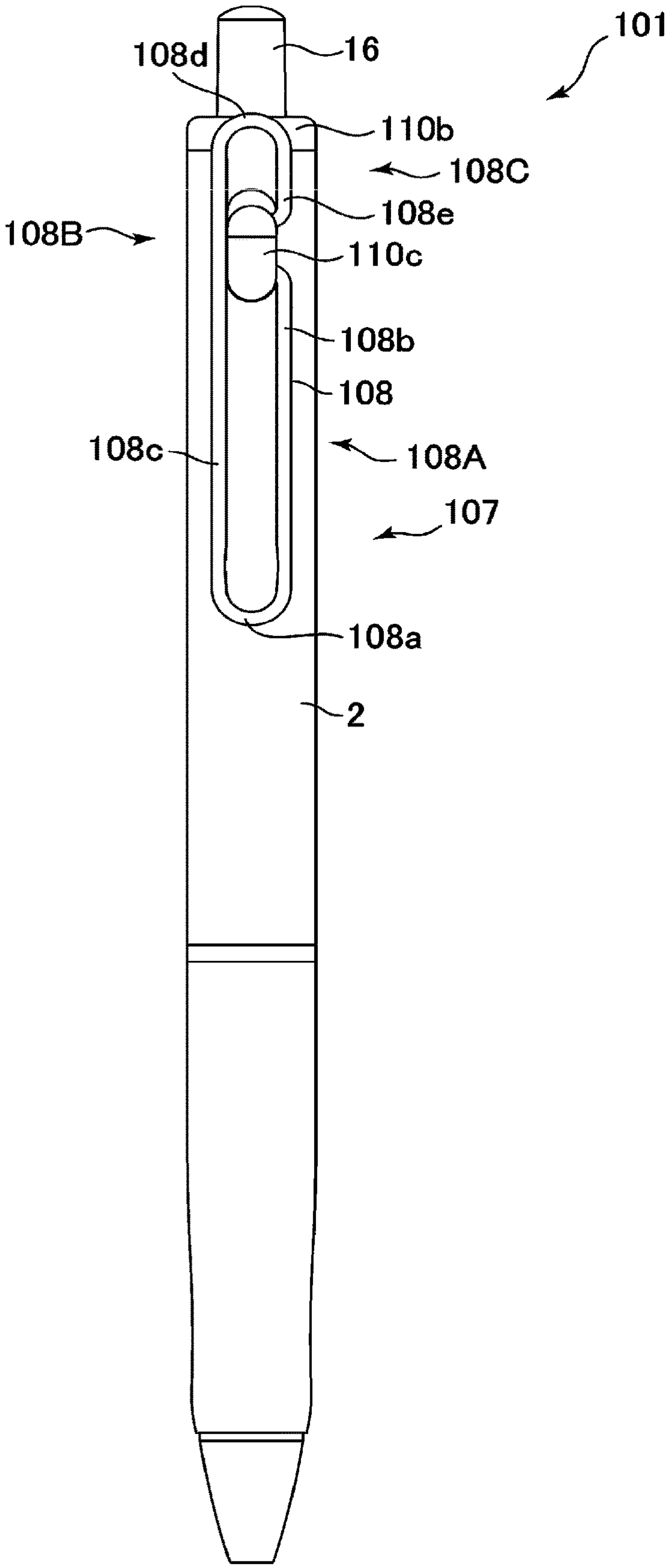
FIG. 9 is a front view showing the writing tool according to the second embodiment.
Figure 10:
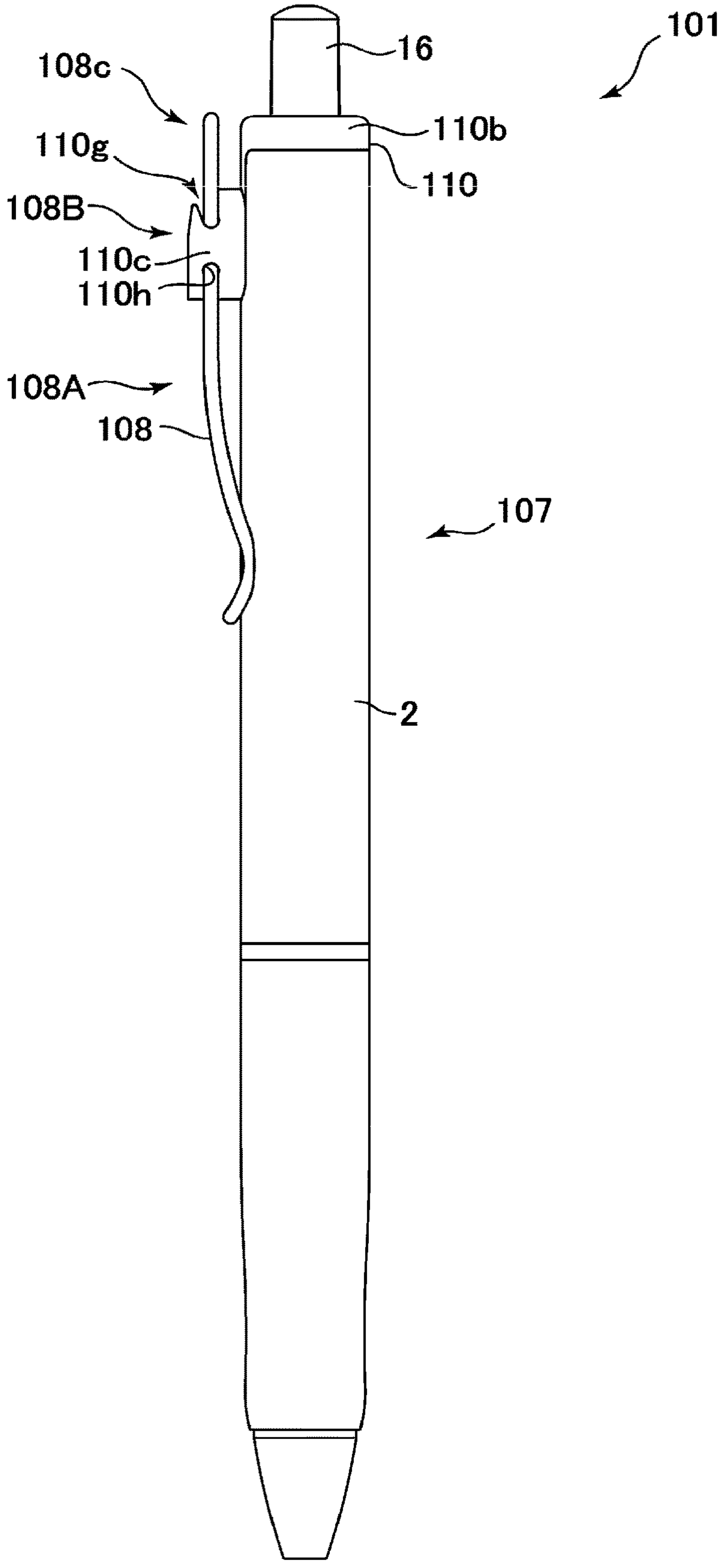
FIG. 10 is a side view showing the writing tool according to the second embodiment.
Figure 11:
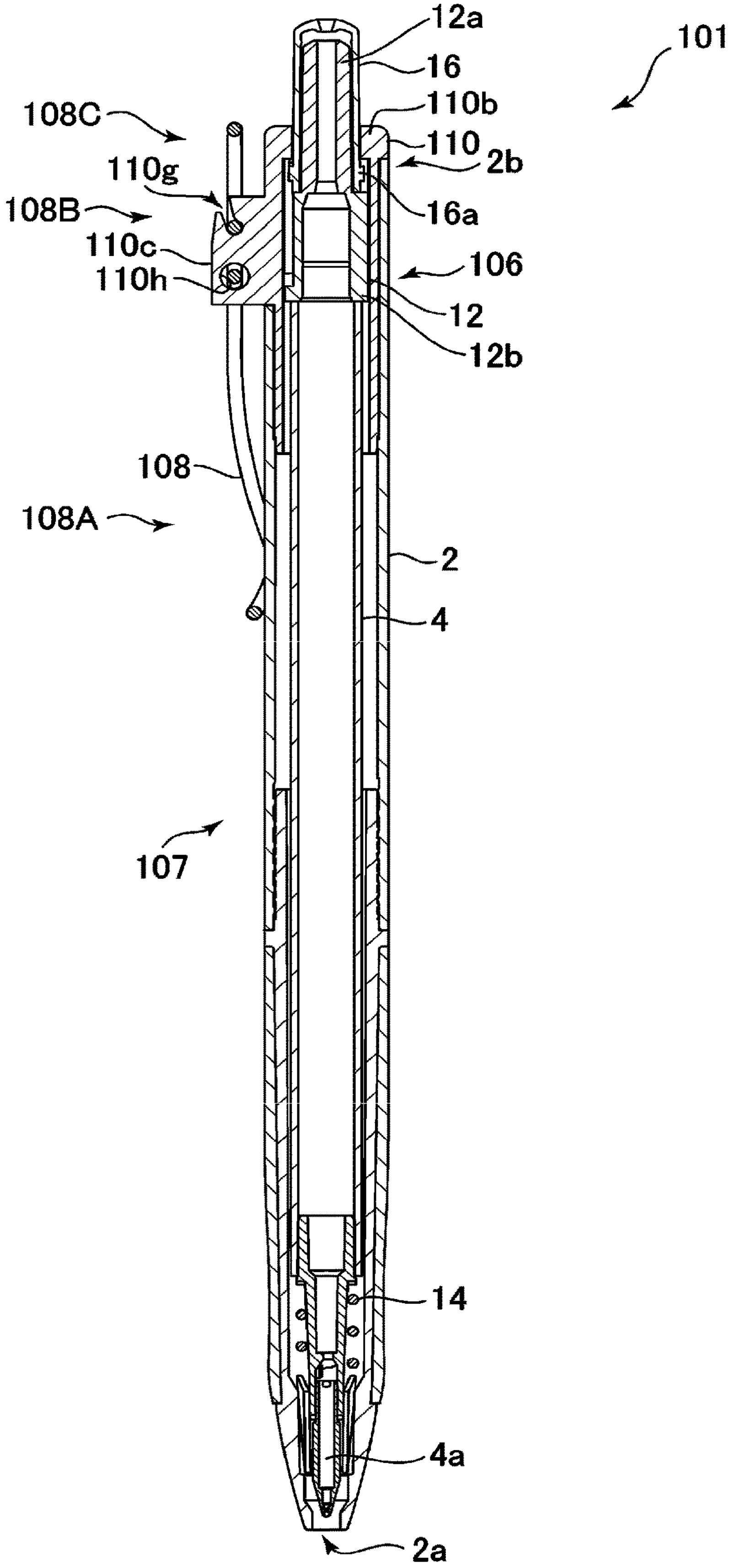
FIG. 11 is a sectional view showing a shaft tube of the writing tool illustrated in FIG. 8, taken along an axial direction.

FIGS. 8 to 11 illustrate the writing tool according to the second embodiment, wherein FIG. 8, FIG. 9 and FIG. 10 are, respectively, a perspective view, a front view and a side view. Further, FIG. 11 is a sectional view showing a shaft tube of the writing tool illustrated in FIG. 8, taken along the axial direction. The writing tool according to the second embodiment is a so-called "knock-type ballpoint pen", and configured to be switchable between a state in which a writing tip portion 4*a* of a refill element 4 protrudes from a fore-end of a shaft tube 2, and a state in which the writing tip portion 4*a* of the refill element 4 is housed in the shaft tube 2, through an operation of manually pushing down a knock member 16 at a back-end of the writing tool, as mentioned later. The writing tool 101 according to the second embodiment is different from the first embodiment in terms of only the configurations of the after-mentioned inner tube 110 and the after-mentioned clip member 108, and the remaining configurations are similar to those in the first embodiment.

As shown in FIGS. 8 to 11, the writing tool 102 according to the second embodiment comprises a tool body 107, and a clip member 108 held by a lateral portion of the tool body 107. The tool body 107 comprises a hollow cylindrical-shaped shaft tube 2, a refill element 4 housed in the shaft tube 2, and a knock mechanism 106 provided in a back-end of the shaft tube 2. The knock mechanism 106 comprises an inner tube 110, a rotor 12, a spring member 14, and a knock member 16.

Figure 12A:
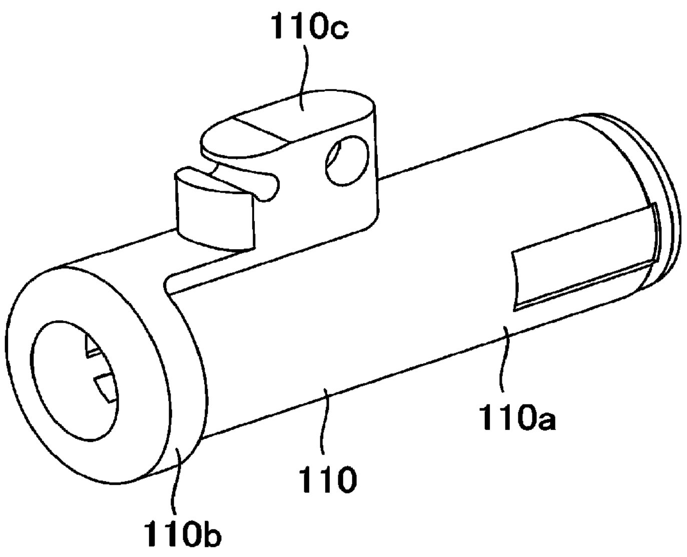
FIG. 12A is a perspective view showing an inner tube of the writing tool illustrated in FIG. 8.
Figure 12B:
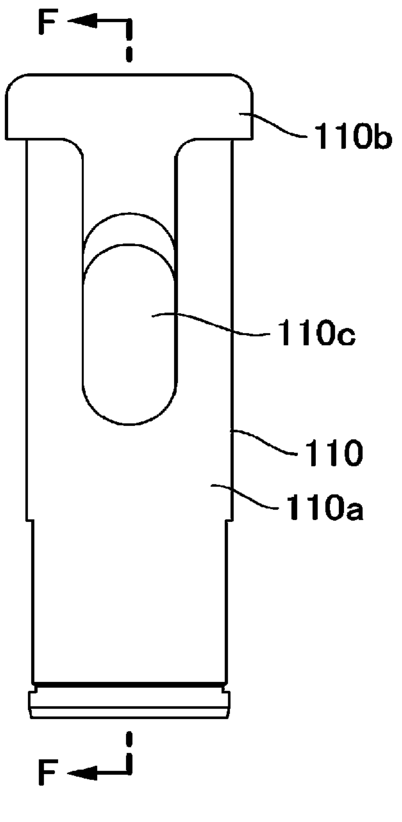
FIG. 12B is a front view showing the inner tube of the writing tool illustrated in FIG. 8.
Figure 12C:
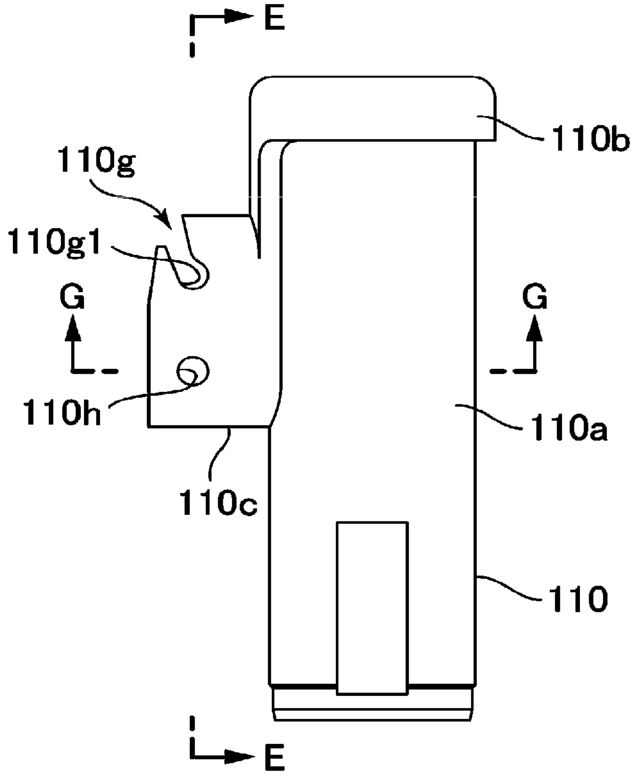
FIG. 12C is a right side view showing the inner tube of the writing tool illustrated in FIG. 8.
Figure 12D:
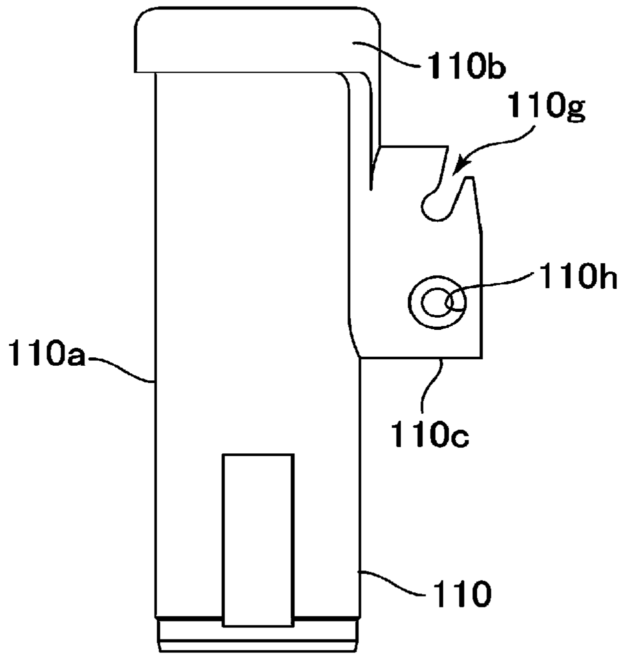
FIG. 12D is a left side view showing the inner tube of the writing tool illustrated in FIG. 8.
Figure 12E:
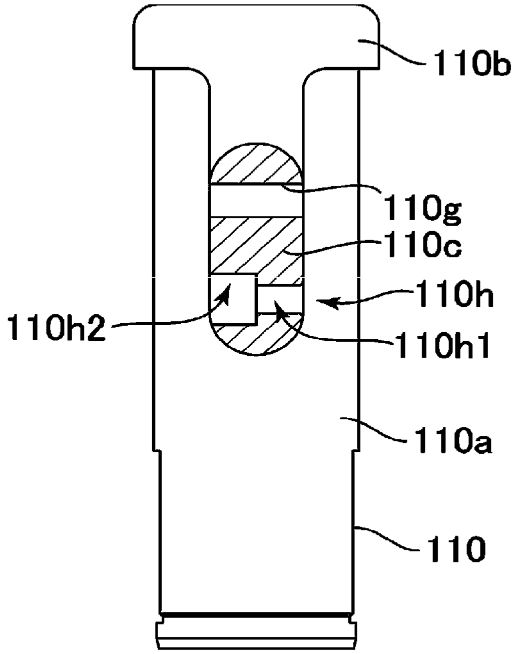
FIG. 12E is a sectional view taken along the line E-E of FIG. 12C.
Figure 12F:
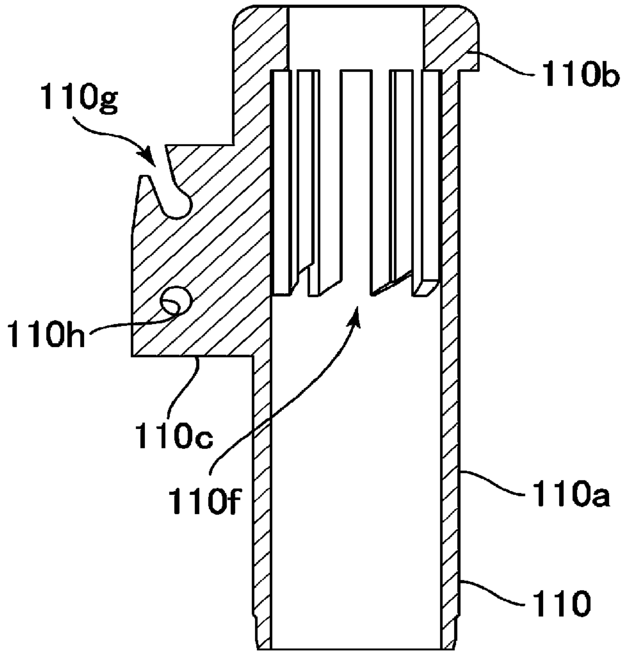
FIG. 12F is a sectional view taken along the line F-F of FIG. 12B.
Figure 12G:
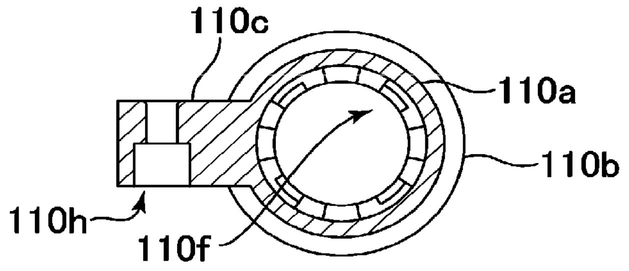
FIG. 12G is a sectional view taken along the line G-G of FIG. 12C.

FIGS. 12A to 12G illustrate the inner tube of the writing tool illustrated in FIG. 8, wherein FIG. 12A, FIG. 12B, FIG. 12C and FIG. 12D are, respectively, a perspective view, a front view, a right side view and a left side view. Further, FIG. 12E, FIG. 12F and FIG. 12G are, respectively, a sectional view taken along the line E-E of FIG. 12C, a sectional view taken along the line F-F of FIG. 12B and a sectional view taken along the line G-G of FIG. 12C. As shown in FIGS. 12A to 12G, the inner tube 110 comprises a hollow cylindrical-shaped tube body 110*a*, a back-end portion 110*b* connected to a back-end of the tube body 110*a*, and a clip mounting portion 110*c* connected to the back-end side of the tube body 110*a*. The tube body 110*a*, the back-end portion 110*b* and the clip mounting portion 110*c* are integrally formed.

The tube body 110*a* has an approximately hollow cylindrical shape, wherein the outer diameter of the tube body 110*a* is slightly less than the inner diameter of the shaft tube 2. The tube body 10*a* also has a cam portion 110*f* formed on an inner peripheral surface of the back-end thereof. The cam portion 110*f* is configured to, when the knock member 16 is manually pushed, rotate the rotor 12 in cooperation with the after-mentioned cam portion 12*b* of the rotor 12 so as to switch between a state in which a writing tip portion 4*a* of the refill element 4 protrudes from a fore-end opening 2*a* of the shaft tube 2, and a state in which the writing tip portion 4*a* of the refill element 4 is housed in the shaft tube 2. As a configuration of the cam portion 110*f* of the inner tube 110 and the cam portion 12*b* of the rotor 12, any of well-known configurations may be employed.

The back-end portion 110*b* is formed in a hollow cylindrical shape, wherein the outer diameter thereof is approximately equal to the outer diameter of the shaft tube 2. The back-end portion 110*b* has a circular through-hole formed to penetrate therethrough in a forward-backward direction.

The clip mounting portion 110*c* is provided with a given distance from the back-end of the tube body 110*a*, and formed in a columnar shape extending laterally outwardly. The clip mounting portion 110*c* is formed such that side surfaces thereof opposed in a transverse direction (rightward-leftward direction in FIG. 12B) are parallel to each other.

The clip mounting portion 110*c* has a first mounting cutout 110*g* formed in a back-end thereof. The first mounting cutout 110*g* is composed of a cutout extending from a radially outward edge of the back-end of the clip mounting portion 110*c* (left edge of an upper end of the clip mounting portion 110*c* in FIG. 12C) obliquely forwardly (obliquely downwardly in FIG. 12C) and radially inwardly (in a rightward direction in FIG. 12C). A columnar-shaped receiving part 110*g*1 is formed at a termination of the first mounting cutout 110*g*.

The clip mounting portion 110*c* also has a second mounting hole 110*h* formed in a fore-end thereof to penetrate therethrough in the transverse direction. The second mounting hole 110*h* has a right-side base end part 110*h*1 and a left-side relief part 110*h*2. The base end part 110*h*1 is opened on the right side surface of the clip mounting portion 110*c*, and formed in a columnar shape. The relief part 110*h*2 is opened on the left side surface of the clip mounting portion 110*c*, and formed in a columnar shape having a diameter greater than that of the base end part 110*h*1.

The receiving part 110*g*1 of the first mounting cutout 110*g* and the second mounting hole 110*h* are aligned in the longitudinal direction (i.e., they are located at an equal distance from a central axis of the inner tube 110), wherein the first mounting cutout 110*g* is formed backward of the second mounting hole 110*h*.

The configurations of the rotor 12, the knock member 16 and the spring member 14 are similar to those of the first embodiment.

In an assembled state, the inner tube 110 is disposed such that the tube body 110*a* is inserted from a back-end opening 2*b* of the shaft tube 2 and located inside the shaft tube 2, and the back-end portion 110*b* is in contact with a back-end edge of the shaft tube 2. The knock member 16 is inserted through the through-hole of the back-end portion 110*b* of the inner tube 110 from the forward side, and a protrusion 16*a* of the knock member 16 is located inside the tube body 110*a* of the inner tube 110. Abase end portion 12*a* of the rotor 12 is inserted inside the knock member 16 from the forward side, and a fore-end edge of the knock member 16 is in contact with a back-end surface of the cam portion 12*b* of the rotor 12. Further, a fore-end surface of the cam portion 12*b* of the rotor 12 is in contact with the refill element 4. Thus, the rotor 12 and the knock member 16 are biased backwardly through the refill element 4.

When the knock member 16 is pushed down in the above state, the rotor 12 is rotated to switch between a state in which convex parts of the cam portion 12*b* of the rotor 12 are meshed with concave parts of the cam portion 110*f* of the inner tube 110, and a state in which tops of convex parts of the cam portion 110*f* of the inner tube 110 are in contact with respective tops of the convex parts of the cam portion 12*b* of the rotor 12, and thereby switch between a state in which the writing tip portion 4*a* of the refill element 4 is housed in the shaft tube 2, and a state in which the writing tip portion 4*a* of the refill element 4 protrudes from a fore-end of the shaft tube 2.

Figure 13A:
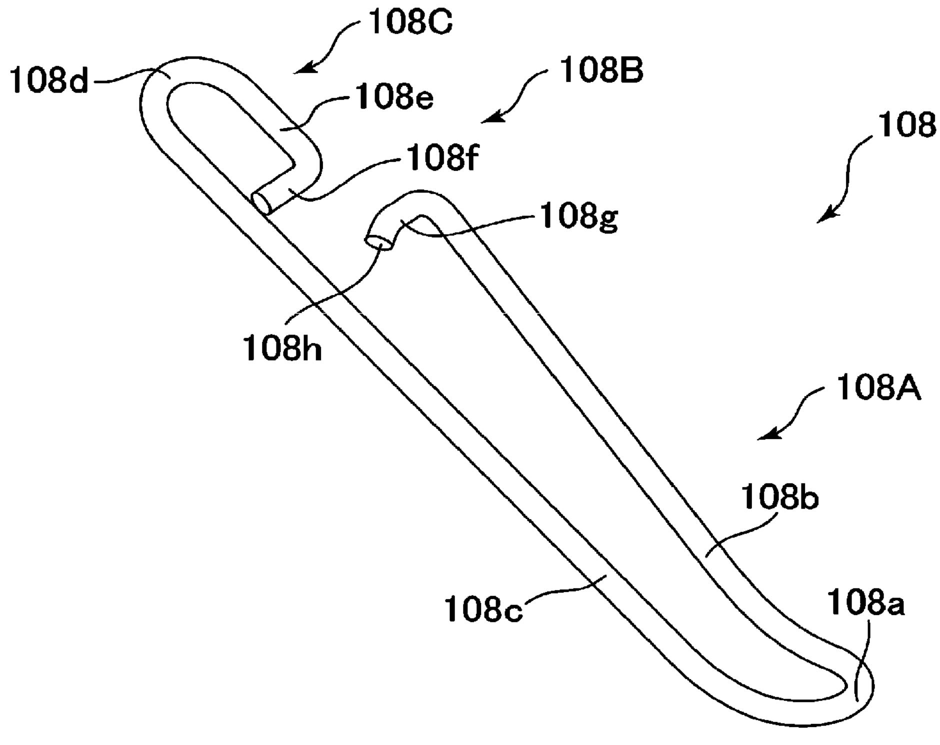
FIG. 13A is a perspective view showing a clip member of the writing tool illustrated in FIG. 8.
Figure 13B:
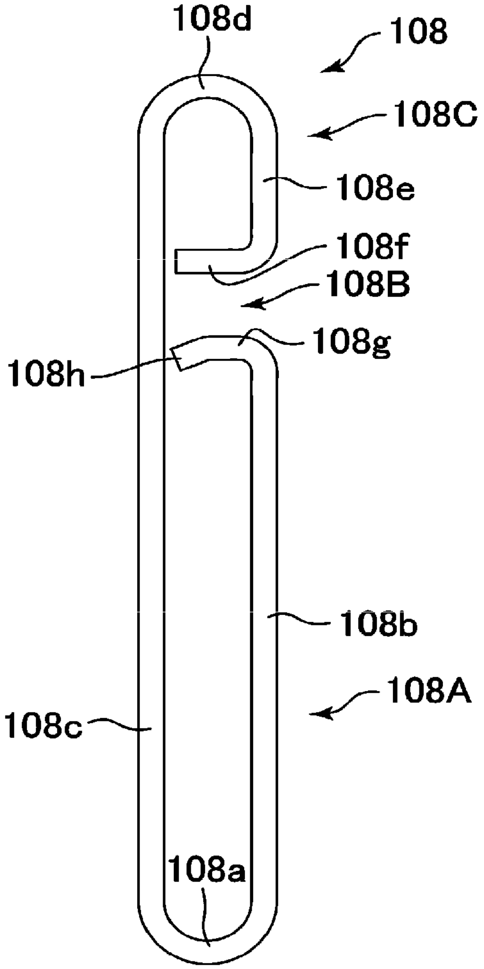
FIG. 13B is a front view showing the clip member of the writing tool illustrated in FIG. 8.
Figure 13C:
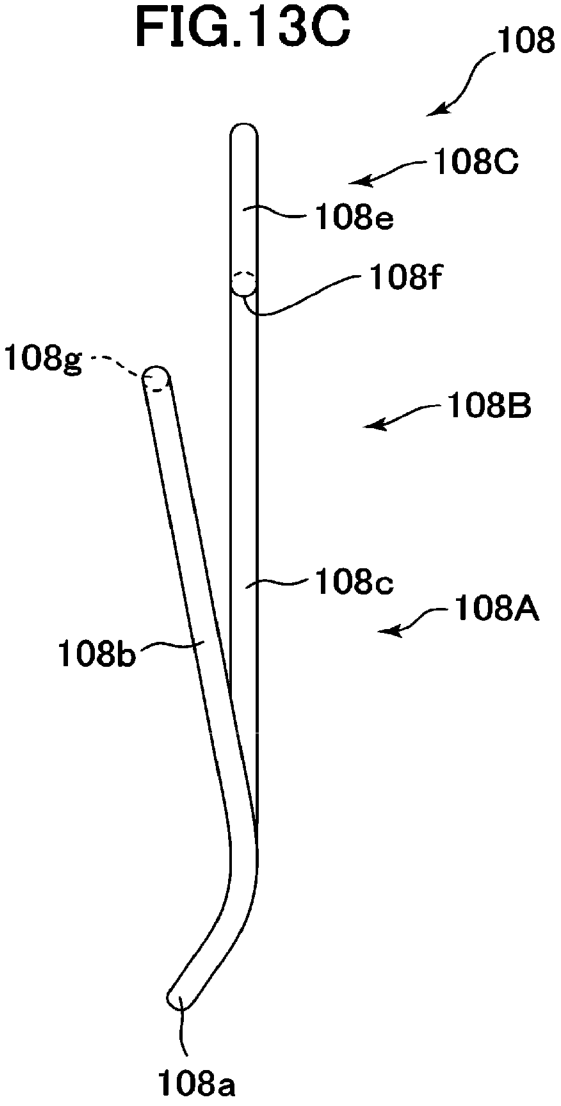
FIG. 13C is a side view showing the clip member of the writing tool illustrated in FIG. 8.

FIGS. 13A to 13C illustrate the clip member of the writing tool illustrated in FIG. 8, wherein FIG. 13A, FIG. 13B and FIG. 13C are, respectively, a perspective view, a front view and a side view. It should be noted here that FIG. 13A to 13C show the clip member in a state in which it is detached from the inner tube. As shown in FIGS. 13A to 13C, the clip member 108 is formed by subjecting a single piece of metal wire rod made of stainless steel or the like to bending. The clip member 108 has: a fore-end section 108A formed in a U shape; a back-end section 108C formed in a U shape; and an intermediate section 108B between the fore-end section 108A and the back-end section 108C.

The fore-end section 108A is composed of a forward part of a first longitudinal portion 108*b*, a forward part of a second longitudinal portion 108*c*, and a first arc-shaped portion 108*a* connecting a fore-end of the first longitudinal portion 108*b* and a fore-end of the second longitudinal portion 108*c*. The first longitudinal portion 108*b* extends backwardly from a right (right side in FIG. 13B) end of the first arc-shaped portion 108*a* to the intermediate section 108B. The second longitudinal portion 108*c* extends backwardly from a left (left side in FIG. 13B) end of the first arc-shaped portion 108*a* to the back-end section 108C beyond the intermediate section 108B.

The back-end section 108C is composed of: a back-end of the second longitudinal portion 108*c*; a second arc-shaped portion 108*d* extending arcurately and rightwardly (in a rightward direction in FIG. 13B) from the back-end of the second longitudinal portion 108*c*; and a third longitudinal portion 108*e* extending forwardly from a right (right side in FIG. 13B) end of the second arc-shaped portion 108*d*.

The intermediate section 108B has a first end 108*f* extending leftwardly (in a leftward direction in FIG. 13B) from a fore-end of the third longitudinal portion 108*e*, and a second end 108*g* extending leftwardly (in the leftward direction in FIG. 13B) from a back-end of the first longitudinal portion 108*b*. The second end 108*g* has a bent part 108*h* formed in a distal area thereof to extend obliquely forwardly and leftwardly.

In a state in which the clip member 108 is detached from the inner tube 110, the first longitudinal portion 108*b* is tilted such that it extends obliquely backwardly and radially outwardly (in a leftward direction in FIG. 13C), with respect to a direction along which the second longitudinal portion 108*c* extends. Thus, the first end 108*f* is located closer to the tool body than the second end 108*g*.

In the assembled state, the receiving part 110*g*1 of the first mounting cutout 110*g* and the second mounting hole 110*h* of the clip mounting portion 110*c* of the inner tube 110 are arranged such that they are aligned in the longitudinal direction with a given distance from an outer peripheral surface of the shaft tube 2. The first end 108*f* and the second end 108*g* are inserted, respectively, into the first mounting cutout 110*g* and the second mounting hole 110*h* in the clip mounting portion 110*c* of the inner tube 110, so as to fix the clip member 108. At this time, the bent part 108*h* in the distal area of the second end 108*g* is located within the relief part 110*h*2 of the second mounting hole 110*h*. Thus, the clip member 108 is attached in a state in which it is deformed such that the first longitudinal portion 108*b* becomes approximately parallel to the second longitudinal portion 108*c*.

In this way, the intermediate section 108B of the clip member 108 is held by the clip mounting portion 110*c*. Further, since the clip member 108 is attached in the deformed state as mentioned above, the fore-end section 108A is biased toward the tool body 7 by an elastic force of the metal wire rod composing the clip member 108. Therefore, in a state in which the clip member 108 is attached to the inner tube 110, the fore-end section 108A of the clip member 108 is in contact with the outer peripheral surface of the shaft tube 2 of the tool body 107, as shown in FIG. 10.

Figure 14A:
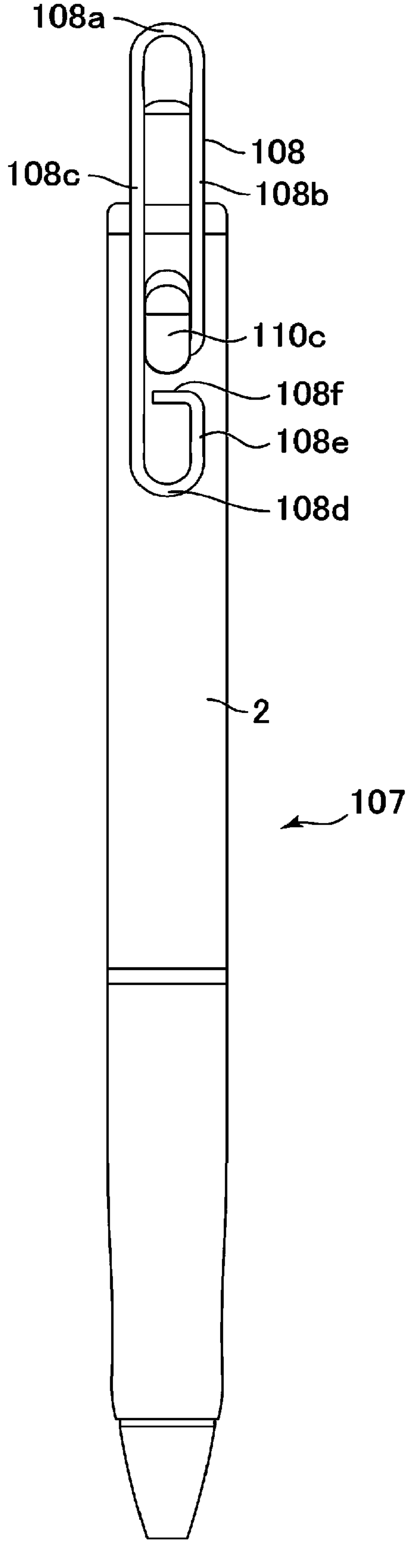
FIG. 14A is a front view for explaining a method to attach the clip member of the writing tool according to the second embodiment (part 1).
Figure 14B:
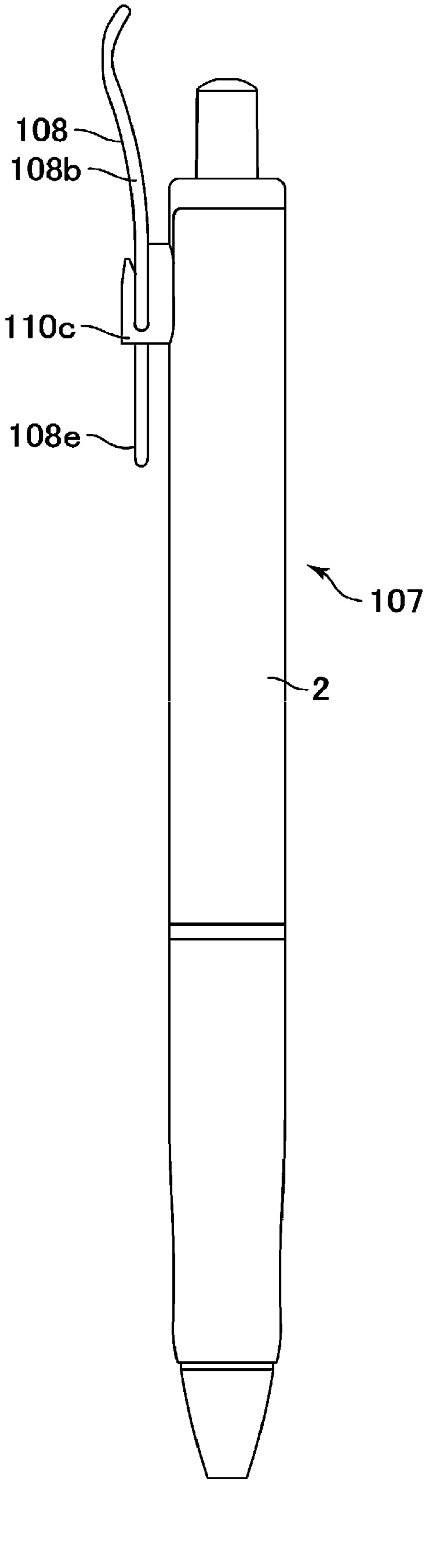
FIG. 14B is a side view for explaining the method to attach the clip member of the writing tool according to the second embodiment (part 1).

In an operation of attaching the clip member 108, as shown in FIGS. 14A and 14B, in a state in which fore-and back-ends and obverse and reverse sides of the clip member 108 are inverted (i.e., the second end 108*g* is located backward of the first end 108*f* and closer to the tool body 107 than the first end 108*f*), the bent part 108*h* of the second end 108*g* is first inserted into the base end part 110*h*1 of the second mounting hole 110*h*, and then the second end 108*g* is further inserted into the second mounting hole 110*h* such that the bent part 108*h* is located within the relief part 110*h*2, by rotating the clip member 108 about the second end 108*g* such that the first arc-shaped portion 108*a* is positioned at the back end-side.

Figure 15A:
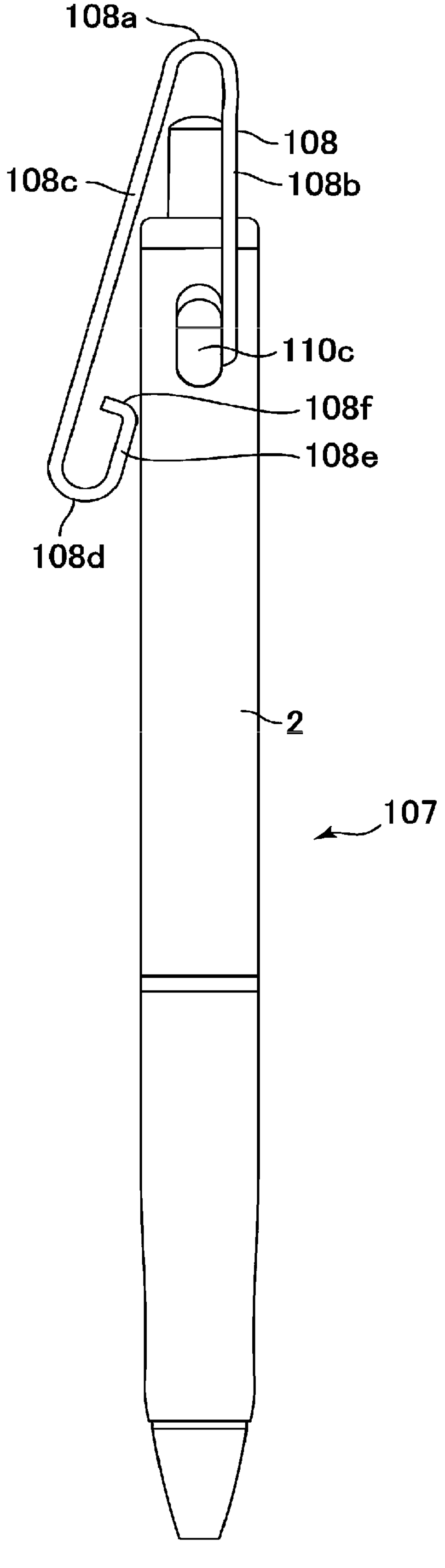
FIG. 15A is a front view for explaining the method to attach the clip member of the writing tool according to the second embodiment (part 2).
Figure 15B:
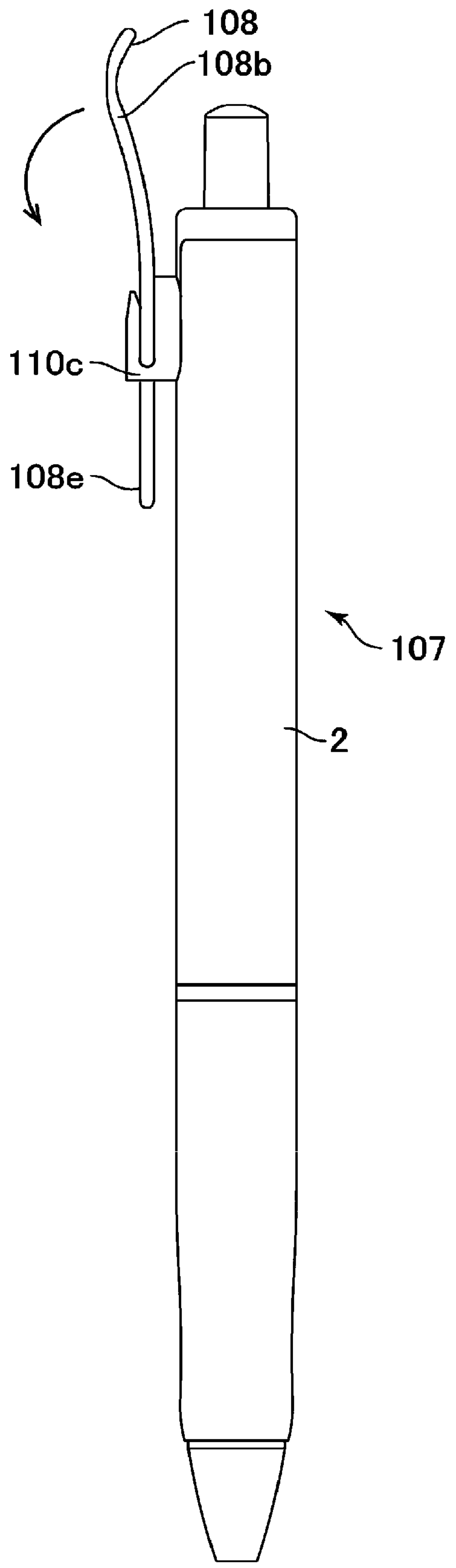
FIG. 15B is a side view for explaining the method to attach the clip member of the writing tool according to the second embodiment (part 2).

Subsequently, as shown in FIGS. 15A and 15B, the first arc-shaped portion 108*a* is curved such that a part of the second longitudinal portion 108*c* on the side of the second arc-shaped portion 108*d* is located on the left side of the tool body 107. Then, as indicated by the arrowed line in FIG. 15B, the clip member 108 is rotated about the second end 108*g* such that the first arc-shaped portion 108*a* is located at a forwardmost position.

Figure 16:
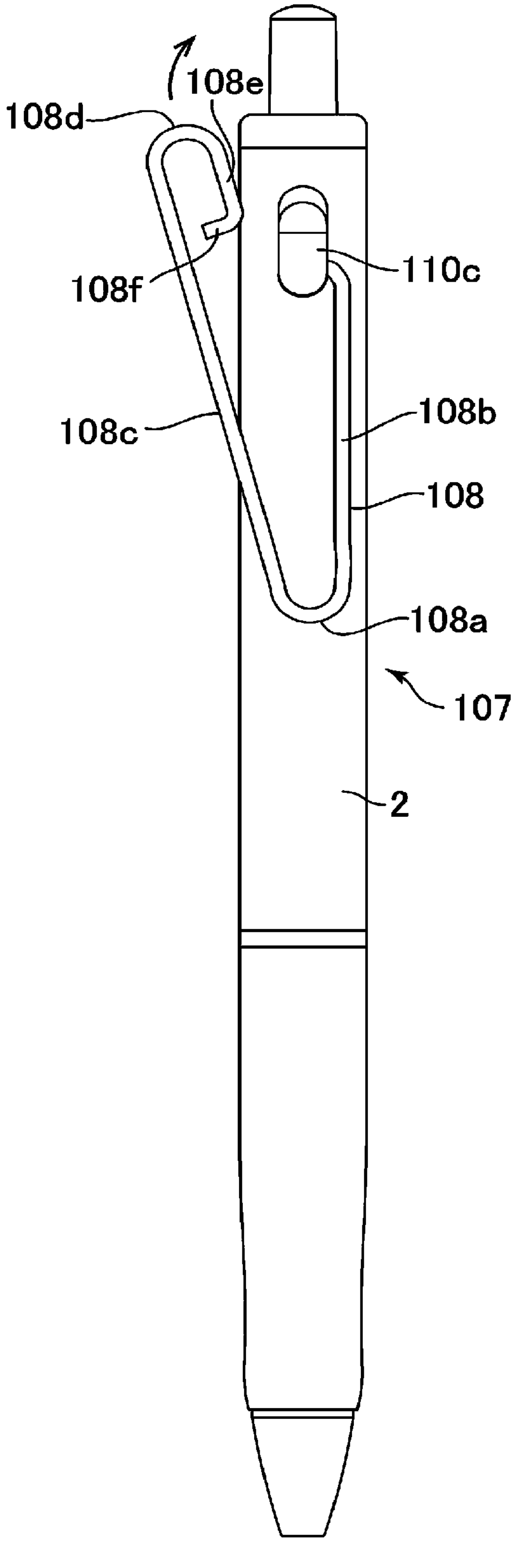
FIG. 16 is a front view for explaining the method to attach the clip member of the writing tool according to the second embodiment (part 3).

Subsequently, as shown in FIG. 16, the third longitudinal portion 108*e* and the first end 108*f* are inserted into the first mounting cutout 110*g* from a lateral side thereof to allow the first end 108*f* to be disposed in the receiving part 110*g*1. In this way, the clip member 108 can be attached to the clip mounting portion 110*c*. Here, the clip member 108 in an attached state in which the first end 108*f* is disposed in the receiving part 110*g*1 can not detached unless the clip member 108 or the inner tube 110 is destroyed.

Figure 17:
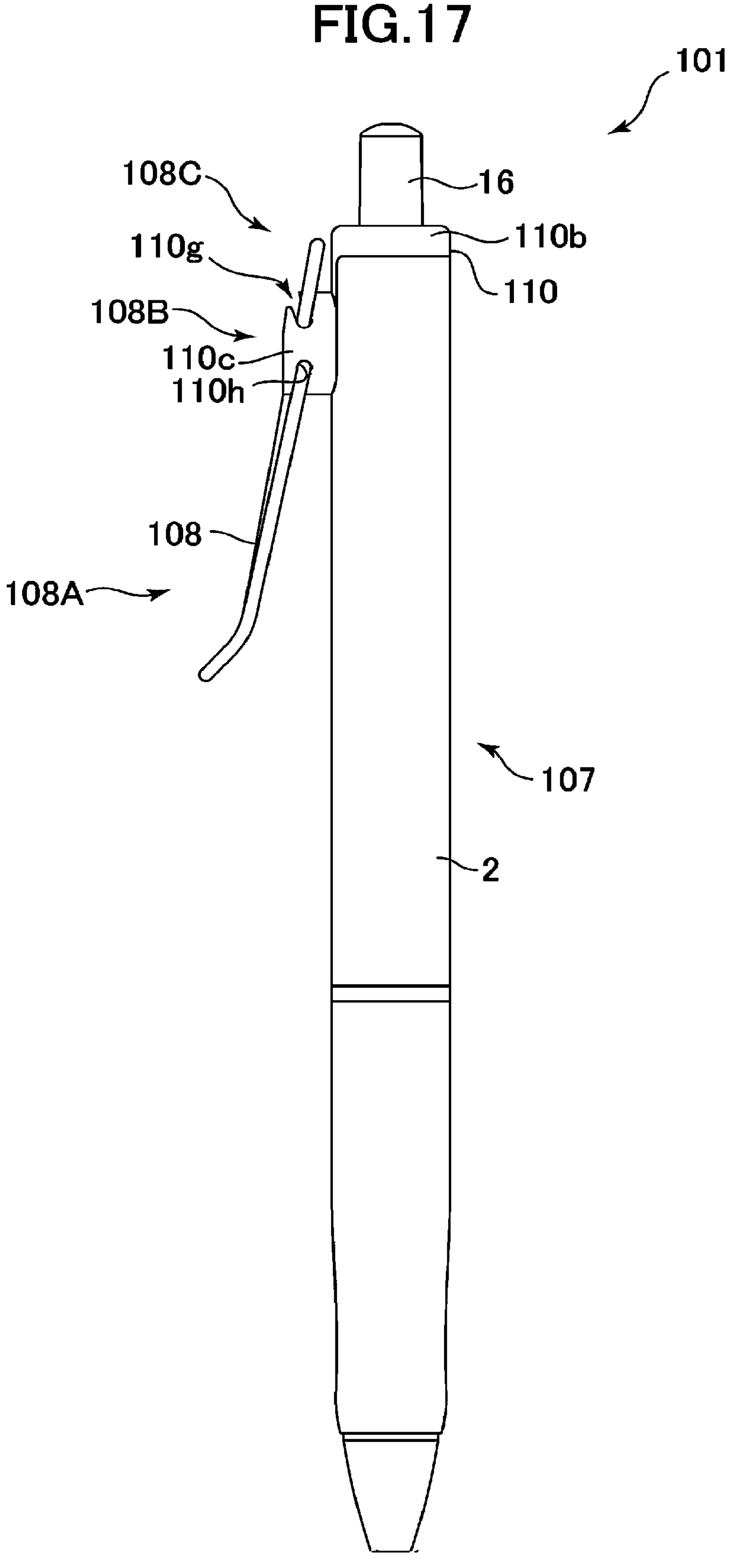
FIG. 17 is a side view showing a state in which the clip of the writing tool according to the second embodiment is opened.

FIG. 17 is a side view showing a state in which the clip of the writing tool according to the second embodiment is opened. When the back-end section 108C of the clip member 108 is pushed radially inwardly toward the tool body 107, the fore-end section 108A of the clip member 108 is swung about a fulcrum consisting of the intermediate section 108B held by the clip mounting portion 110*c*, i.e., moved radially outwardly to be spaced apart from the tool body 107, as shown in FIG. 17. Therefore, a user of the writing tool 101 according to the second embodiment can push down the back-end section 108C of the clip member 108 in a state in which he/she grips the shaft tube 2 of the tool body 107 by the index finger, middle finger, ring finger, little finger of one hand, thereby causing the fore-end section 108A of the clip member 108 to be spaced apart from the tool body 107 to open the clip member 108 with respect to the tool body 107.

The second embodiment can bring out the following advantageous effects.

In the second embodiment, the intermediate section 108B of the clip member 108 is held by the lateral portion of the tool body 107, and, when the back-end section 108C of the clip member 108 is pushed toward the tool body 107, the fore-end section 108A of the clip member 108 is swung to be spaced apart from the tool body 107. Thus, the back-end section 108C of the clip member 108 can be pushed down in a state in which the shaft tube 2 of the tool body 107 is gripped by the index finger, middle finger, ring finger, little finger of one hand, thereby opening the clip member 108 by one-handed manipulation.

In the second embodiment, the fore-end section 108A is biased toward the tool body 107 by elasticity of the wire rod composing the clip member 108, so that the clip member 108 can be composed by a simple configuration, without using any biasing member such as a spring.

In the second embodiment, the second mounting hole 110*h* is composed of a transversely-extending hole, and formed with the relief part 110*h*2, and the bent part 108*h* of the second end 108*g* is disposed in the relief part 110*h*2. Thus, the bent part 108*h* formed in the second end 108*g* of the clip member 108 can prevent the clip member 108 from dropping off from the second mounting hole 110*h*.

Here, in the second embodiment, the first mounting cutout 110*g* is formed of a cutout, and the second mounting hole 110*h* is formed of a transversely-extending hole. Alternatively, the cutout may be changed to a transversely-extending hole, or the transversely-extending hole may be changed to a cutout. Further, in the second embodiment, the bent part 108*h* is formed in the second end 108*g* of the clip member 108. Alternatively, such a bent part may be provided in the first end 108*f*.

Further, in the second embodiment, the clip mounting portion 110*c* is provided in the inner tube 110, and the clip member 108 is attached to the clip mounting portion 110*c*. Alternatively, such a clip mounting portion may be provided on a lateral surface of the shaft tube 2, and the clip member 108 may be attached thereto.

Further, in the second embodiment, the first mounting cutout 110*g* and the second mounting hole 110*h* are aligned in the longitudinal direction, and, in the state in which the clip member 108 is detached from the inner tube 110, the first end 108*f* is located closer to the tool body than the second end 108*g*. However, the present invention is not limited thereto. For example, even in a case where the clip member 108 is formed in a flat shape, the writing tip-side second mounting hole 110*h* may be formed closer to the tool body 107 than the first mounting cutout 110*g*. In this case, the fore-end section of the clip member 108 can also be biased toward the tool body 107.

Further, although the second embodiment has been described based on an example where the present invention is applied to a knock-type ballpoint pen, a writing tool to which the present invention is applicable is not limited thereto. For example, the present invention is also applicable to a knock-type mechanical pencil, and a writing tool equipped with no knock mechanism. Further, the present invention may be applied in a case where a clip is attached to a cap of a cap-type writing tool.

Third Embodiment

Next, with reference to the drawings, a writing tool according to a third embodiment of the present invention will be described in detail. In the following description, a similar element or component to that in the second embodiment will be assigned with the same reference sign, and detailed description thereof will be omitted.

Figure 18:
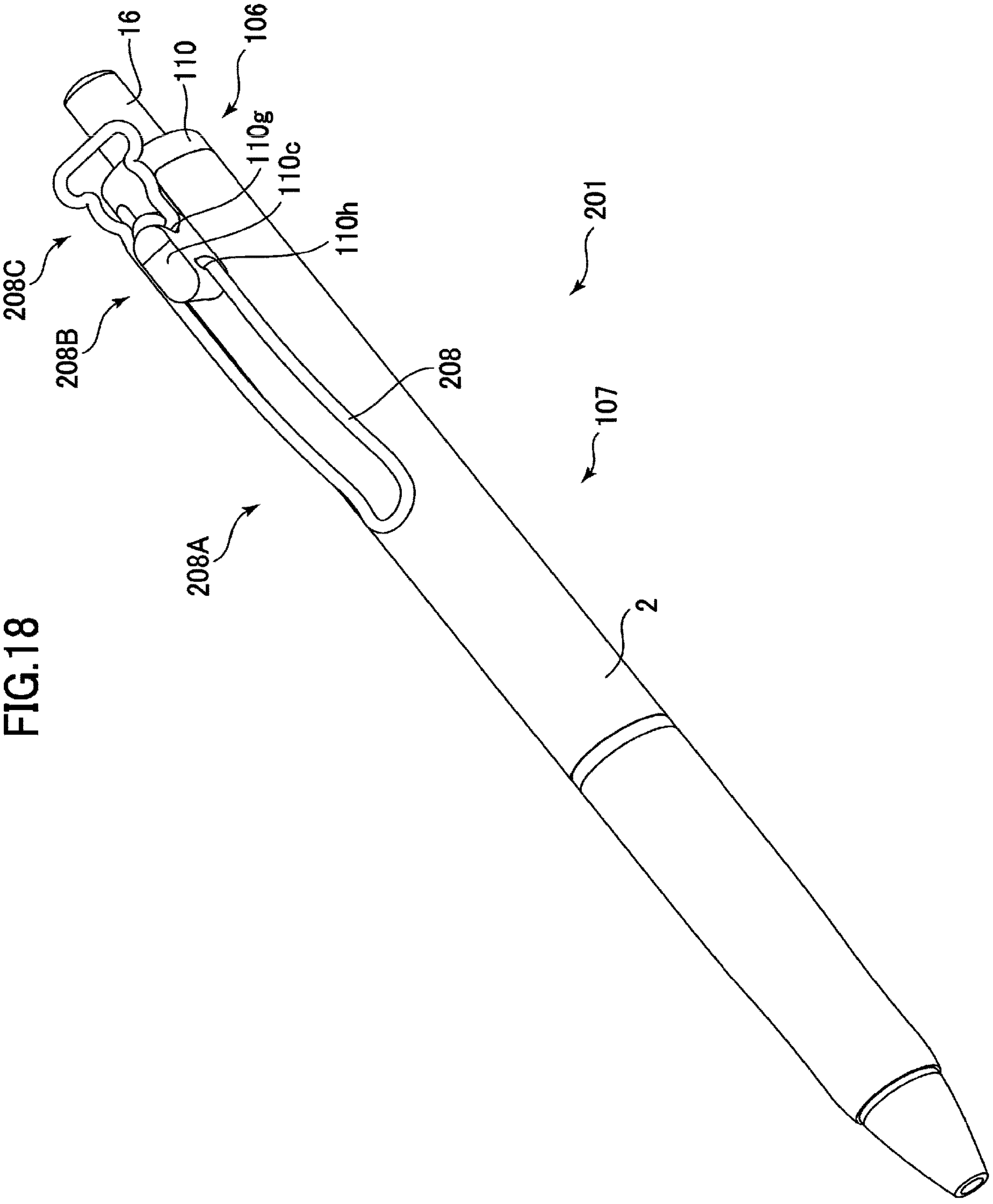
FIG. 18 is a perspective view showing a writing tool according to a third embodiment of the present invention.

FIG. 18 is a perspective view showing the writing tool according to the third embodiment. As shown in FIG. 18, the writing tool 202 according to the third embodiment comprises a tool body 107, and a clip member 208 held by a lateral portion of the tool body 107. The writing tool 201 according to the third embodiment is different from the second embodiment in terms of only the configuration of the clip member 208, and the remaining configurations are similar to those in the second embodiment.

Figure 19A:
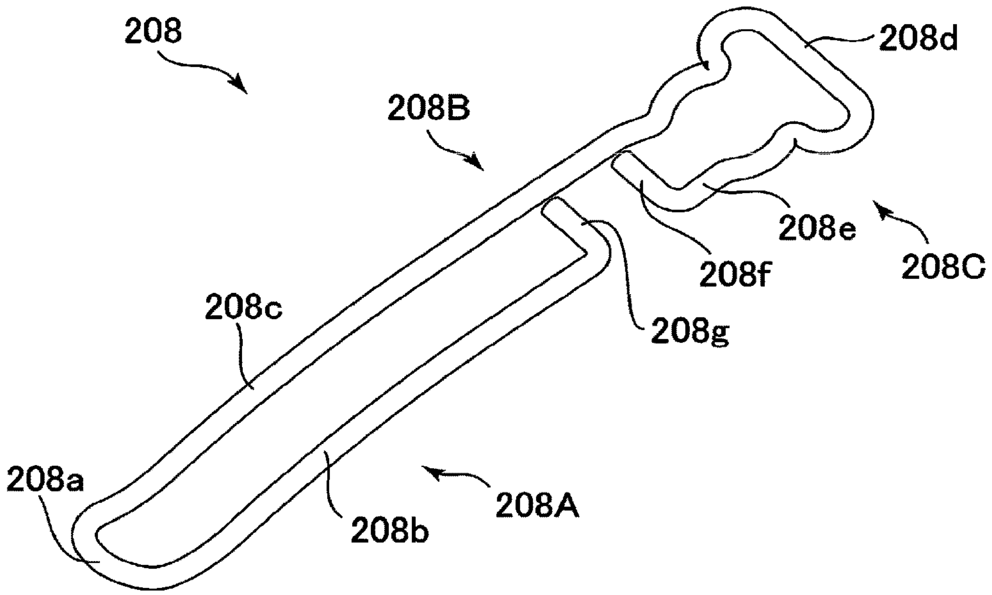
FIG. 19A is a perspective view showing a clip member of the writing tool illustrated in FIG. 18.
Figure 19B:
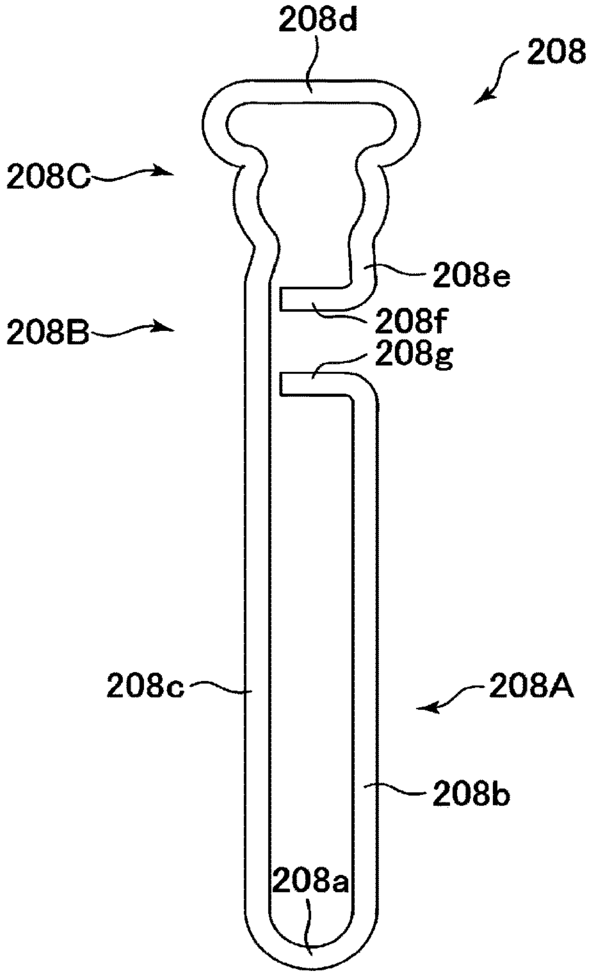
FIG. 19B is a front view showing the clip member of the writing tool illustrated in FIG. 18.
Figure 19C:
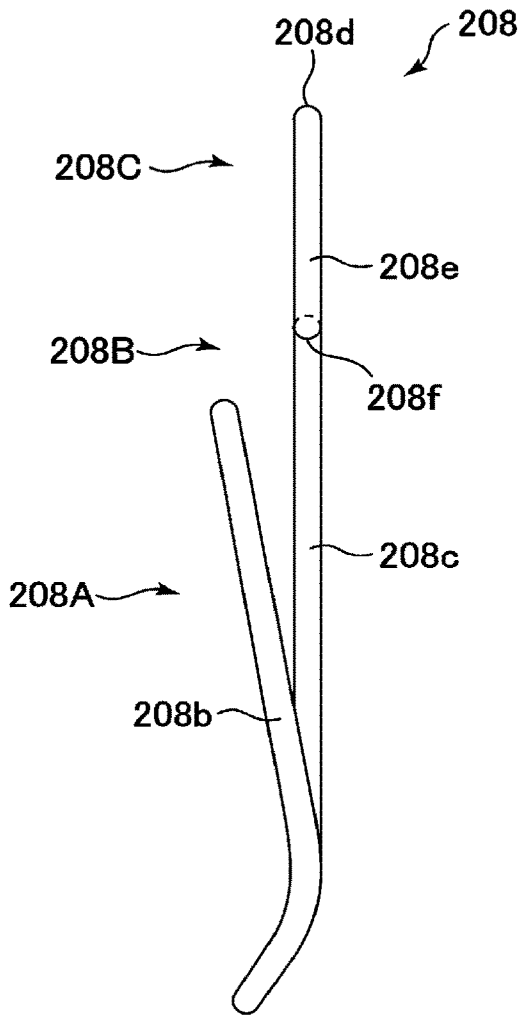
FIG. 19C is a side view showing the clip member of the writing tool illustrated in FIG. 18.

FIGS. 19A to 19C illustrate the clip member of the writing tool illustrated in FIG. 18, wherein FIG. 19A, FIG. 19B and FIG. 19C are, respectively, a perspective view, a front view and a side view. It should be noted here that FIG. 19C shows the clip member in a state in which it is detached from an inner tube 110.

As shown in FIGS. 19A to 19C, the clip member 208 is formed by subjecting a single piece of metal wire rod made of stainless steel or the like to bending. The clip member 208 has: a fore-end section 208A formed in a U shape; a back-end section 208C formed in a figure shape; and an intermediate section 208B between the fore-end section 208A and the back-end section 208C.

The fore-end section 208A is composed of a forward part of a first longitudinal portion 208*b*, a forward part of a second longitudinal portion 208*c*, and a first arc-shaped portion 208*a* connecting a fore-end of the first longitudinal portion 208*b* and a fore-end of the second longitudinal portion 208*c*. The first longitudinal portion 208*b* extends backwardly from a right (right side in FIG. 19B) end of the first arc-shaped portion 208*a* to the intermediate section 208B. The second longitudinal portion 208*c* extends backwardly from a left (left side in FIG. 19B) end of the first arc-shaped portion 208*a* to the back-end section 208C beyond the intermediate section 208B.

The back-end section 208C is composed of: a back-end of the second longitudinal portion 208*c*; a figure portion 208*d* formed in a figure shape imitating a character such as an animal; and a third longitudinal portion 208*e* extending forwardly from a right (right side in FIG. 19B) end of the second arc-shaped portion 208*d*. The shape of the figure portion 208*d* is not limited to a character such as an animal, but may be any other shape imitating a letter or a pattern.

The intermediate section 108B has a first end 208*f* extending leftwardly (in a leftward direction in FIG. 19B) from a fore-end of the third longitudinal portion 208*e*, and a second end 208*g* extending leftwardly (in the leftward direction in FIG. 19B) from a back-end of the first longitudinal portion 208*b*.

In a state in which the clip member 208 is detached from the inner tube 110, the first longitudinal portion 208*b* is tilted such that it extends obliquely backwardly and radially outwardly (in a leftward direction in FIG. 19C), with respect to a direction along which the second longitudinal portion 208*c* extends. Thus, the first end 208*f* is located closer to the tool body than the second end 208*g*.

In an assembled state, the first end 208*f* and the second end 208*g* are inserted, respectively, into a first mounting cutout 110*g* and a second mounting hole 110*h* in a clip mounting portion 110*c* of the inner tube 110, so as to fix the clip member 208. Thus, the clip member 208 is attached in a state in which it is deformed such that the first longitudinal portion 208*b* becomes approximately parallel to the second longitudinal portion 208*c*.

In this way, the intermediate section 208B of the clip member 208 is held by the clip mounting portion 110*c*. Further, since the clip member 208 is attached in the deformed state as mentioned above, the fore-end section 208A is biased toward the tool body 107 by an elastic force of the metal wire rod composing the clip member 208.

Therefore, in a state in which the clip member 208 is attached to the inner tube 110, the fore-end section 208A of the clip member 208 is in contact with an outer peripheral surface of a shaft tube 2 of the tool body 107, as shown in FIG. 18.

In the third embodiment, when the back-end section 208C of the clip member 208 is pushed radially inwardly toward the tool body 107, the fore-end section 208A of the clip member 208 is swung about a fulcrum consisting of the intermediate section 208B held by the clip mounting portion 110*c*, i.e., moved radially outwardly to be spaced apart from the tool body 107. Therefore, a user of the writing tool 201 according to the third embodiment can push down the back-end section 208C of the clip member 208 in a state in which he/she grips the shaft tube 2 of the tool body 107 by the index finger, middle finger, ring finger, little finger of one hand, thereby causing the fore-end section 208A of the clip member 208 to be spaced apart from the tool body 107 to open the clip member 208 with respect to the tool body 107.

In addition to the effects of the second embodiment, the third embodiment can bring out the following advantageous effect.

In the third embodiment, since the figure portion 208*d* obtained by bending the wire rod is formed in the back-end section 208C of the clip member 208, an aesthetic property can be given to the clip member 208.

It should be noted that a structure for attaching the clip member 208 to the tool body 107 is not limited to that in the third embodiment, but may employ a similar structure as that in the first or second embodiment. In the third embodiment, a figure shape is formed in the back-end section 208C. Alternatively, it may be formed in the fore-end section 208A or the like.

Further, in the third embodiment, the clip mounting portion 110*c* is provided in the inner tube 110, and the clip member 208 is attached to the clip mounting portion 110*c*. Alternatively, such a clip mounting portion may be provided on a lateral surface of the shaft tube 2, and the clip member 208 may be attached thereto.

Fourth Embodiment

Next, with reference to the drawings, a writing tool according to a fourth embodiment of the present invention will be described in detail.

Figure 20A:
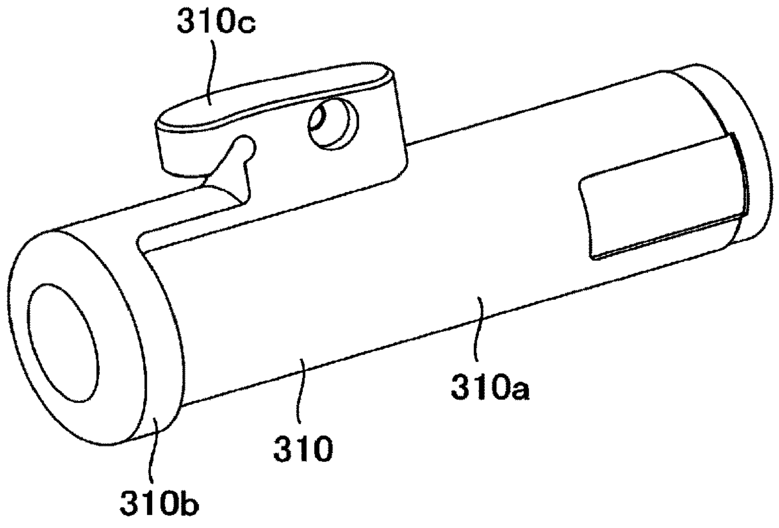
FIG. 20A is a perspective view showing an inner tube of a writing tool according to a fourth embodiment of the present invention.
Figure 20B:
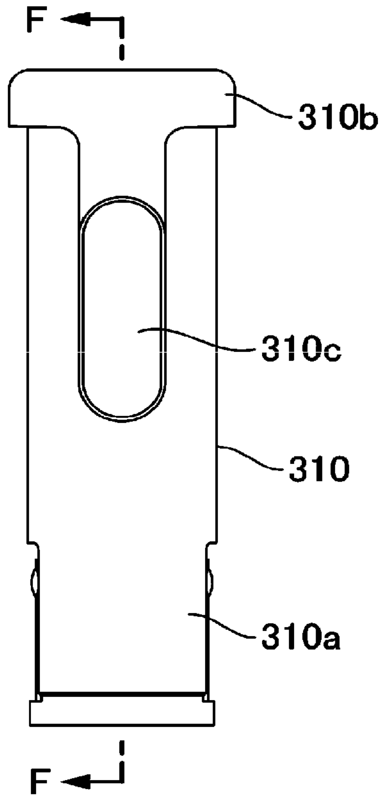
FIG. 20B is a front view showing the inner tube of the writing tool according to the fourth embodiment.
Figure 20C:
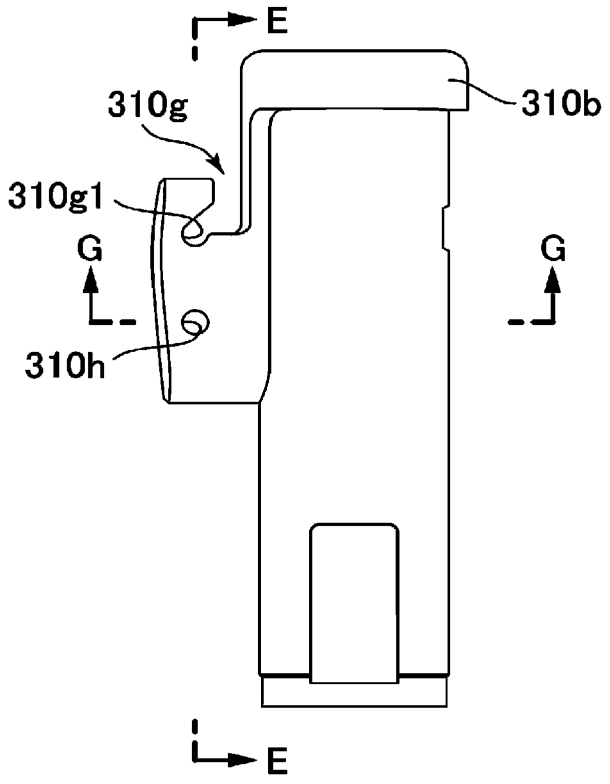
FIG. 20C is a right side view showing the inner tube of the writing tool according to the fourth embodiment.
Figure 20D:
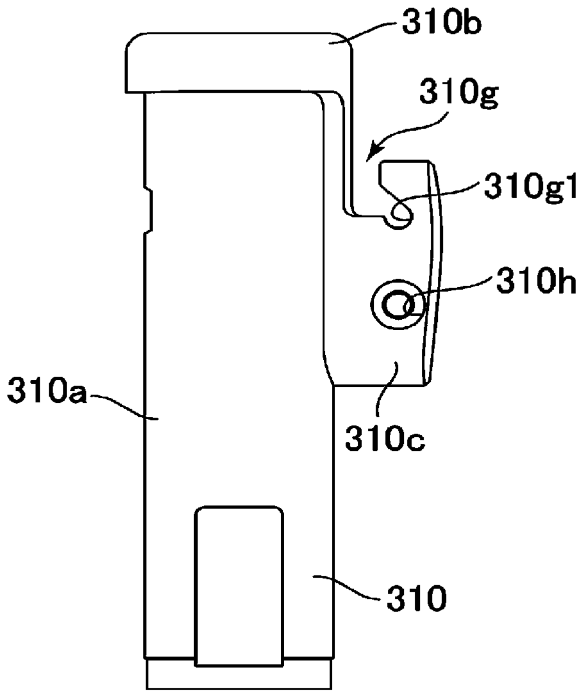
FIG. 20D is a left side view showing the inner tube of the writing tool according to the fourth embodiment.
Figure 20E:
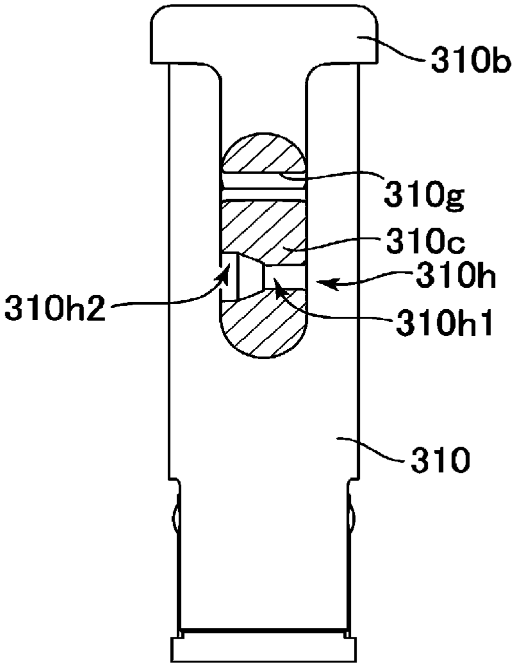
FIG. 20E is a sectional view taken along the line E-E of FIG. 20C.
Figure 20F:
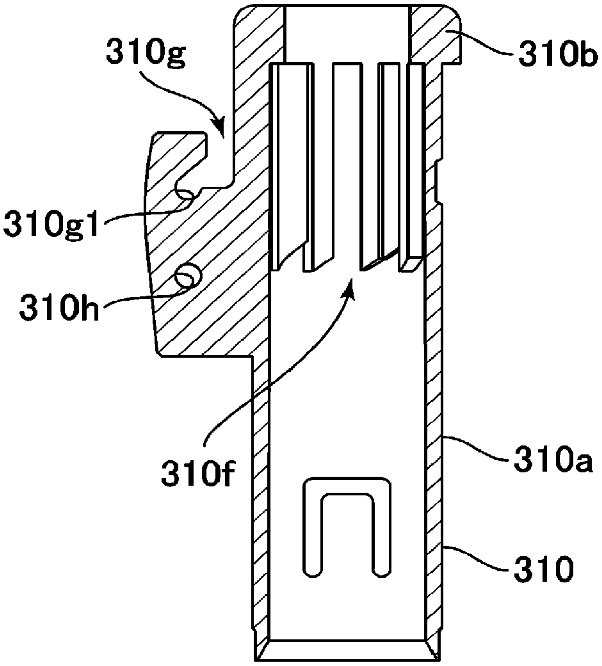
FIG. 20F is a sectional view taken along the line F-F of FIG. 20B.
Figure 20G:
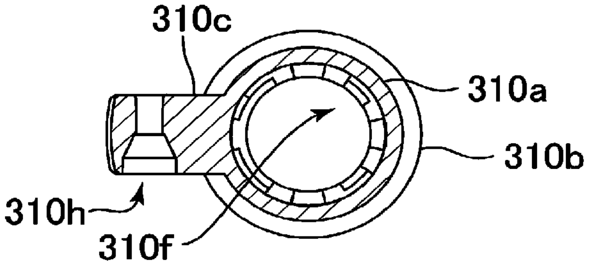
FIG. 20G is a sectional view taken along the line G-G of FIG. 20C.

FIGS. 20A to 20G illustrate an inner tube of the writing tool according to the fourth embodiment, wherein FIG. 20A, FIG. 20B, FIG. 20C and FIG. 20D are, respectively, a perspective view, a front view, a right side view and a left side view. Further, FIG. 20E, FIG. 20F and FIG. 20G are, respectively, a sectional view taken along the line E-E of FIG. 20C, a sectional view taken along the line F-F of FIG. 20B and a sectional view taken along the line G-G of FIG. 20C. The writing tool according to the fourth embodiment is different from the second embodiment in terms of only the configuration of the after-mentioned inner tube, and the remaining configurations are similar to those in the second embodiment. Specifically, the writing tool according to the fourth embodiment comprises a tool body, and a clip member 108 held by a lateral portion of the tool body. The clip member attached to the inner tube in the fourth embodiment is the same as that in the second embodiment. The tool body comprises a shaft tube 2, a refill element 4 housed in the shaft tube 2, and a knock mechanism provided in a back-end of the shaft tube 2, wherein the knock mechanism comprises an inner tube 310, a rotor 12, a spring member 14, and a knock member 16. The inner tube 310 is attached to the back-end of the shaft tube 2.

As shown in FIGS. 20A to 20G, the inner tube 310 comprises a hollow cylindrical-shaped tube body 310*a*, a back-end portion 310*b* connected to a back-end of the tube body 310*a*, and a clip mounting portion 310*c* connected to the back-end side of the tube body 310*a*. The tube body 310*a*, the back-end portion 310*b* and the clip mounting portion 310*c* are integrally formed.

The tube body 310*a* has an approximately hollow cylindrical shape, wherein the outer diameter of the tube body 310*a* is slightly less than the inner diameter of the shaft tube 2. The tube body 310*a* also has a cam portion 310*f* formed on an inner peripheral surface of the back-end thereof. The cam portion 310*f* is configured to, when the knock member 16 is manually pushed, rotate the rotor 12 in cooperation with the after-mentioned cam portion 12*b* of the rotor 12 so as to switch between a state in which a writing tip portion 4*a* of the refill element 4 protrudes from a fore-end opening 2*a* of the shaft tube 2, and a state in which the writing tip portion 4*a* of the refill element 4 is housed in the shaft tube 2. As a configuration of the cam portion 310*f* of the inner tube 310 and the cam portion 12*b* of the rotor 12, any of well-known configurations may be employed.

The back-end portion 310*b* is formed in a hollow cylindrical shape, wherein the outer diameter thereof is approximately equal to the outer diameter of the shaft tube 2. The back-end portion 310*b* has a circular through-hole formed to penetrate therethrough in a forward-backward direction.

The clip mounting portion 310*c* is provided with a given distance from the back-end of the tube body 310*a*, and formed in a columnar shape extending laterally outwardly. The clip mounting portion 310*c* is formed such that side surfaces thereof opposed in a transverse direction (rightward-leftward direction in FIG. 20B) are parallel to each other.

The clip mounting portion 310*c* has a first mounting cutout 310*g* formed in a back-end thereof. The first mounting cutout 310*g* is composed of a cutout extending from a radially inward edge of the back-end of the clip mounting portion 310*c* (right edge of an upper end of the clip mounting portion 310*c* in FIG. 20C) forwardly (downwardly in FIG. 20C), and then bending to extend obliquely forwardly (obliquely downwardly in FIG. 20C) and radially outwardly (in a leftward direction in FIG. 20C). A columnar-shaped receiving part 310*g*1 is formed at a termination of the first mounting cutout 110*g*.

The clip mounting portion 310*c* also has a second mounting hole 310*h* formed in a fore-end thereof to penetrate therethrough in the transverse direction. The second mounting hole 310*h* has a right-side base end part 310*h*1 and a left-side relief part 310*h*2. The base end part 210*h*1 is opened on the right side surface of the clip mounting portion 310*c*, and formed in a columnar shape. The relief part 310*h*2 is opened on the left side surface of the clip mounting portion 310*c*, and formed in a columnar shape having a diameter greater than that of the base end part 310*h*1.

The receiving part 310*g*1 of the first mounting cutout 310*g* and the second mounting hole 310*h* are aligned in the longitudinal direction (i.e., they are located at an equal distance from a central axis of the inner tube 310), wherein the first mounting cutout 310*g* is formed backward of the second mounting hole 310*h*.

In the fourth embodiment, a first end 108*f* and a second end 108*g* of the clip member 108 are inserted, respectively, into the first mounting cutout 310*g* and the second mounting hole 310*h* in the clip mounting portion 310*c* of the inner tube 310, so as to fix the clip member 108 to the inner tube 310. At this time, a bent part 108*h* in a distal area of the second end 108*g* is located within the relief part 310*h*2 of the second mounting hole 310*h*. An attaching method for the clip member 108 is similar to that in the second embodiment, In the fourth embodiment, in a state in which the clip member 108 is attached, an outer surface of the clip mounting portion 310*c* of the inner tube 310 to which the clip member 108 is attached is located radially outwardly so as to prevent exposure of the ends of the first mounting cutout 310*g*, thereby providing an improved an aesthetic property.

Although the fourth embodiment has been described based on an example where the present invention is applied to a knock-type ballpoint pen, a writing tool to which the present invention is applicable is not limited thereto. For example, the present invention is also applicable to a knock-type mechanical pencil, and a writing tool equipped with no knock mechanism. Further, the present invention may be applied in a case where a cap is attached to a cap of a cap-type writing tool.

In the present invention, the expression "swinging the clip with respect to the tool body" includes not only swinging the clip strictly about a single pivot, but also, through an operation of manually pushing the back-end section of the clip member radially inwardly in the state in which the intermediate section of the clip member is supported, moving the fore-end section of the clip member radially outwardly, as in the above embodiments.

Fifth Embodiment

With reference to the drawings, a writing tool according to a fifth embodiment of the present invention will now be described in detail.

Figure 21:
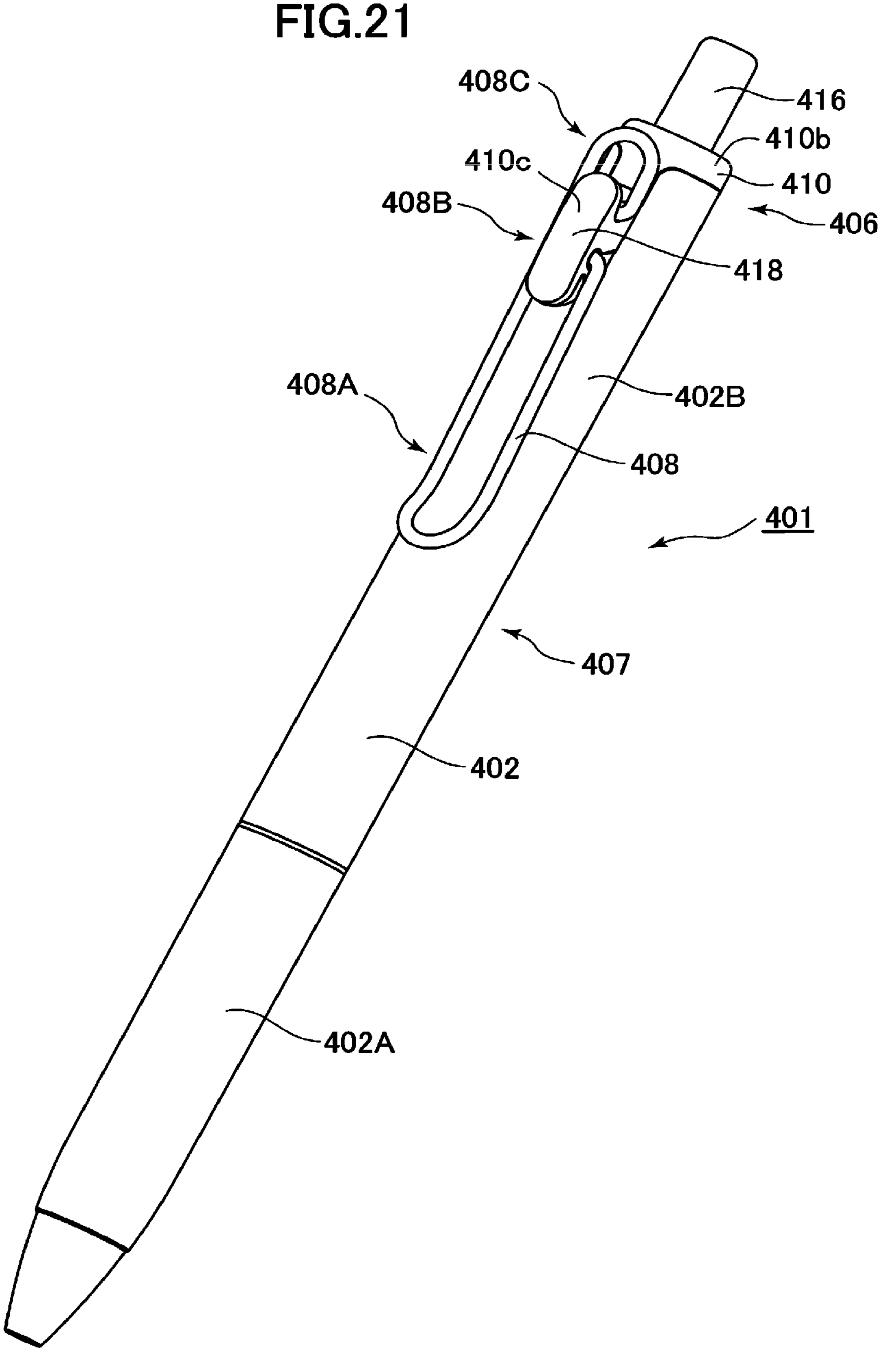
FIG. 21 is a perspective view showing a writing tool according to a fifth embodiment of the present invention.
Figure 22:
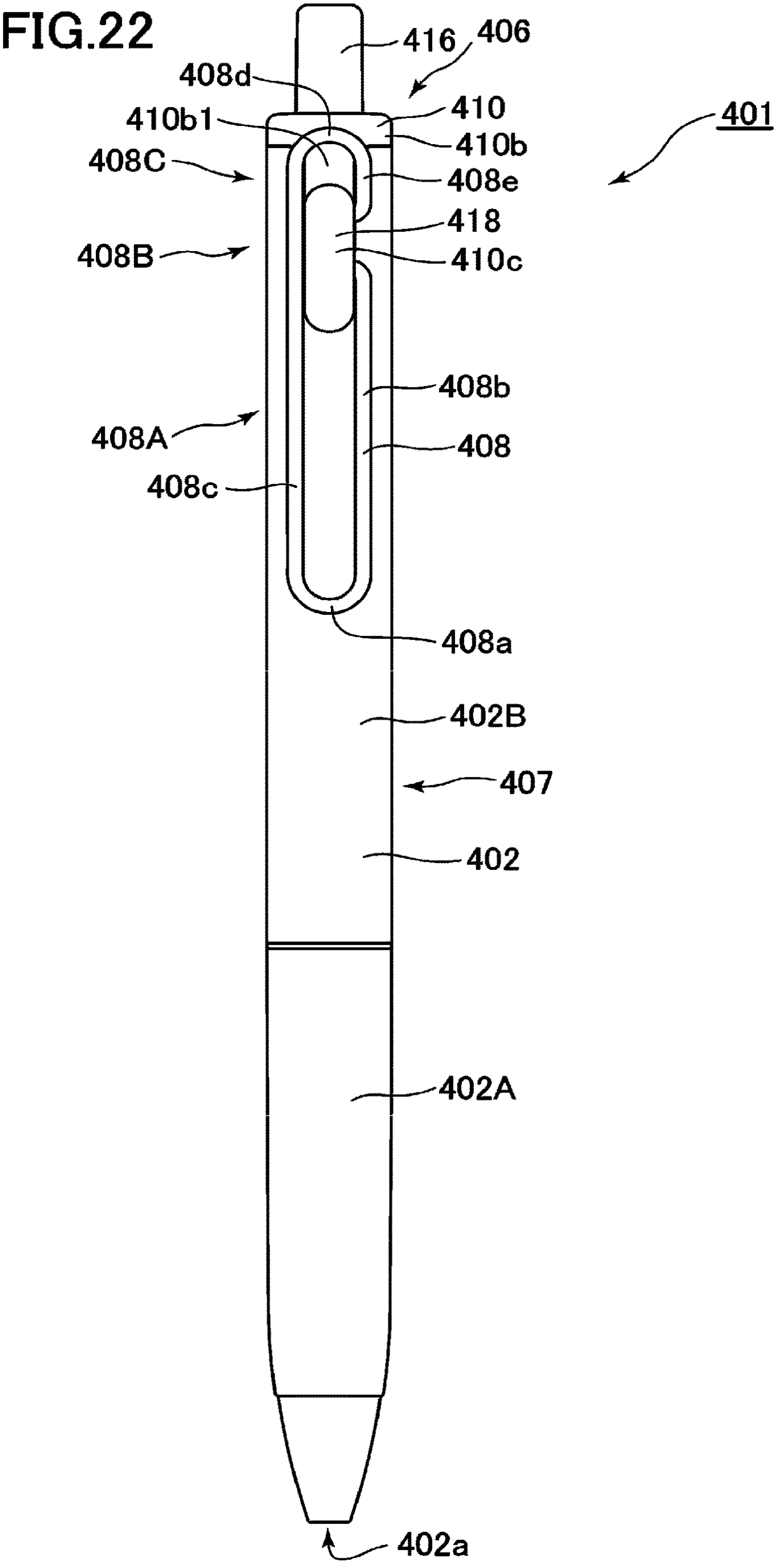
FIG. 22 is a front view showing the writing tool according to the fifth embodiment.
Figure 23:
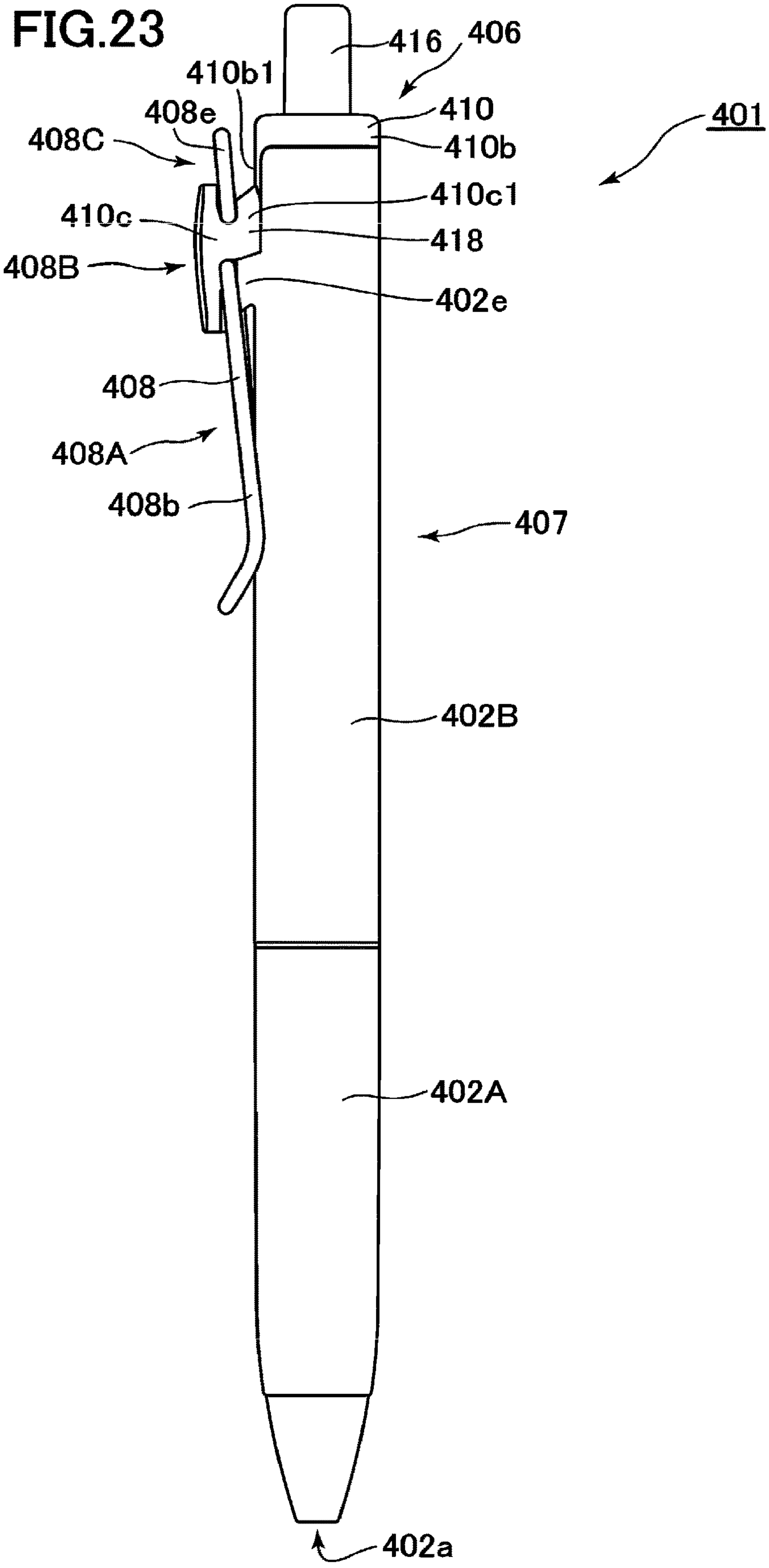
FIG. 23 is a side view showing the writing tool according to the fifth embodiment.
Figure 24:
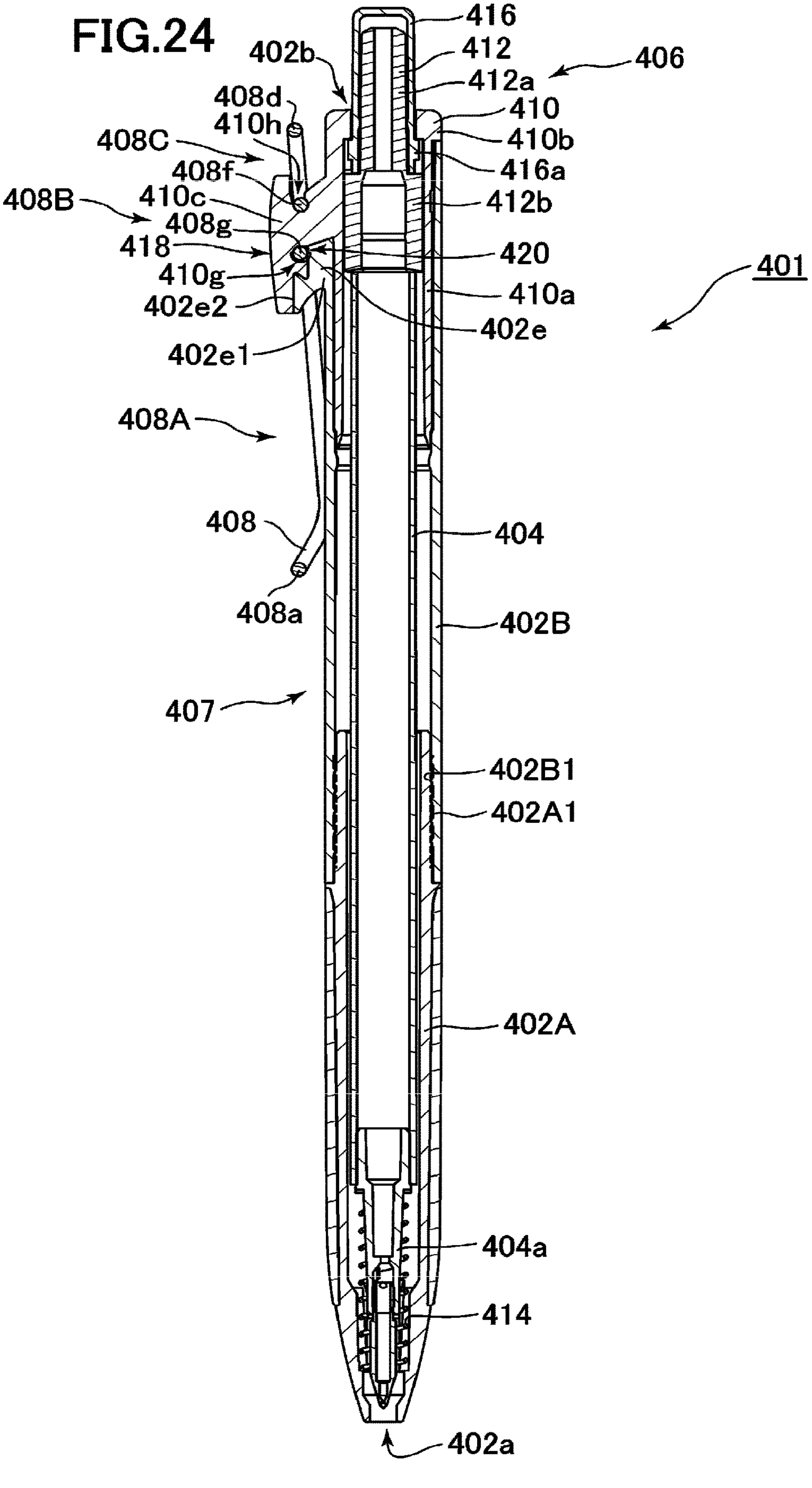
FIG. 24 is a sectional view showing a shaft tube of the writing tool illustrated in FIG. 21, taken along an axial direction.

FIGS. 21 to 23 illustrate the writing tool according to the fifth embodiment, wherein FIG. 21, FIG. 22 and FIG. 23 are, respectively, a perspective view, a front view and a side view. Further, FIG. 24 is a sectional view showing a shaft tube of the writing tool illustrated in FIG. 21, taken along the axial direction. The writing tool 401 according to the fifth embodiment is a so-called "Kern knock-type ballpoint pen", and configured to be switchable between a state in which a writing tip portion 404*a* of a refill element 404 protrudes from a fore-end of a shaft tube 402, and a state in which the writing tip portion 4044*a* of the refill element 404 is housed in the shaft tube 402, through an operation of manually pushing down a knock member 416 at a back-end of the writing tool, as mentioned later.

As shown in FIGS. 21 to 24, the writing tool 401 according to the fifth embodiment comprises a tool body 407, and a clip member 408 held by a lateral portion of the tool body 407. The clip member 408 is held by the after-mentioned clip holding unit 418 formed on a backward side of the tool body 407. The tool body 407 comprises a hollow cylindrical-shaped long shaft tube 402, a refill element 404 housed in the shaft tube 402, and a knock mechanism 406 provided in a back-end of the shaft tube 402. The knock mechanism 406 comprises an inner tube 410, a rotor 412, a spring member 414, and a knock member 416.

Figure 25A:
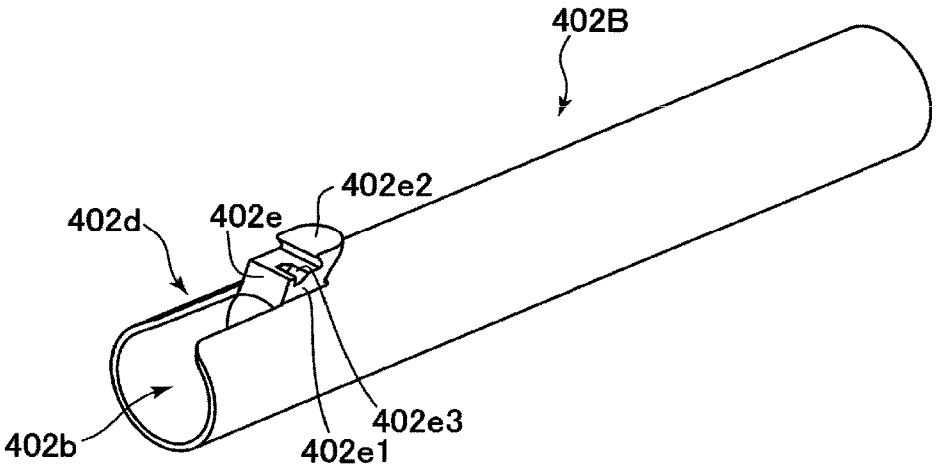
FIG. 25A is a perspective view showing a backward shaft tube of the writing tool according to the fifth embodiment.
Figure 25B:
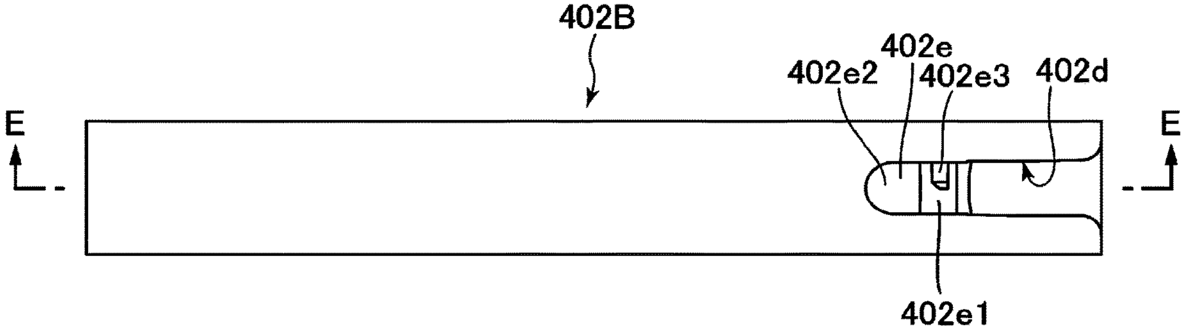
FIG. 25B is a front view showing the backward shaft tube of the writing tool according to the fifth embodiment.
Figure 25C:
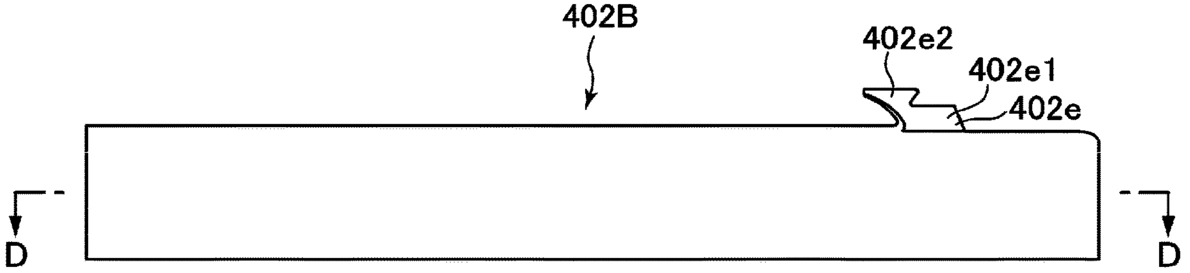
FIG. 25C is a side view showing the backward shaft tube of the writing tool according to the fifth embodiment.
Figure 25D:
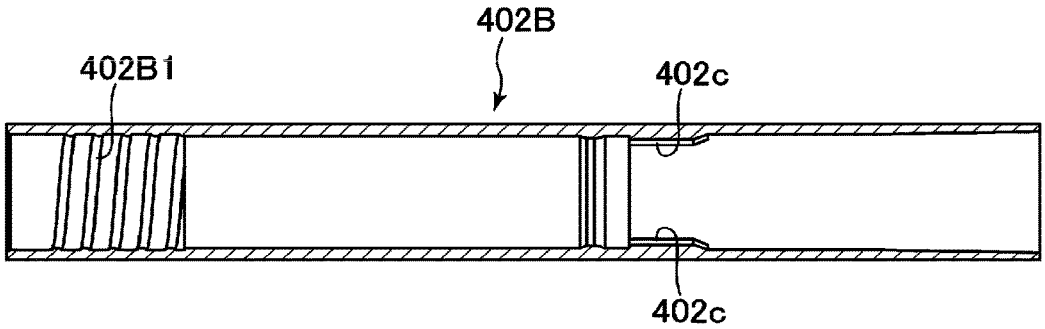
FIG. 25D is a sectional view showing the backward shaft tube of the writing tool according to the fifth embodiment, taken along the line D-D of FIG. 25C.
Figure 25E:
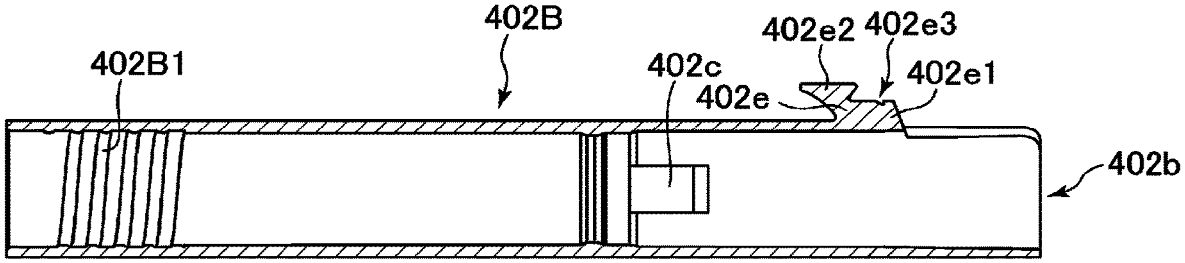
FIG. 25E is a sectional view showing the backward shaft tube of the writing tool according to the fifth embodiment, taken along the line E-E of FIG. 25B.
Figure 25F:
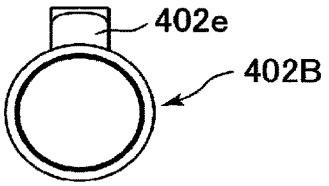
FIG. 25F is a view showing the backward shaft tube of the writing tool according to the fifth embodiment, as viewed backwardly from the forward side of the backward shaft tube.
Figure 25G:
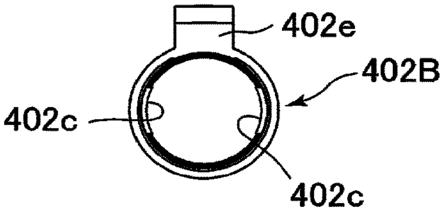
FIG. 25G is a view showing the backward shaft tube of the writing tool according to the fifth embodiment, as viewed forwardly from the backward side of the backward shaft tube.

The shaft tube 402 is formed in a hollow cylindrical shape whose fore-end is tapered. The shaft tube 402 is formed by connecting a forward shaft tube 402A on the side of the fore-end and a backward shaft tube 402B on the side of the back-end together. FIGS. 25A to 25E illustrate the backward shaft tube of the writing tool according to the fifth embodiment, wherein: FIG. 25A, FIG. 25B and FIG. 25C are, respectively, a perspective view, a front view and a side view; FIG. 25D and FIG. 25E are, respectively, a sectional view taken along the line D-D of FIG. 25C and a sectional view taken along the line E-E of FIG. 25B; and FIG. 25F and FIG. 25G are, respectively, a view as viewed backwardly from the forward side and a view as viewed forwardly from the backward side. As shown in FIG. 24, a spiral thread 402A1 is formed on an outer peripheral surface of a back-end of the forward shaft tube 402A. Further, as shown in FIGS. 25A to 25G, a spiral thread 402B1 is formed on an inner peripheral surface of the backward shaft tube 402B. The back-end of the forward shaft tube 402A is inserted into the backward shaft tube 402B from the side of a fore-end of the backward shaft tube 402B, and the spiral thread 402A1 of the forward shaft tube 402A is threadingly engaged with the spiral thread 402B1 of the backward shaft tube 402B, so that the forward shaft tube 402A and the backward shaft tube 402B are coupled together to form the shaft tube 402. The forward shaft tube 402A has a fore-end opening 402*a* formed in a fore-end thereof. Further, the backward shaft tube 402B has a back-end opening 402*b* formed in the back-end thereof.

The backward shaft tube 402B has a pair of radially-narrowing portions 402*c* formed on an inner peripheral surface of the back-end thereof to protrude radially inwardly. Each of the radially-narrowing portions 402*c* is formed in a rectangular shape as view from the radially inward side, wherein a back-end of the radially-narrowing portion 402*c* is formed to have an inclined surface. The pair of radially-narrowing portions 402*c* are arranged at positions opposed to each other across a central axis of the shaft tube 402.

Further, the backward shaft tube 402B has a cutout 402*d* formed in a back-end edge thereof to have a shape equivalent to that of the after-mentioned extension part 410*b*1 of the inner tube 410.

A fore-end of the cutout 402*d* is formed with a first clip holding portion 402*e*. The first clip holding portion 402*e* comprises a base part 402*e*1 standingly provided on an outer peripheral surface the backward shaft tube 402B, and an engagement part 402*e*2 connected to the base part 402*e*1. The base part 402*e*1 is formed to have a flat radially-outer surface. The base part 402*e*1 is also formed to have a backward surface extending obliquely forwardly and radially outwardly. Further, the base part 402*e*1 has a recess 402*e*3 which is formed on the radially-outer surface thereof to extend from one of transversely-opposed edges to a widthwise (transverse) intermediate position. The engagement part 402*e*2 is standingly provided on a fore-end region of the radially-outer surface of the base part 402*e*1. The engagement part 402*e*2 is formed to have a flat radially-outer surface, and a back-end surface extending obliquely forwardly and radially inwardly.

Figure 26A:
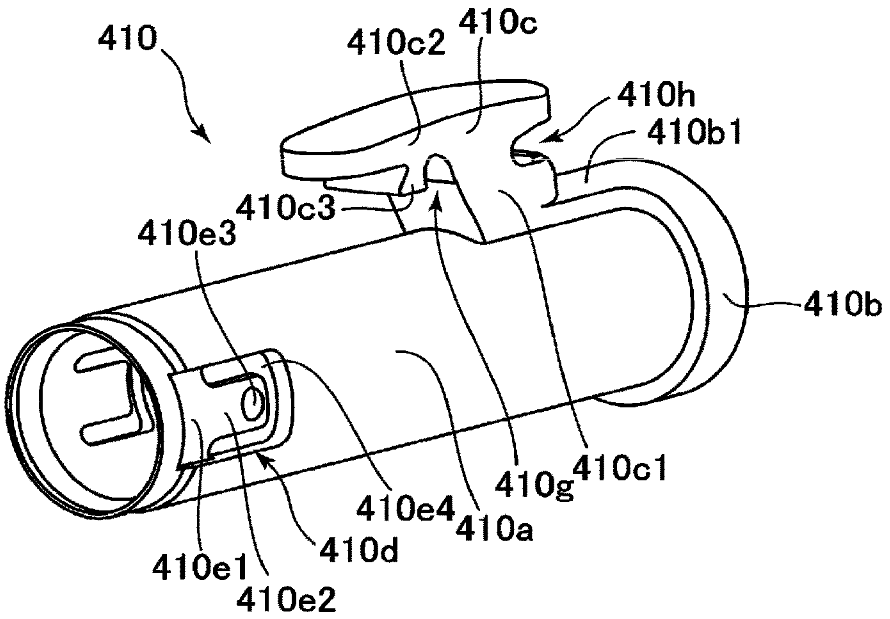
FIG. 26A is a perspective view showing an inner tube of the writing tool illustrated in FIG. 21.
Figure 26B:
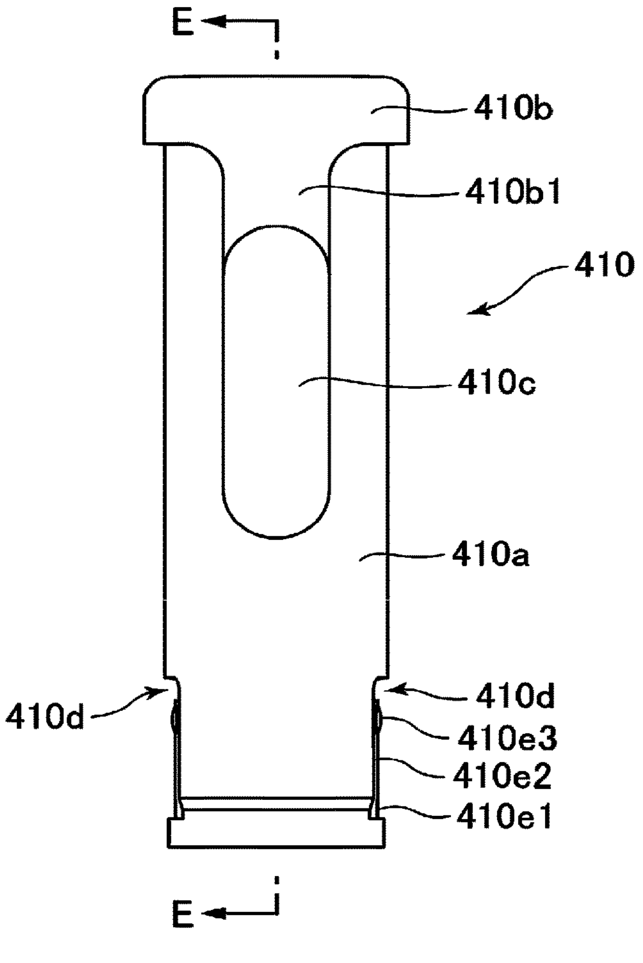
FIG. 26B is a front view showing the inner tube of the writing tool illustrated in FIG. 21.
Figure 26C:
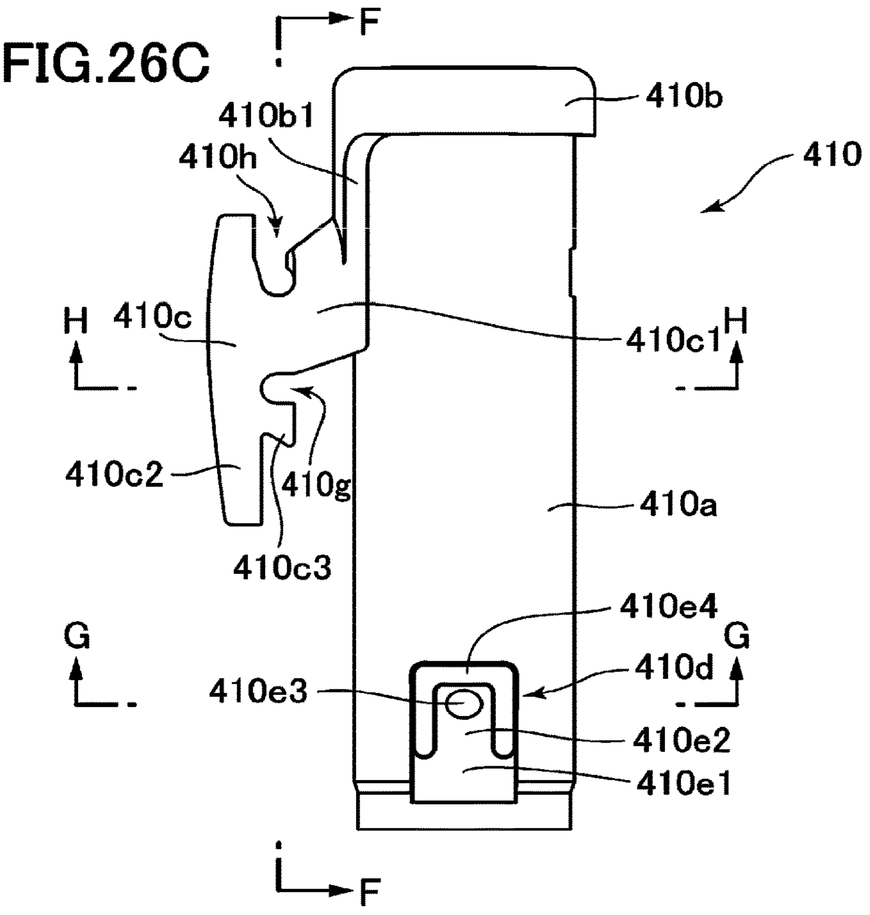
FIG. 26C is a right side view showing the inner tube of the writing tool illustrated in FIG. 21.
Figure 26D:
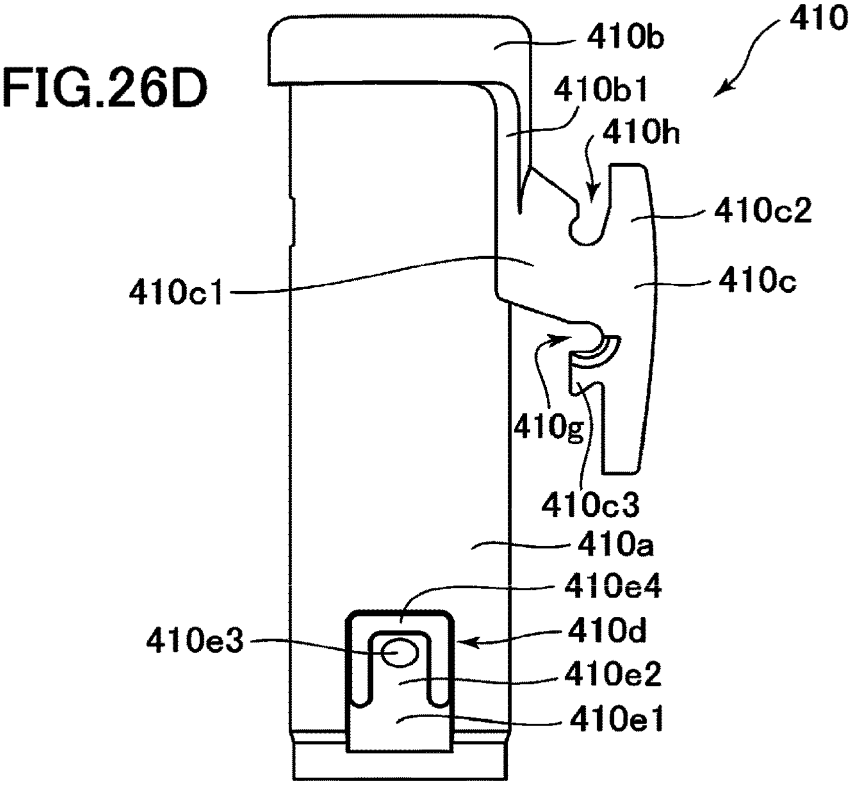
FIG. 26D is a left side view showing the inner tube of the writing tool illustrated in FIG. 21.
Figure 26E:
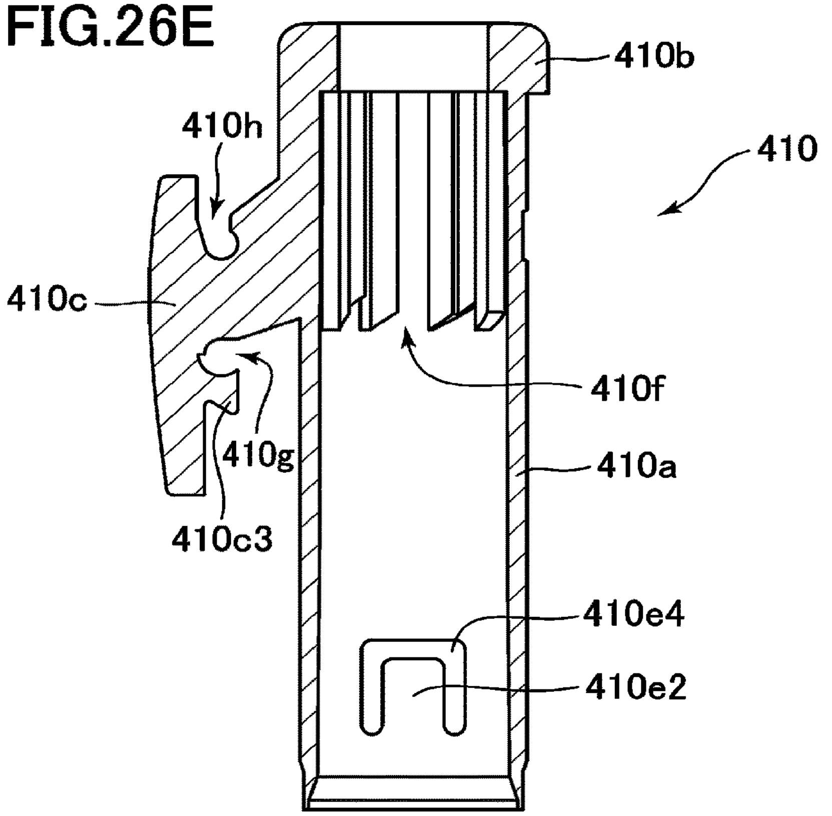
FIG. 26E is a sectional view showing the inner tube of the writing tool illustrated in FIG. 21, taken along the line E-E of FIG. 26B.
Figure 26F:
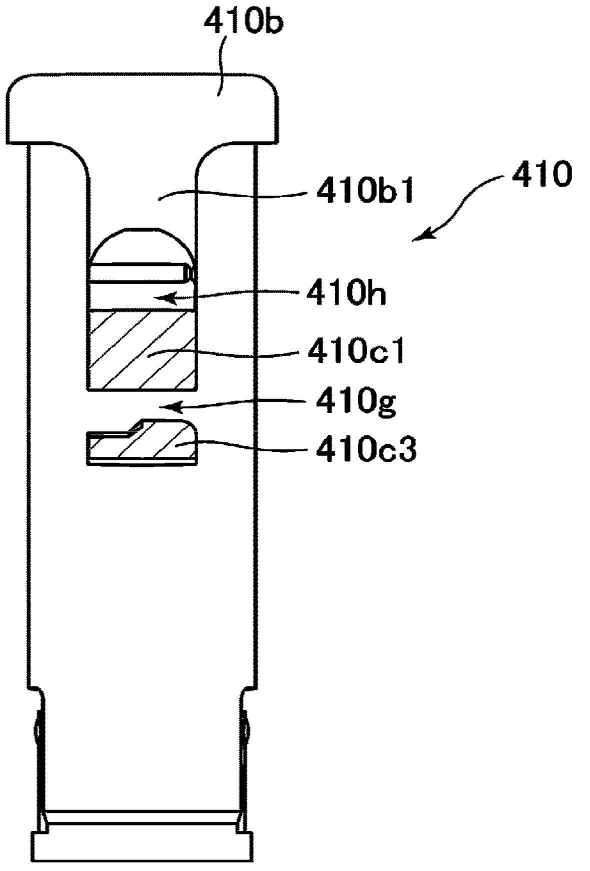
FIG. 26F is a sectional view showing the inner tube of the writing tool illustrated in FIG. 21, taken along the line F-F of FIG. 26C.
Figure 26G:
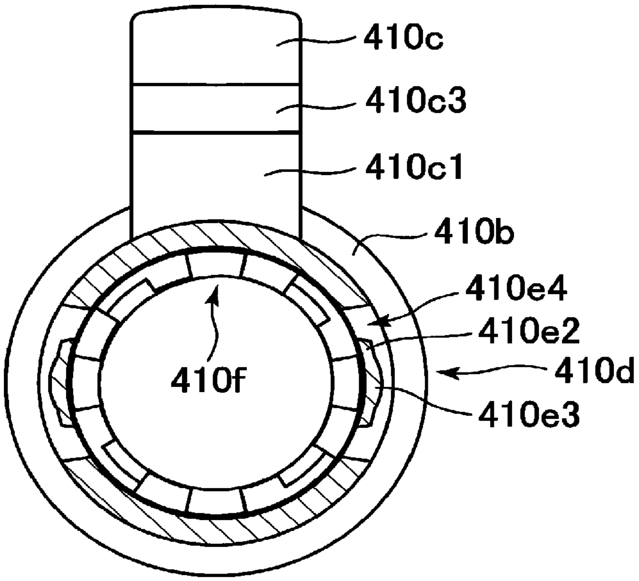
FIG. 26G is a sectional view showing the inner tube of the writing tool illustrated in FIG. 21, taken along the line G-G of FIG. 26C.
Figure 26H:
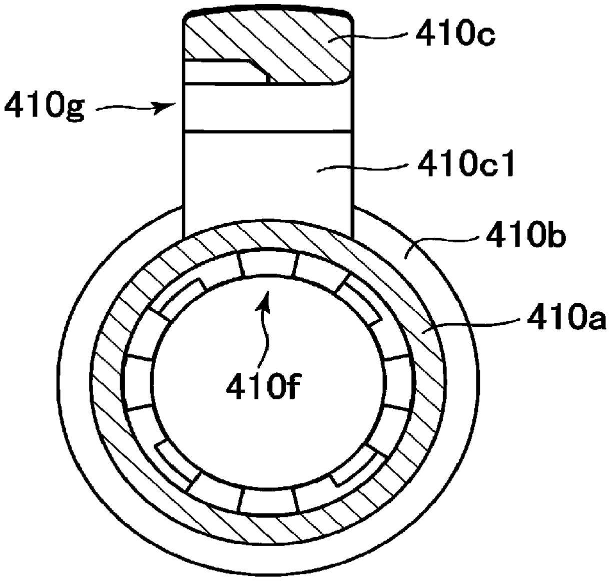
FIG. 26H is a sectional view showing the inner tube of the writing tool illustrated in FIG. 21, taken along the line H-H of FIG. 26C.

FIGS. 26A to 26H illustrate the inner tube of the writing tool illustrated in FIG. 21, wherein FIG. 26A, FIG. 26B, FIG. 26C and FIG. 26D are, respectively, a perspective view, a front view, a right side view and a left side view, and FIG. 26E, FIG. 26F, FIG. 26G and FIG. 26H are, respectively, a sectional view taken along the line E-E of FIG. 26B, a sectional view taken along the line F-F of FIG. 26C, a sectional view taken along the line G-G of FIG. 26C and a sectional view taken along the line H-H of FIG. 26C. As shown in FIGS. 26A to 26H, the inner tube 410 comprises a hollow cylindrical-shaped tube body 410*a*, a back-end portion 410*b* connected to a back-end of the tube body 410*a*, and a second clip holding portion 410*c* connected to the back-end side of the tube body 410*a*. The tube body 410*a*, the back-end portion 410*b* and the second clip holding portion 410*c* are integrally formed.

The tube body 410*a* has an approximately hollow cylindrical shape, wherein the outer diameter of the tube body 410*a* is slightly less than the inner diameter of the shaft tube 402. The tube body 410*a* has recesses 410*d* formed on a forward-side portion thereof to become concave radially inwardly, wherein a peripheral edge of each of the recesses 410*d* is formed as s step. Each of the recesses 410*d* is internally provided with a base portion 410*e*1 formed to extend along a forward edge of the recess 410*d*, and an elastically deformable portion 410*e*2 extending backwardly from the base portion 410*e*1. The base portion 410*e*1 is formed such that an inner peripheral surface thereof has the same cylindrical surface shape as that of an inner peripheral surface of the tube body 410*a*, and an outer peripheral surface thereof has a cylindrical surface shape with a smaller diameter than that of the tube body 410*a*. The elastically deformable portion 410*e*2 has the same cylindrical surface shape as that of the base portion 410*e*1, and is formed in a cantilever configuration extending backwardly. The base portion 410*e*1 has a protrusion 410*e*3 formed on a for-end thereof to protrude radially outwardly. A backward edge and circumferentially-opposed edges of the base portion 410*e*1 are surrounded by a through-hold 410*e*4.

The tube body 410*a* also has a cam portion 410*f* (FIG. 26E) formed on the inner peripheral surface of the back-end thereof. The cam portion 410*f* is configured to, when the knock member 416 is manually knocked, rotate the rotor 412 in cooperation with the after-mentioned cam portion 412*b* of the rotor 412 so as to switch between a state in which a writing tip portion 404*a* of the refill element 404 protrudes from the fore-end opening 402*a* of the shaft tube 402, and a state in which the writing tip portion 404*a* of the refill element 404 is housed in the shaft tube 402. As a configuration of the cam portion 410*f* of the inner tube 410 and the cam portion 412*b* of the rotor 412, any of well-known configurations may be employed. In the fifth embodiment, the cam portion 410*f* of the inner tube 410 has a plurality of convex parts extending forwardly and a plurality of concave parts formed between adjacent ones of the convex parts to extend backwardly.

The back-end portion 410*b* is formed in a hollow cylindrical shape, wherein the outer diameter thereof is approximately equal to the outer diameter of the shaft tube 402. The back-end portion 410*b* has a circular through-hole formed to penetrate therethrough in a forward-backward direction. The back-end portion 410*b* also has an extension part 410*b*1 formed to extend forwardly along the outer peripheral surface of the tube body 410*a*.

The the second clip holding portion 410*c* is provided continuously with a fore-end of the extension part 410*b*1, and formed in a columnar shape extending laterally outwardly. The second clip holding portion 410*c* is formed such that side surfaces thereof opposed in a transverse direction (rightward-leftward direction in FIG. 26B) are parallel to each other.

The second clip holding portion 410*c* has a rising part 410*c*1 rising radially outwardly from the tube body 410*a*, and an extension part 410*c*2 provided continuously with a radially-outer end of the rising part 410*c*1. The rising part 410*c*1 has a forward surface extending obliquely forwardly and radially outwardly. A portion of the extension part 410*c*2 located forward of the rising part 410*c*1 is formed with a protrusion 410*c*3. Thus, a first recess 410*g* is formed at a corner between the rising part 410*c*1 and the protrusion 410*c*3 and on the forward side of the connection between the rising part 410*c*1 and the extension part 410*c*2. Further, a second recess 410*h* is formed at a corner on the backward side of the connection between the rising part 410*c*1 and the extension part 410*c*2. The protrusion 410*c*3 has a forward surface extending obliquely backwardly and radially outwardly.

The first recess 410*g* is opened radially inwardly and extends penetratingly in a transverse direction (rightward-leftward direction in FIG. 26B). The first recess 410*g* is formed to have a semicircular cross-section in a radially-outer region (bottom region), and a rectangular cross-section in a radially-inner region thereof, and to have a U-shaped cross-section in its entirety. The first recess 410*g* is formed such that one (left region in FIG. 26F) of two transversely divided regions is diametrically expanded as compared with the other region (right region in FIG. 26F) to form a relief part. The second recess 410*h* is opened backwardly and extends penetratingly in the transverse direction.

The rotor 412 comprises a backward-side base end portion 412*a*, and a forward-side cam portion 412*b*. The base end portion 412*a* is formed in a hollow cylindrical shape, wherein the outer diameter thereof is less than the outer diameter of the knock member 416. The cam portion 412*b* is formed in a hollow cylindrical shape, wherein the outer diameter thereof is slightly less than the inner diameter of the tube body 410*a* of the inner tube 410. The cam portion 412*b* has a plurality of convex parts formed on an outer surface thereof to extend backwardly and a plurality of concave parts formed between adjacent ones of the convex parts to extend forwardly.

The knock member 416 is formed in a hollow cylindrical shape which is closed on the upper side and opened on the lower side. The outer diameter of the knock member 416 is approximately equal to the inner diameter of the through-hole of the back-end portion 410*b* of the inner tube 410. The knock member 416 has a protrusion 416*a* formed on a lower end region of an outer peripheral surface thereof to protrude radially outwardly over the entire outer circumference thereof.

The spring member 414 is installed such that a back-end thereof is in contact with a fore-end of the refill element 404, and a fore-end thereof is in contact with the fore-end of the shaft tube 402. Thus, the spring member 414 operates to bias the refill element 404 backwardly.

In an assembled state, the inner tube 410 is disposed such that the tube body 410*a* is inserted from the back-end opening 402*b* of the shaft tube 402 and located inside the shaft tube 402, and the back-end portion 410*b* is in contact with a back-end edge of the shaft tube 402. The knock member 416 is inserted through the through-hole of the back-end portion 410*b* of the inner tube 410 from the forward side, and the protrusion 416*a* of the knock member 416 is located inside the tube body 410*a* of the inner tube 410. The base end portion 412*a* of the rotor 412 is inserted inside the knock member 416 from the forward side, and a fore-end edge of the knock member 416 is in contact with a back-end surface of the cam portion 412*b* of the rotor 412. Further, a fore-end surface of the cam portion 412*b* of the rotor 412 is in contact with the refill element 404. Thus, the rotor 412 and the knock member 416 are biased backwardly through the refill element 404.

When the knock member 416 is pushed down in the above state, the rotor 412 is rotated to switch between a state in which the convex parts of the cam portion 412*b* of the rotor 412 are meshed with the concave parts of the cam portion 410*f* of the inner tube 410, and a state in which tops of the convex parts of the cam portion 410*f* of the inner tube 410 are in contact with respective tops of the convex parts of the cam portion 412*b* of the rotor 412, and thereby switch between a state in which the writing tip portion 404*a* of the refill element 404 is housed in the shaft tube 402, and a state in which the writing tip portion 404*a* of the refill element 404 protrudes from the fore-end of the shaft tube 402.

Figure 27A:
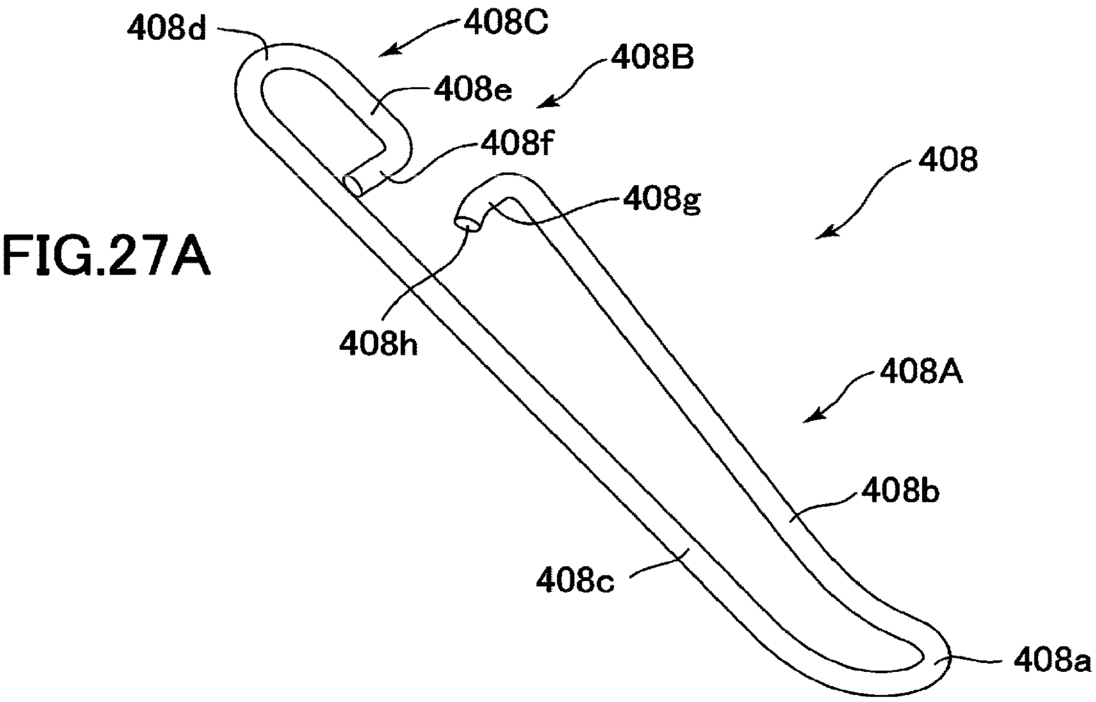
FIG. 27A is a perspective view showing a clip member of the writing tool illustrated in FIG. 21.
Figure 27B:
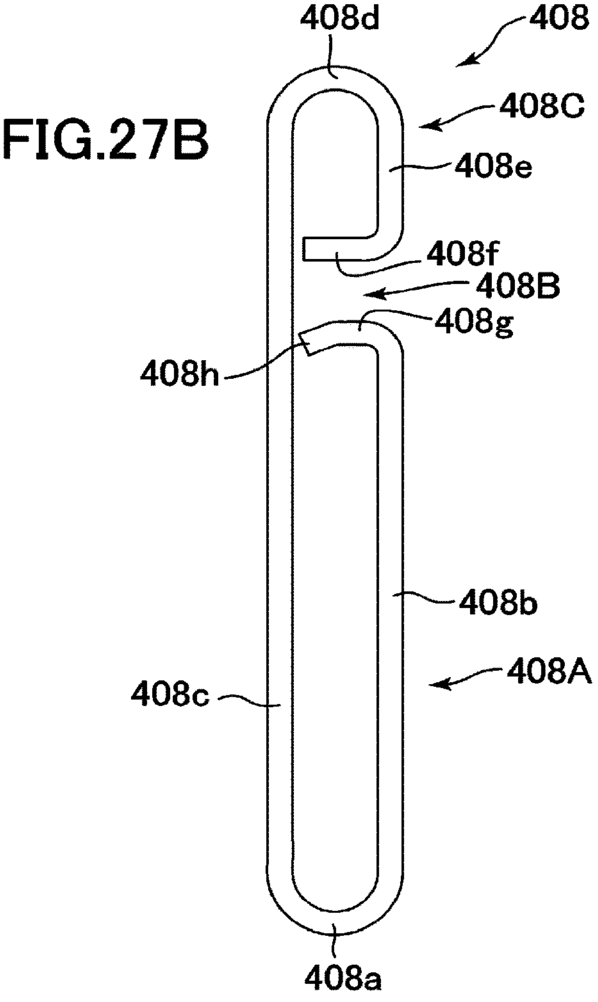
FIG. 27B is a front view showing the clip member of the writing tool illustrated in FIG. 21.
Figure 27C:
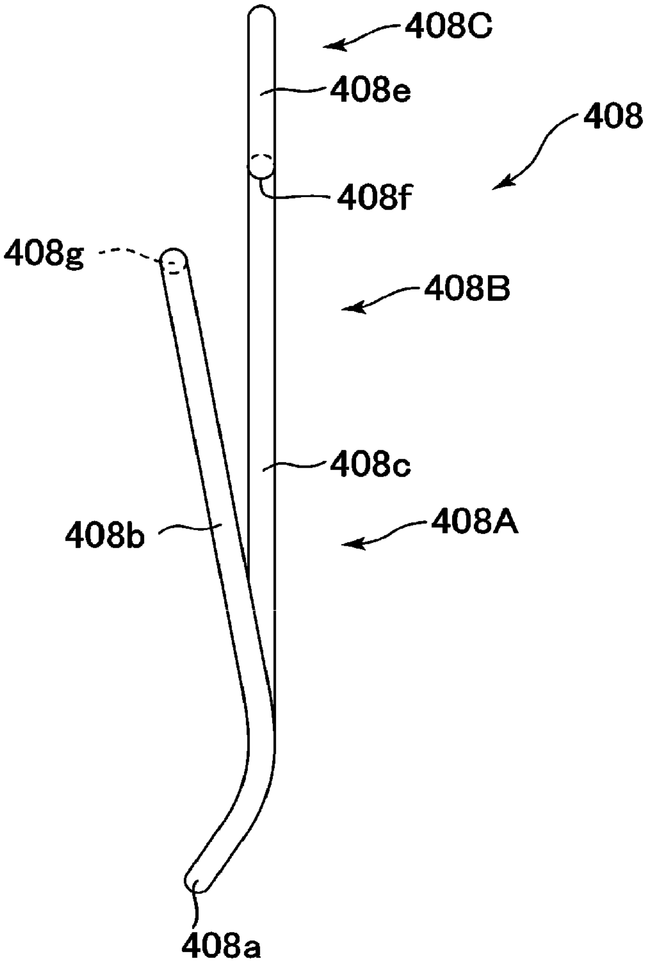
FIG. 27C is a side view showing the clip member of the writing tool illustrated in FIG. 21.

FIGS. 27A to 27C illustrate the clip member of the writing tool illustrated in FIG. 21, wherein FIG. 27A, FIG. 25B and FIG. 27C are, respectively, a perspective view, a front view and a side view. It should be noted here that FIG. 27A to 27C show the clip member in a state in which it is detached from the inner tube. As shown in FIGS. 27A to 27C, the clip member 408 is formed by subjecting a single piece of metal wire rod made of stainless steel or the like to bending. The clip member 408 has: a fore-end section 408A formed in a U shape; a back-end section 408C formed in a U shape; and an intermediate section 408B between the fore-end section 408A and the back-end section 408C.

The fore-end section 408A is composed of a forward part of a first longitudinal portion 408*b*, a forward part of a second longitudinal portion 408*c*, and a first arc-shaped portion 408*a* connecting a fore-end of the first longitudinal portion 408*b* and a fore-end of the second longitudinal portion 408*c*. The first longitudinal portion 408*b* extends backwardly from a right (right side in FIG. 27B) end of the first arc-shaped portion 408*a* to the intermediate section 408B. The second longitudinal portion 408*c* extends backwardly from a left (left side in FIG. 27B) end of the first arc-shaped portion 408*a* to the back-end section 408C beyond the intermediate section 408B.

The back-end section 408C is composed of: a back-end of the second longitudinal portion 408*c*; a second arc-shaped portion 408*d* extending arcurately and rightwardly (in a rightward direction in FIG. 27B) from the back-end of the second longitudinal portion 408*c*; and a third longitudinal portion 408*e* extending forwardly from a right (right side in FIG. 27B) end of the second arc-shaped portion 408*d*.

The intermediate section 408B has a first end 408*f* extending leftwardly (in a leftward direction in FIG. 27B) from a fore-end of the third longitudinal portion 408*e*, and a second end 408*g* extending leftwardly (in the leftward direction in FIG. 27B) from a back-end of the first longitudinal portion

408*b*. The second end 408*g* has a bent part 408*h* formed in a distal area thereof to extend obliquely forwardly and leftwardly.

In a state in which the clip member 408 is detached from the inner tube 410, the first longitudinal portion 408*b* is tilted such that it extends obliquely backwardly and radially outwardly (in a leftward direction in FIG. 27C), with respect to a direction along which the second longitudinal portion 408*c* extends. Thus, the first end 408*f* is located closer to the tool body than the second end 408*g*.

In an operation of assembling the writing tool according to the fifth embodiment, the clip member is first attached to the inner tube. FIGS. 28A, 29A, 30A and 31A are perspective views for explaining a method to attach the clip member to the inner tube and then attach the inner tube to the backward shaft tube, in the writing tool according to the fifth embodiment. Further, FIGS. 28B, 29B, 30B and 31B are side views corresponding to FIGS. 28A, 29A, 30A and 31A, respectively.

Figure 28A:
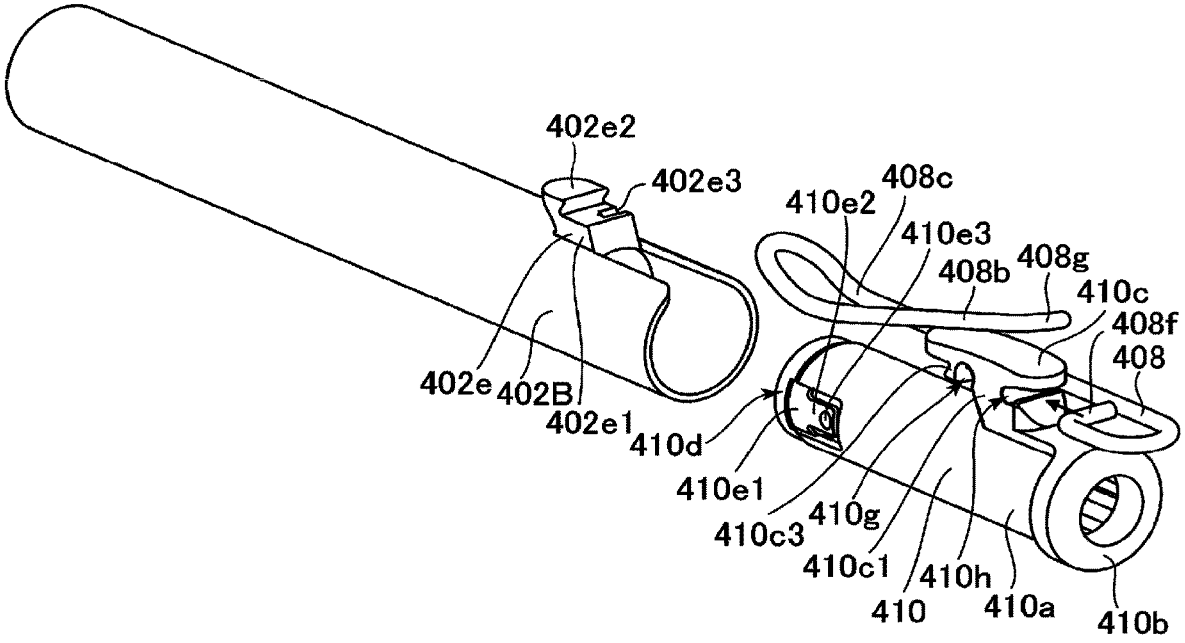
FIG. 28A is a perspective view for explaining a method to attach the clip member to the inner tube and then attach the inner tube to the backward shaft tube, in the writing tool according to the fifth embodiment (part 1).
Figure 28B:
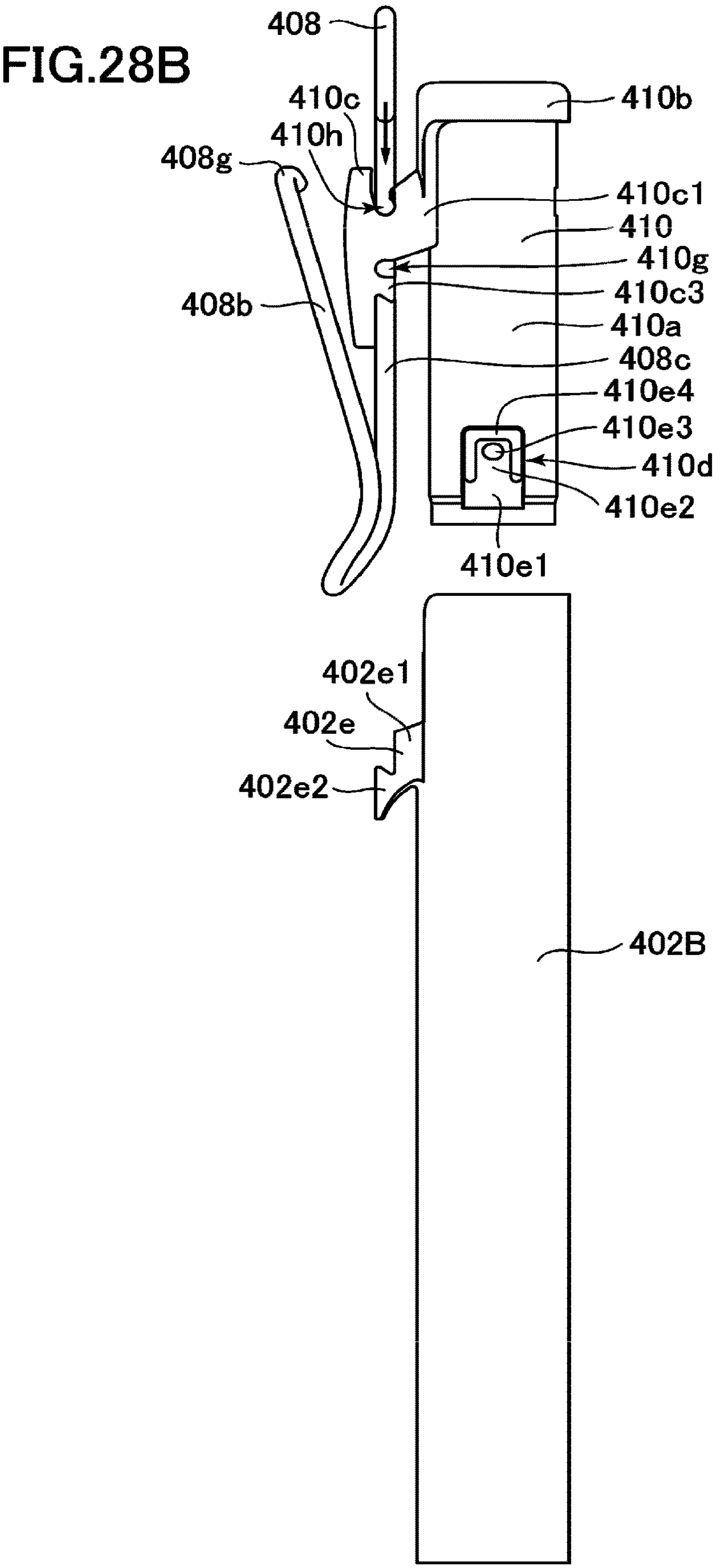
FIG. 28B is a side view corresponding to FIG. 28A.

In order to attach the clip member 408 to the inner tube 410, first of all, the clip member 408 is moved forwardly as indicated by the arrowed line in FIG. 28B to insert the first end 408*f* into the second recess 410*h* from the backward side, as shown in FIGS. 28A and 28B.

Figure 29A:
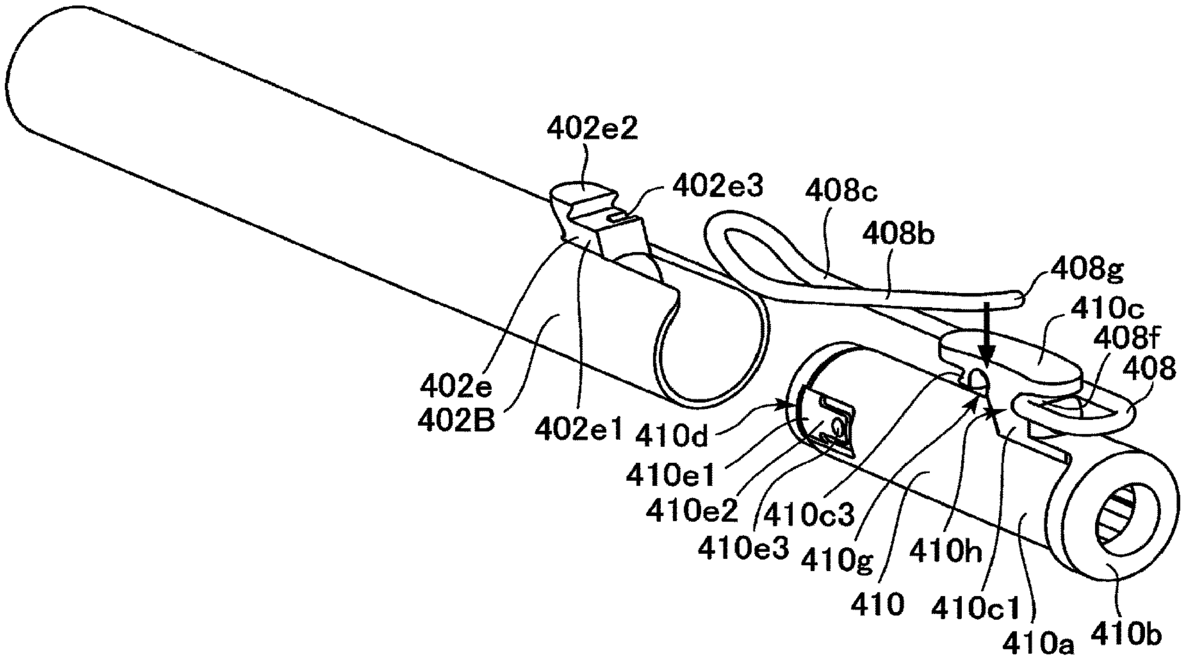
FIG. 29A is a perspective view for explaining the method to attach the clip member to the inner tube and then attach the inner tube to the backward shaft tube, in the writing tool according to the fifth embodiment (part 2).
Figure 29B:
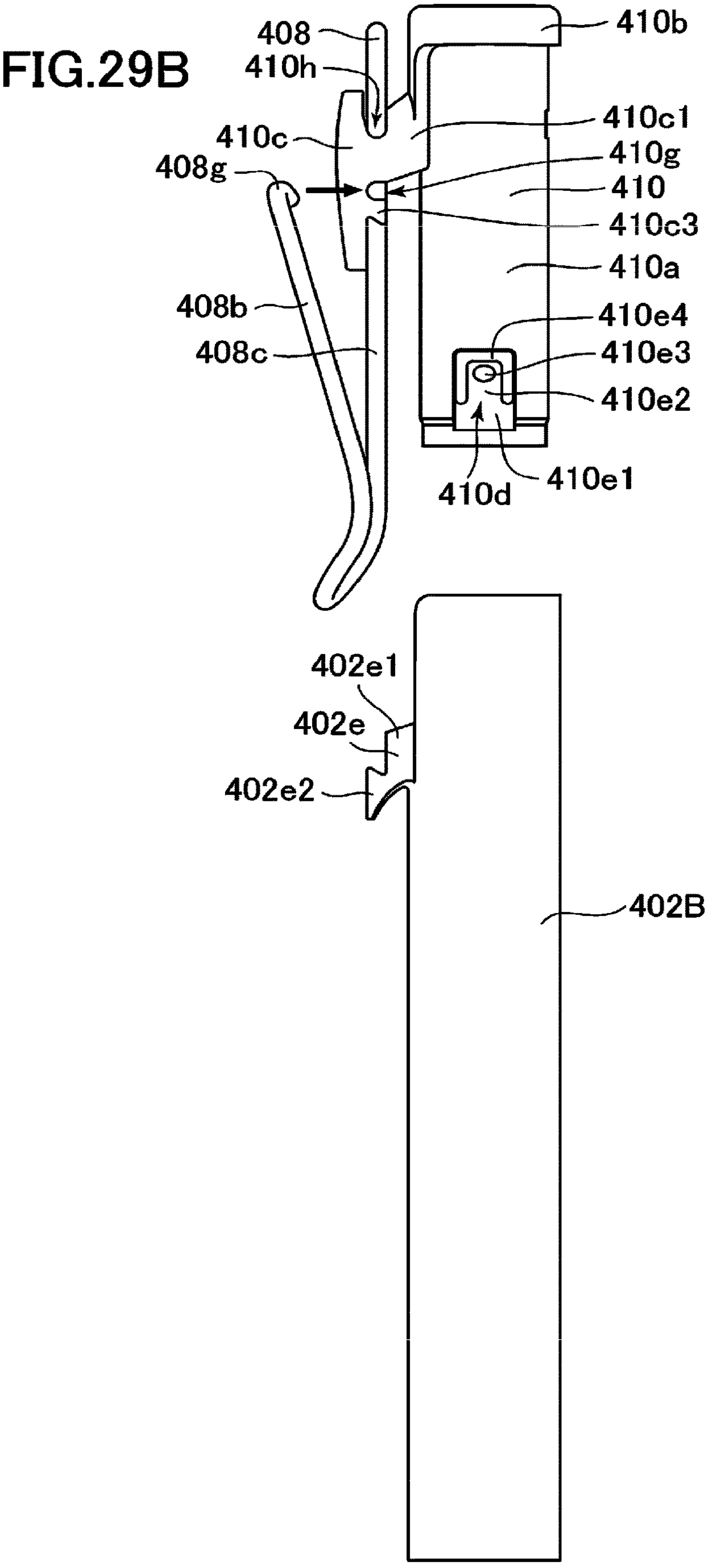
FIG. 29B is a side view corresponding to FIG. 29A.

Subsequently, as shown in FIGS. 29A and 29B, the second end 408*g* of the clip member 408 is pushed radially inwardly toward the inner tube 410. Then, the second end 408*g* is fitted into the first recess 410*g* from the radially inner side. In this process, the second end is fitted such that the bent part 408*h* thereof is positioned in the diametrically expanded region of the first recess 410*g*.

Figure 30A:
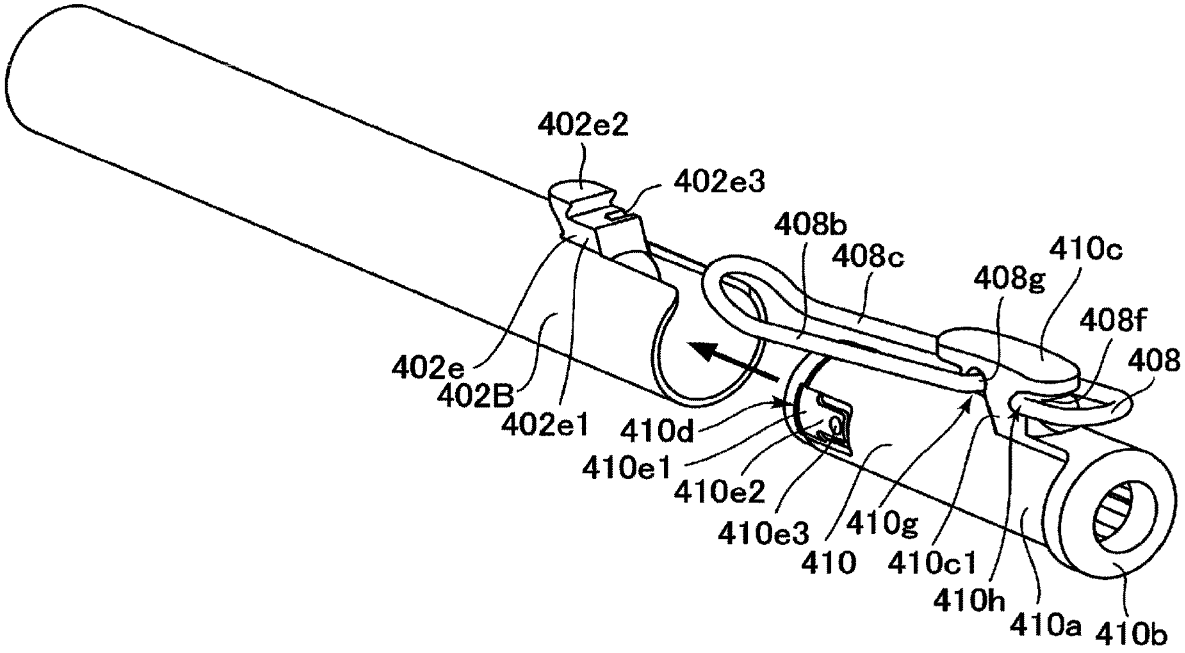
FIG. 30A is a perspective view for explaining the method to attach the clip member to the inner tube and then attach the inner tube to the backward shaft tube, in the writing tool according to the fifth embodiment (part 3).
Figure 30B:
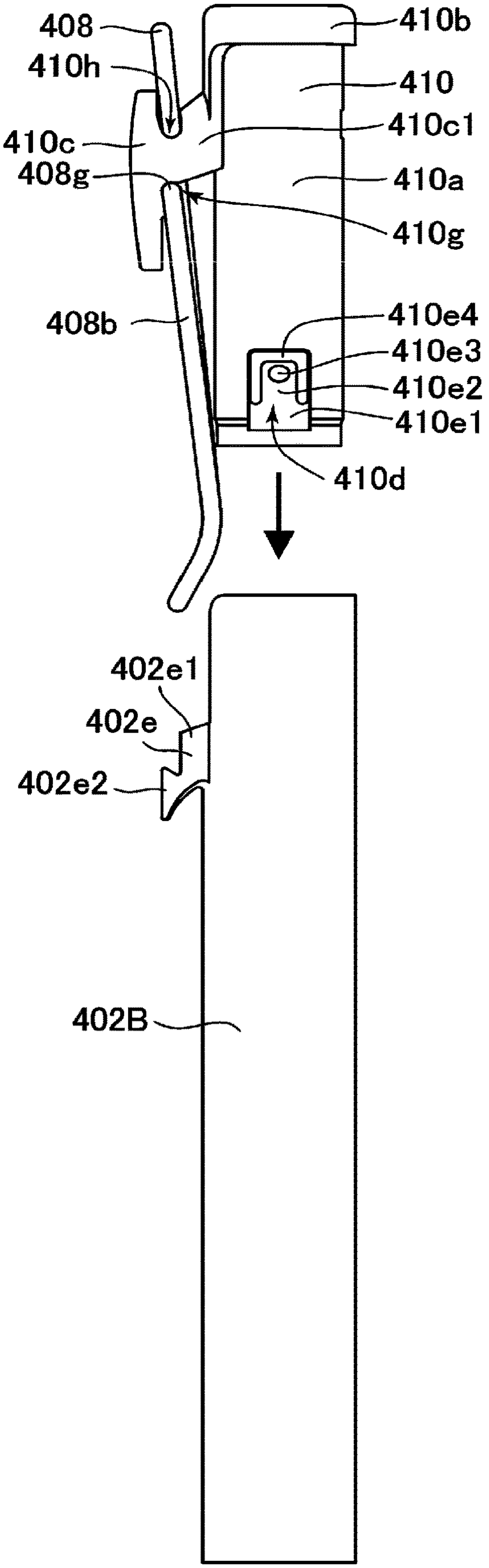
FIG. 30B is a side view corresponding to FIG. 30A.

Subsequently, as shown in FIGS. 30A and 30B, the inner tube 410 is moved forwardly as indicated by the arrowed line in FIGS. 30A and 30B to allow the extension part 410*b*1 of the inner tube 410 to be fitted into the cutout 402*d* of the backward shaft tube 402B, and inserted into the back-end opening 402*b* of the backward shaft tube 402B. In this way, the extension part 410*b*1 of the inner tube 410 is positioned such that it is fitted in the cutout 402*d* of the backward shaft tube 402B. Thus, the recesses 410*d* of the inner tube 410 are aligned with the radially-narrowing portions 402*c* of the backward shaft tube 402B in the axial direction.

Figure 31A:
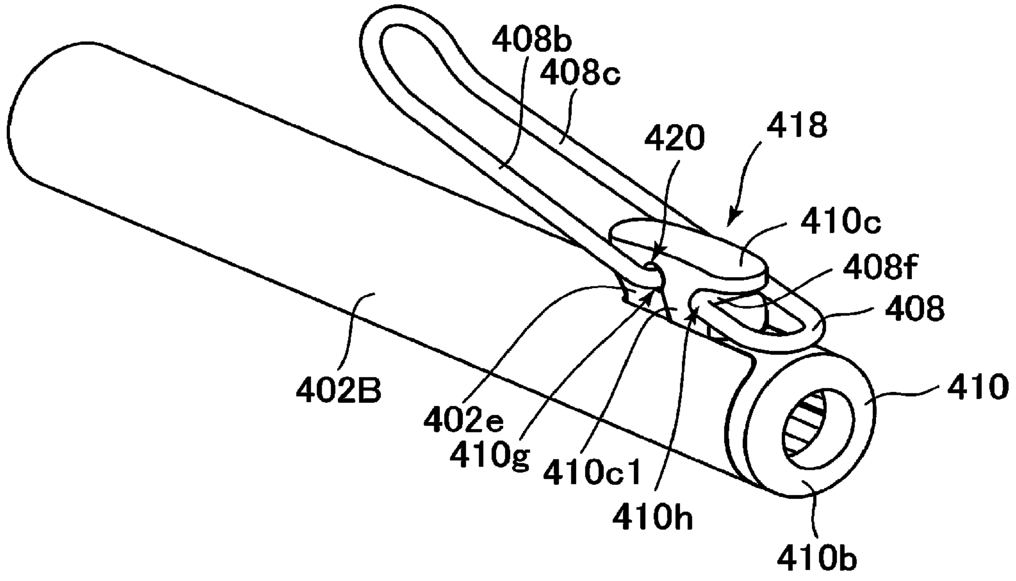
FIG. 31A is a perspective view for explaining the method to attach the clip member to the inner tube and then attach the inner tube to the backward shaft tube, in the writing tool according to the fifth embodiment (part 4).
Figure 31B:
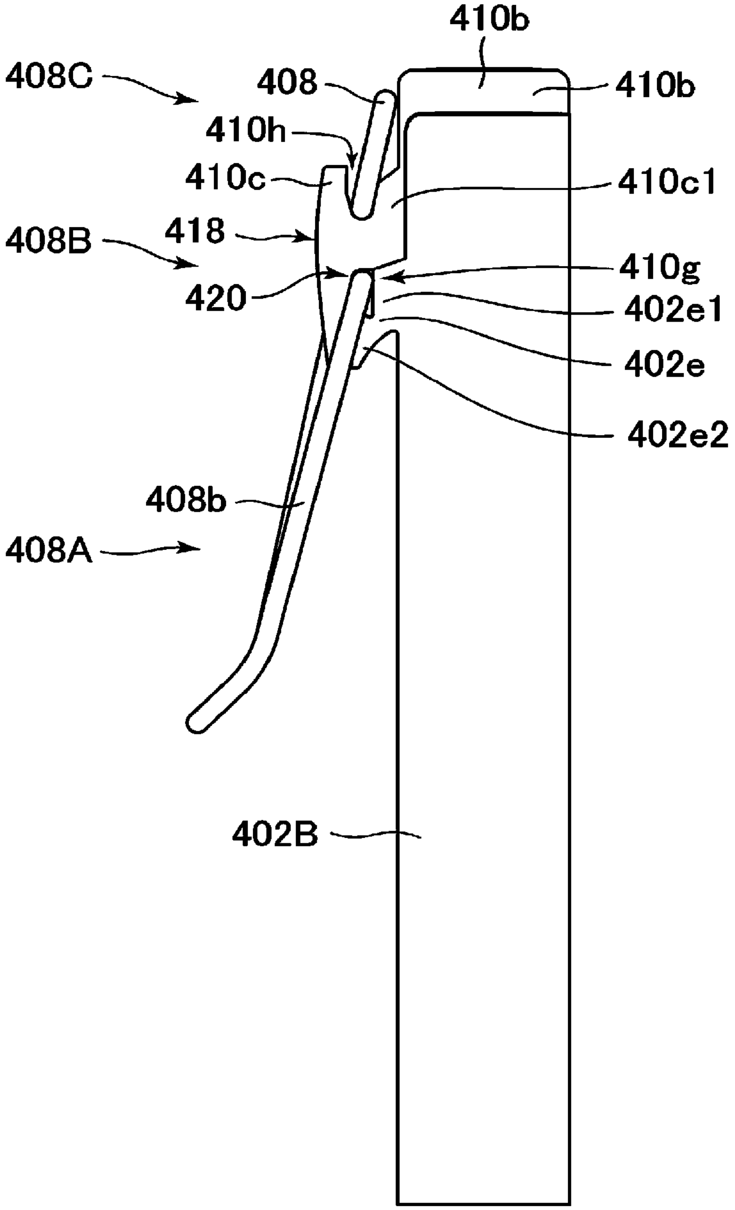
FIG. 31B is a side view corresponding to FIG. 31A.

In this process, as shown in FIGS. 31A and 31B, when the back-end section 408C of the clip member 408 is pushed radially inwardly toward the backward shaft tube 402B, the fore-end section 408A of the clip member 408 is swung about a fulcrum consisting of the intermediate section 408B held by the second clip holding portion 410*c*, so that he fore-end section 408A of the clip member 408 is moved radially outwardly to be spaced apart from the backward shaft tube 402B. Then, when the inner tube 410 is inserted forwardly in this state, a fore-end edge of the inner tube 410 can climb over the radially-narrowing portions 402*c* because the back-end of each of the radially-narrowing portions 402*c* is formed to have an inclined surface. The inner tube 410 is inserted until the inclined forward surface of the rising part 410*c*1 in the second clip holding portion 410*c* of the inner tube 410 is brought into contact with the inclined backward surface of the base part 402*e*1 of the backward shaft tube 402B. In this way, each of the radially-narrowing portions 402*c* of the backward shaft tube 402B is fitted into a corresponding one of the recesses 410*d* of the inner tube 410. Thus, even when a pullout force oriented backwardly with respect to the backward shaft tube 402B to move acts on the inner tube 410, a fore-end edges of each of the radially-narrowing portions 402*c* of the backward shaft tube 402B is brought into contact with the step of a forward region of the peripheral edge of a corresponding one of the recesses 410*d* of the inner tube 410, thereby preventing the inner tube 410 from being separated from the backward shaft tube 402B. Further, a radially-inner surface of the radially-narrowing portion 402*c* of the backward shaft tube 402B is brought into contact with the protrusion 410*e*3 formed on the elastically deformable portion 410*e*2, and thereby the elastically deformable portion 410*e*2 is bent radially inwardly. As a result, an inner edge of a back-end of the elastically deformable portion 410*e*2 protrudes radially inwardly beyond the outer periphery of the cam portion 412*b* of the rotor 412.

Further, when the forward inclined surface of the rising part 410*c*1 of the inner tube 410 comes into contact with the backward inclined surface of the base part 402*e*1 of the backward shaft tube 402B, the first clip holding portion 402*e* of the backward shaft tube 402B and the second clip holding portion 410*c* of the inner tube 410 are combined together to form a clip holding unit 418 provided to laterally extend from the tool body 407. In addition, the first recess 410*g* of the inner tube 410 and the recess 402*e*3 of the backward shaft tube 402B are integrated to form a through-hole 420. This through-hole 420 is formed such that one of the opposite ends thereof has a larger diameter than the other end. The second end 408*g* is disposed in the through-hole 420, and the bent part 408*h* is disposed in the large-diameter relief part in the through-hole 420. In this way, the second end 408*g* of the clip member 408 is held in the through-hole 420. As above, the clip member 408 is fixed by attaching the first end 408*f* to the second recess 410*h* of the inner tube 410 and attaching the second end 408*g* to the through-hole 420. That is, the second recess 410*h* of the inner tube 410 and the through-hole 420 composing the clip holding unit 418 function as a mounting portion. The through-hole 420 (mounting portion) is formed in a boundary surface between the second clip holding portion 410*c* of the inner tube 410 and the first clip holding portion 402*e* of the backward shaft tube 402B.

Figure 32A:
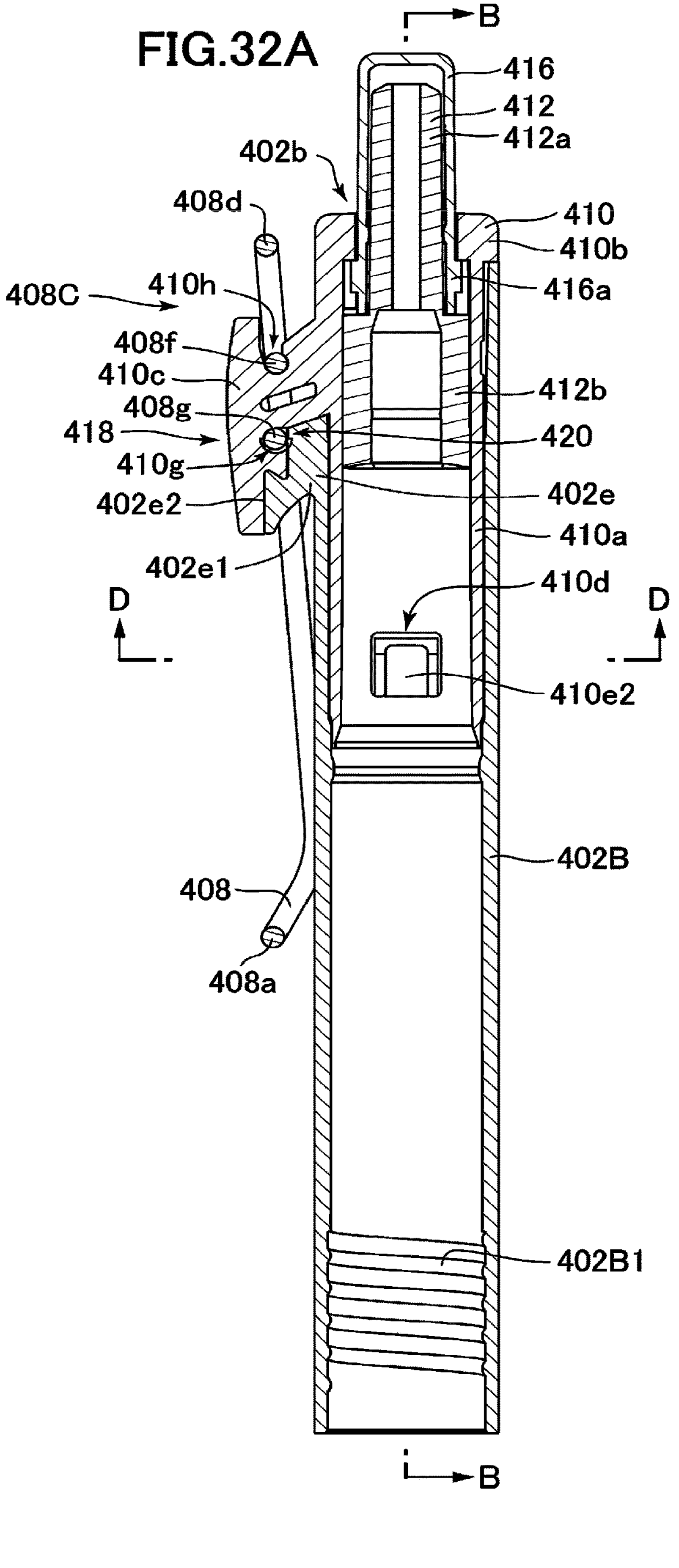
FIG. 32A is a sectional view corresponding to FIG. 24, showing the writing tool according to the fifth embodiment in a state after attaching, to the backward shaft tube, the inner tube to which the clip member is attached, and then attaching a knock member and a rotor thereto.
Figure 32B:
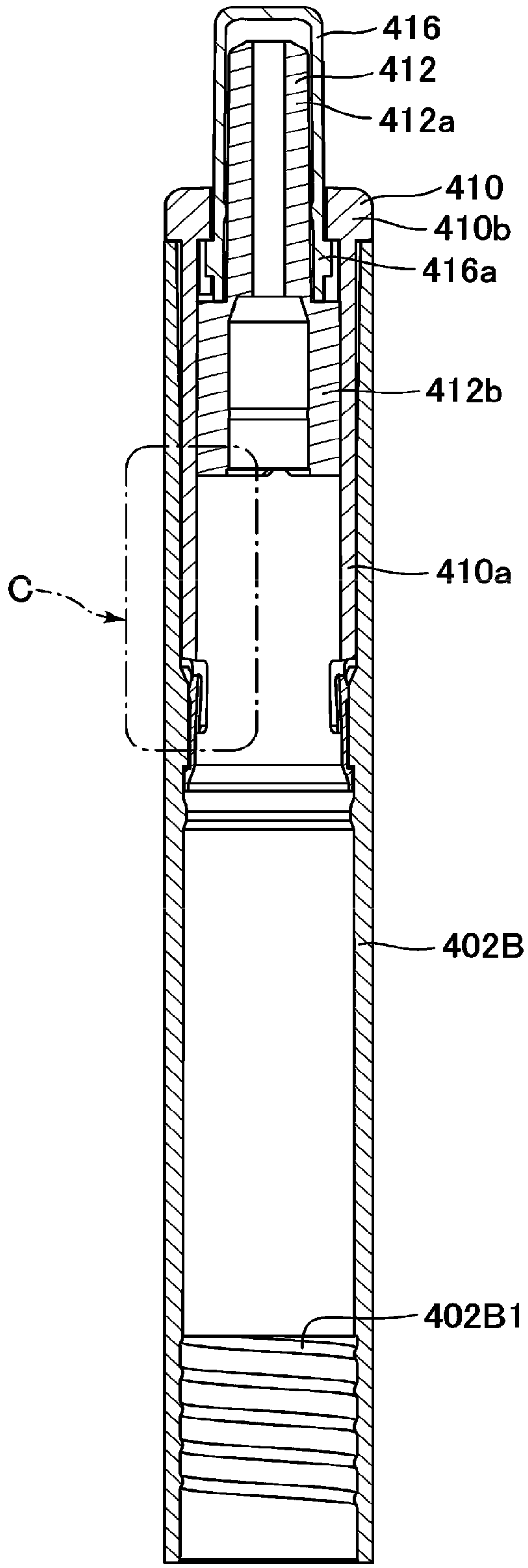
FIG. 32B is a sectional view taken along the line B-B of FIG. 32A.
Figure 32C:
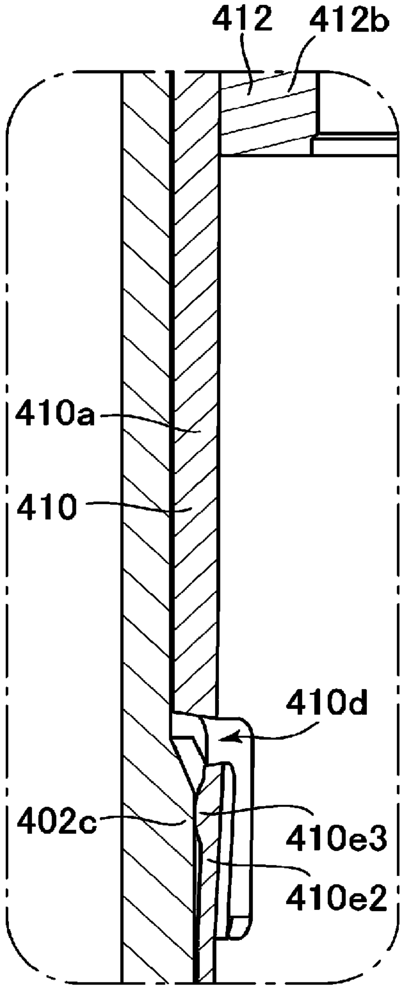
FIG. 32C is an enlarged sectional view of a region C in FIG. 32B.
Figure 32D:
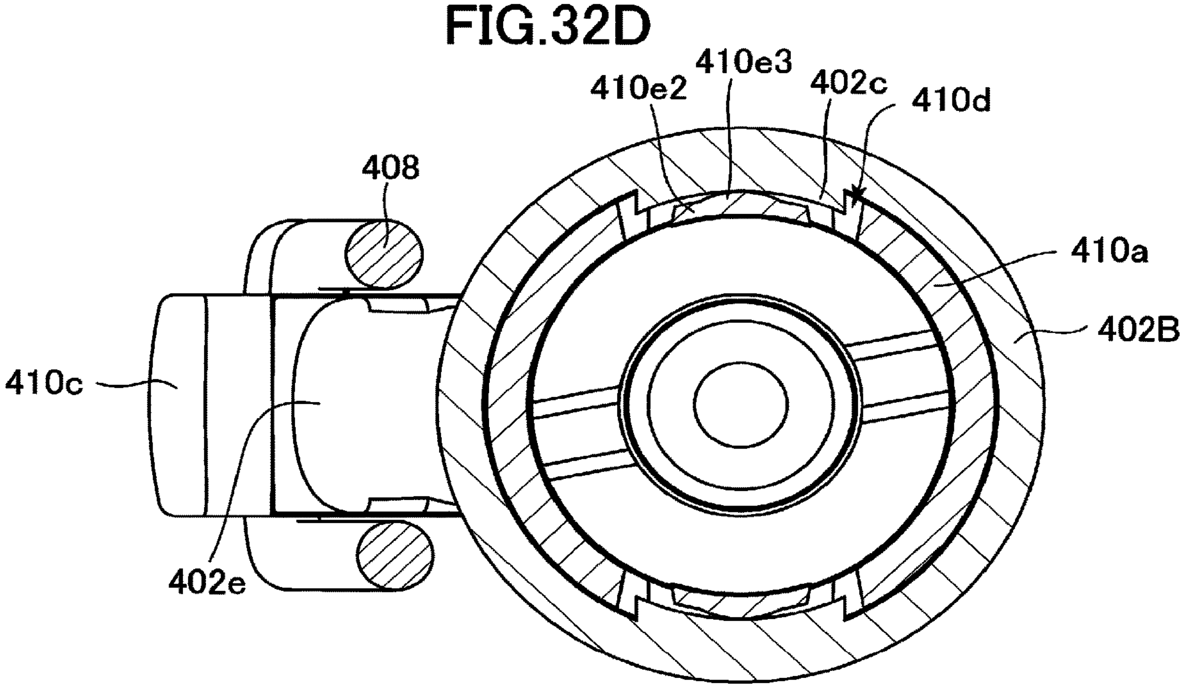
FIG. 32D is a sectional view taken along the line D-D of FIG. 32A.

After the inner tube 410 is attached to the backward shaft tube 402B, the knock member 416 is inserted into the backward shaft tube 402B from the forward side of the backward shaft tube 402B, and then the rotor 412 is inserted into the backward shaft tube 402B from the forward side of the backward shaft tube 402B. FIGS. 32A to 32D illustrate in the writing tool according to the fifth embodiment in a state after attaching, to the backward shaft tube, the inner tube to which the clip member is attached, and then attaching the knock member and the rotor thereto, wherein FIG. 32A is a sectional view corresponding to FIG. 24, and FIG. 32B, FIG. 32C and FIG. 32D are, respectively, a sectional view taken along the line B-B of FIG. 32A, an enlarged sectional view of a region C in FIG. 32B, and a sectional view taken along the line D-D of FIG. 32A. As shown in FIGS. 32A to 32D, the elastically deformable portions 410*e*2 extend backwardly from the base portions 410*e*1. Thus, during an operation of inserting the rotor 412, even if the elastically deformable portions 410*e*2 protrude radially inwardly, the rotor 412 can be smoothly inserted. Then, after the rotor 412 is inserted backwardly beyond the elastically deformable portions 410*e*2, the rear-end edges of the elastically deformable portions 410*e*2 protrude radially inwardly beyond the outer periphery of the rotor 412 again. Thus, even if an operator attempts to move the rotor 412 forwardly, an outer peripheral edge of the fore-end of the cam portion 412*b* of the rotor 412 will be brought into contact with the back-end edges of the elastically deformable portions 410*e*2. Therefore, even when the writing tool is disassembled during replacement of the refill element 4, the rotor 412 is held inside the backward shaft tube 402B by the elastically deformable portions 410*e*2.

Subsequently, the spring member is disposed in the fore-end of the forward shaft tube 402A, and the forward shaft tube 402A and the backward shaft tube 402B are threadingly connected together in a state in which the refill element 404 is disposed such that the fore-end thereof is inserted into the inside of the spring member 414. Thus, the refill element 404 is biased backwardly by the spring member 414 and brought into the fore-end of the rotor 412. Then, the knock member 416 is biased backwardly through the rotor 412, and the protrusion 416*a* of the knock member 416 is brought into contact with a fore-end edge of the back-end portion 410*b* of the inner tube 410. In this way, the assembling of the writing tool 401 is completed.

In the assembled state, when the back-end section 408C of the clip member 408 is pushed radially inwardly toward the tool body 407, the fore-end section 408A of the clip member 408 is swung about a fulcrum consisting of the intermediate section 408B held by the second clip holding portion 410*c*, i.e., moved radially outwardly to be spaced apart from the tool body 407. Therefore, a user of the writing tool 401 according to the fifth embodiment can push down the back-end section 408C of the clip member 408 in a state in which he/she grips the shaft tube 402 of the tool body 407 by the index finger, middle finger, ring finger, little finger of one hand, thereby causing the fore-end section 408A of the clip member 408 to be spaced apart from the tool body 407 to open the clip member 408 with respect to the tool body 407.

In the present invention, the expression "swinging the clip with respect to the tool body" includes not only swinging the clip strictly about a single pivot, but also, through an operation of manually pushing the back-end section of the clip member radially inwardly in the state in which the intermediate section of the clip member is supported, moving the fore-end section of the clip member radially outwardly, as in the above embodiments.

The fifth embodiment can bring out the following advantageous effects.

In the fifth embodiment, the intermediate section 408B of the clip member 408 is held by the lateral portion of the tool body 407, and, when the back-end section 408C of the clip member 408 is pushed toward the tool body 407, the fore-end section 408A of the clip member 408 is swung to be spaced apart from the tool body 407. Thus, the back-end section 408C of the clip member 408 can be pushed down in a state in which the shaft tube 402 of the tool body 407 is gripped by the index finger, middle finger, ring finger, little finger of one hand, thereby opening the clip member 408 by one-handed manipulation.

In the fifth embodiment, the fore-end section 408A is biased toward the tool body 407 by elasticity of the wire rod composing the clip member 408, so that the clip member 408 can be composed by a simple configuration, without using any biasing member such as a spring.

Here, in the fifth embodiment, the through-hole 420 is formed as a hole extending in the transverse direction, wherein a relief part is formed in the through-hole 420, and the bent part of the second end 408*g* is disposed in the relief part. Thus, the bent part 408*h* formed in the second end 408*g* of the clip member 408 makes it possible to prevent the clip member 408 from dropping off from the through-hole 420.

In the fifth embodiment, the clip holding unit 418 has the through-hole 420, and the clip member 408 is composed of a wire rod, wherein a portion of the wire rod is disposed and held in the through-hole 420, and the through-hole 420 is formed in the boundary surface between the shaft tube 2 and the inner tube 410. According to this feature, the clip member 408 is held by the through-hole 420, so that it is possible to prevent easy drop-out of the clip member 408. Further, the through-hole 420 is formed in the boundary surface between the shaft tube 2 and the inner tube 410, so that it is possible to easily dispose the clip member 408 inside the through-hole 420.

The writing tool according to the fifth embodiment comprises the hollow cylindrical-shaped shaft tube 402, the inner tube 410 disposed inside the shaft tube 402, and the rotor 412 disposed inside the inner tube 410, wherein the inner tube 410 is formed with the elastically deformable portions 410*e*2 which protrude radially inwardly beyond the outer periphery of the rotor 412, in an assembled state where the inner tube 410 is disposed inside the shaft tube 402 at a position forward of the rotor 412. According to this feature, when the inner tube 410 is disposed inside the shaft tube 402, the elastically deformable portions 410*e*2 protrude radially inwardly beyond the outer periphery of the rotor 412. Thus, even during replacement of the refill element 404, or the like, the rotor 412 is in contact with the elastically deformable portions 410*e*2, so that it is possible to prevent the rotor 412 from being separated from the shaft tube 402.

In the fifth embodiment, the shaft tube 402 has the radially-narrowing portions 402*c* formed on the inner peripheral surface thereof, wherein the outer peripheral surfaces of the elastically deformable portions 410*e*2 are brought into contact with the radially-narrowing portions 402*c*, thereby protruding radially inwardly. According to this feature, the elastically deformable portions 410*e*2 can be deformed to protrude radially inwardly by disposing the inner tube 410 inside the shaft tube 402, so that it is possible to prevent separation of the rotor 412 without causing structural complication of the inner tube 410.

In the fifth embodiment, the inner tube 410 has the steps along the peripheral edges of the recesses 410*d* in the outer peripheral surface of the inner tube 410, wherein, when a pullout force acts on the inner tube 410, the steps are engaged with the radially-narrowing portions 402*c* to resist the pullout force. According to this feature, the steps can be engaged with the radially-narrowing portions 402*c* so as to fix the inner tube 410 to the shaft tube 402.

In the fifth embodiment, each of the elastically deformable portions 410*e*2 is formed in a cantilever configuration extending backwardly. According to this feature, the elastically deformable portion 410*e*2 can be configured to, when the inner tube is disposed inside the shaft tube, protrude radially inwardly with a simple configuration.

In the fifth embodiment, the writing tool 401 has the clip member 408 provided along the shaft tube 402, wherein the shaft tube 402 and the inner tube 410 are combined together to form the clip holding unit 418 for holding the clip member 408. According to this feature, the operation of attaching the clip member 408 can be facilitated.

In the fifth embodiment, the clip holding unit 418 has the through-hole 420, and the clip member 408 is composed of a wire rod, wherein a portion of the wire rod is disposed and held in the through-hole 420, and the through-hole 420 is formed in the boundary surface between the shaft tube 2 and the inner tube 410. According to this feature, the clip member 408 is held by the through-hole 420, so that it is possible to prevent easy drop-out of the clip member 408. Further, the through-hole 420 is formed in the boundary surface between the shaft tube 2 and the inner tube 410, so that it is possible to easily dispose the clip member 408 inside the through-hole 420.

Here, in the fifth embodiment, the through-hole 420 and the second recess 410*h* are aligned in the longitudinal direction, and, in the state in which the clip member 408 is detached from the inner tube 410, the first end 408*h* is located closer to the tool body than the second end 408*i*. However, the present invention is not limited thereto. For example, even in a case where the clip member 408 is formed in a flat shape, the writing tip-side second recess 410*h* may be formed closer to the tool body 407 than the through-hole 420. In this case, the fore-end section of the clip member 408 can also be biased toward the tool body 407.

Further, in the fifth embodiment, the through-hole 420 and the second recess 410*h* are provided to fix the first end 408*h* and the second end 408*i* of the clip member 408 thereto. Alternatively, a cutout may be formed.

Further, although the fifth embodiment has been described based on an example where the present invention is applied to a knock-type ballpoint pen, a writing tool to which the present invention is applicable is not limited thereto. For example, the present invention is also applicable to a knock-type mechanical pencil, and a writing tool equipped with no knock mechanism.

Further, the present invention may be applied in a case where a cap is attached to a cap of a cap-type writing tool.

LIST OF REFERENCE SIGNS

1: writing tool
2: shaft tube
2*a*: fore-end opening
2*b*: back-end opening
2*c*: convex part
2*d*: cutout
4: refill element
4*a*: writing tip portion
6: knock mechanism
7: tool body
8: clip member
8A: fore-end section
8B: intermediate section
8C: back-end section
8*a*: arc-shaped portion
8*b*: first longitudinal portion
8*c*: second longitudinal portion
8*d*: first transverse portion
8*e*: third longitudinal portion
8*f*: second transverse portion
8*g*: fourth longitudinal portion
8*h*: first end
8*i*: second end
10: inner tube
10*a*: tube body
10*b*: back-end portion
10*c*: clip mounting portion
10*d*: protrusion
10*f*: cam portion
10*g*: first mounting hole
10*h*: second mounting hole
12: rotor
12*a*: base end portion
12*b*: cam portion
14: spring member
16: knock member
16*a*: protrusion
101: writing tool
106: knock mechanism
107: tool body
108: clip member
108A: fore-end section
108B: intermediate section
108C: back-end section
108*a*: first arc-shaped portion
108*b*: first longitudinal portion
108*c*: second longitudinal portion
108*d*: second arc-shaped portion
108*g*: third longitudinal portion
108*f*: first end
108*g*: second end
108*h*: bent part
110: inner tube
110*a*: tube body
110*b*: back-end portion
110*c*: clip mounting portion
110*f*: cam portion
110*g*: first mounting cutout
110*g*1: receiving part
110*h*: second mounting hole
110*h*1: base end part
110*h*2: relief part
116: knock member
201: writing tool
208: clip member
208A: fore-end section
208B: intermediate section
208C: back-end section
208*a*: first arc-shaped portion
208*b*: first longitudinal portion
208*c*: second longitudinal portion
208*d*: figure portion
208*e*: third longitudinal portion
208*f*: first end
208*g*: second end
310: inner tube
310*a*: tube body
310*b*: back-end portion
310*c*: clip mounting portion
310*f*: cam portion
310*g*: first mounting cutout
310*g*1: first mounting cutout
310*h*: second mounting hole
310*h*1: base end part
310*h*2: relief part
401: writing tool
402: shaft tube
402A: forward shaft tube
402A1: spiral thread
402B: backward shaft tube
402B1: spiral thread
402*a*: fore-end opening
402*b*: back-end opening
402*c*: radially-narrowing portion
402*d*: cutout
402*e*: first clip holding portion
402*e*1: base part
402*e*2: engagement part
402*e*3: recess
404: refill element
404*a*: writing tip portion
406: knock mechanism
407: tool body

408: clip member
408A: fore-end section
408B: intermediate section
408C: back-end section
408*a*: first arc-shaped portion
408*b*: first longitudinal portion
408*c*: second longitudinal portion
408*d*: second arc-shaped portion
408*e*: third longitudinal portion
408*f*: first end
408*g*: second end
408*h*: bent part
410: inner tube
410*a*: tube body
410*b*: back-end portion
410*b*1: extension part
410*c*: second clip holding portion
410*c*1: rising part
410*c*2: extension part
410*c*3: protrusion
410*d*: recess
410*e*1: base portion
410*e*2: elastically deformable portion
410*e*3: protrusion
410*e*4: through-hole
410*f*: cam portion
410*g*: first recess
410*h*: second recess
412: rotor
412*a*: base end portion
412*b*: cam portion
414: spring member
416: knock member
416*a*: protrusion
418: clip holding unit
420: through-hole

The invention claimed is:

1. A writing tool comprising:

a tool body extending in a longitudinal direction; and a clip member composed of a wire rod and held by a lateral portion of the tool body, wherein a longitudinal intermediate section of the clip member is held by the lateral portion of the tool body, and the clip member is biased toward the tool body so as to cause a writing tip-side section of the clip member to come into contact with the tool body, wherein the writing tool is configured such that, when a back-end section of the clip member is pushed toward the tool body, a longitudinal writing tip-side section of the clip member is swung to he spaced apart from the tool body, wherein the clip member is configured to be formed by bending the wire rod, and wherein opposite ends of the wire rod are attached, respectively, to a pair of mounting parts formed in the lateral portion of the tool body and separated along the longitudinal direction, and the clip member is bent into a shape allowing the longitudinal writing tip-side section of the clip member to be biased toward the tool body by elasticity of the wire rod composing the clip member.

2. The writing tool as recited in claim 1, wherein each of the pair of mounting parts is formed of a hole extending in a transverse direction, or a cutout, and wherein at least one of the ends of the wire rod is formed with a bent part, and one of the pair of mounting parts corresponding to the at least one end has a relief part expanded as compared with a base end thereof, wherein the bent part is located in the relief part.

3. The writing tool as recited in claim 1, wherein the wire rod is bent such that the clip member is at least partly formed to draw a certain figure.

4. The writing tool as recited in claim 1, wherein the tool body comprises a hollow cylindrical-shaped shaft tube and an inner tube disposed inside the shaft tube, and one of the pair of mounting holes is composed of a through-hole, and wherein one of the ends of the clip member is disposed inside and held by the through-hole, wherein the through-hole is formed in a boundary surface between the shaft tube and the inner tube.

* * * * *